US005395433A

United States Patent [19]

Maruyama et al.

[11] Patent Number: 5,395,433

[45] Date of Patent: Mar. 7, 1995

[54] REVERSIBLE THERMOSENSITIVE COLORING COMPOSITION, RECORDING MEDIUM, RECORDING METHOD, AND IMAGE DISPLAY APPARATUS USING THE RECORDING MEDIUM

[75] Inventors: Shoji Maruyama, Yokohama; Hiroshi Goto, Fuji; Eiichi Kawamura, Numazu; Masaru Shimada, Shizuoka; Keishi Kubo, Yokohama; Kyoji Tsutsui, Mishima; Hideaki Ema, Shimizu; Takehito Yamaguchi, Toda; Hiroki Kuboyama, Mishima; Ichiro Sawamura, Numazu; Keishi Taniguchi, Susono, all of Japan

[73] Assignee: Ricoh Company, Ltd., Tokyo, Japan

[21] Appl. No.: 159,456

[22] Filed: Nov. 30, 1993

Related U.S. Application Data

[62] Division of Ser. No. 813,181, Dec. 24, 1991, Pat. No. 5,296,439.

[30] Foreign Application Priority Data

| | | | |
|---|---|---|---|
| Dec. 26, 1990 | [JP] | Japan | 2-414436 |
| Dec. 26, 1990 | [JP] | Japan | 2-414438 |
| Feb. 14, 1991 | [JP] | Japan | 3-042813 |
| May 14, 1991 | [JP] | Japan | 3-138476 |
| May 31, 1991 | [JP] | Japan | 3-155440 |
| Jun. 29, 1991 | [JP] | Japan | 3-185242 |
| Jul. 10, 1991 | [JP] | Japan | 3-195997 |
| Jul. 12, 1991 | [JP] | Japan | 3-198901 |
| Aug. 15, 1991 | [JP] | Japan | 3-229572 |
| Sep. 10, 1991 | [JP] | Japan | 3-258552 |
| Sep. 10, 1991 | [JP] | Japan | 3-258553 |
| Dec. 20, 1991 | [JP] | Japan | 3-355078 |

[51] Int. Cl.$^6$ .................... C09D 11/00
[52] U.S. Cl. .................... 106/21 A; 106/21 R
[58] Field of Search .................... 106/21 A, 21 R

[56] References Cited

U.S. PATENT DOCUMENTS

| | | | |
|---|---|---|---|
| 4,486,763 | 12/1984 | Taniguchi et al. | 503/209 |
| 4,502,068 | 2/1985 | Taniguchi et al. | 503/216 |
| 4,506,278 | 3/1985 | Sakamoto et al. | 503/217 |
| 4,511,910 | 4/1985 | Taniguchi et al. | 503/216 |
| 4,517,580 | 5/1985 | Iiyama et al. | 503/214 |
| 4,608,579 | 8/1986 | Taniguchi | 503/209 |
| 4,636,819 | 1/1987 | Nagamoto et al. | 503/209 |
| 4,731,354 | 3/1988 | Taniguchi et al. | 503/209 |
| 4,978,709 | 12/1990 | Taniguchi et al. | 106/20 R |
| 4,983,446 | 1/1991 | Taniguchi et al. | 428/195 |
| 5,248,543 | 9/1993 | Yamaguchi et al. | 428/195 |
| 5,260,139 | 11/1993 | Shiraishi et al. | 428/195 |
| 5,306,687 | 4/1994 | Furuya et al. | 503/207 |

*Primary Examiner*—Helene Klemanski
*Attorney, Agent, or Firm*—Oblon, Spivak, McClelland, Maier & Neustadt

[57] ABSTRACT

A reversible thermosensitive coloring composition is composed of (i) an electron-donor coloring compound and (ii) an electron-acceptor compound selected from the group consisting of an organic phosphoric acid compound, an aliphatic carboxylic acid, and a phenolic compound, each having a straight chain or branched chain alkyl group or alkyenyl group having 12 or more carbon atoms, the electron-donor coloring compound and the electron-acceptor compound being capable of reacting to induce color formation in the reversible thermosensitive coloring composition at the eutectic temperature thereof. The electron-donor coloring compound and the electron-acceptor compound, when fused and colored in a mixed state, with application of heat thereto, followed by rapidly cooling the fused mixture, exhibit an exothermic peak in a temperature elevation process in a differential scanning calorific analysis or in a differential thermal analysis. A recording medium and display medium using the above reversible thermosensitive coloring composition, a recording method of using the recording medium, a display method of using the display medium, a display method of using the display medium, and a display apparatus using the display medium are disclosed.

2 Claims, 20 Drawing Sheets

TRANSMITTANCE (a.u)

REVERSIBLE THERMOSENSITIVE COLORING COMPOSITION, RECORDING MEDIUM, RECORDING METHOD, AND IMAGE DISPLAY APPARATUS USING THE RECORDING MEDIUM

This is a division of Ser. No. 07/813,181, filed Dec. 24, 1991, now U.S. Pat. No. 5,296,439.

BACKGROUND OF THE INVENTION

1. Field of the Invention

This invention relates to a reversible thermosensitive coloring composition capable of developing and decolorizing a colored image repeatedly by utilizing a coloring reaction between an electron-donor coloring compound and an electron-acceptor compound. This invention also relates to a reversible thermosensitive coloring recording medium, a recording and display method, a display medium, and an image display apparatus using the reversible thermosensitive coloring recording medium.

2. Discussion of the Background

Conventionally, thermosensitive recording media utilizing a coloring reaction between electron donor-coloring compounds (hereinafter, referred to as coloring agents) and electron-acceptor compounds (hereinafter, referred to as color developers) are widely known and have been employed in various fields, for instance, for use with terminal printers for computers, facsimile apparatus, automatic ticket vending apparatus, printers for scientific measuring instruments, and printers for CRT medical measuring instruments. However, such conventional thermosensitive recording media for use with the above-mentioned products do not have reversibility with respect to the coloring or decolorizing in image formation, so that the color development and the decolorization cannot be alternately performed repeatedly.

Among published patents, there are several proposals for thermosensitive recording media which can reversibly develop and decolorize or erase colored images utilizing a coloring reaction between coloring agents and color developers. For example, a thermosensitive recording medium using the combination of phloroglucinol and gallic acid as color developers is disclosed in Japanese Laid-Open Patent Application 60-193691. The images obtained by developing a color using gallic acid and phloroglucinol upon the application of heat thereto, is erased when coming into contact with water or aqueous vapor. In the case where such types of thermosensitive recording media are employed, there are difficulties in imparting water-resisting properties to the recording medium and obtaining stable recording preservability. Furthermore, there is another problem in that a large image erasing apparatus is required to erase the displayed image on the above-mentioned recording medium.

In Japanese Laid-Open Patent Application 61-237684, a rewritable optical information recording medium which employs compounds such as phenolphthalein, thymolphthalein and bisphenol as color developers is disclosed. In the above optical information recording medium, colored images are formed by applying heat thereto and gradually decreasing the temperature thereof. The colored images can be decolorized or erased by applying heat to the recording medium at a higher temperature than the image developing temperature, and then rapidly cooling the recording medium. In the case of this optical information recording medium, the color developing and decolorizing steps are complicated and the contrast of the colored image is not satisfactory with some color remaining on the erased image which is obtained by erasing the displayed image.

In Japanese Laid-Open Patent Applications 62-140881, 62-138568, and 62-138556, thermosensitive recording media using a homogeneously dissolved composition of a coloring agent, a color developer and a carboxylic acid ester are disclosed. The above recording media can assume a completely colored state at a low temperature, a completely decolorized state at a high temperature, and can maintain the colored state or the decolorized state at a temperature midway between the above-mentioned low temperature and high temperature. When heat is applied to the recording media using a thermal head, a white image (decolorized image), which is similar to a photographic negative, is recorded on the colored background. Accordingly, the usage of above recording media is limited. It is also necessary that the temperature of the recording media be maintained within a specific range in order to preserve the recorded image on the recording media.

In Japanese Laid-Open Patent Applications 2-188294 and 2-188293, there are disclosed a thermosensitive recording medium utilizing a salt of gallic acid and a higher aliphatic amine, and a thermosensitive recording medium utilizing a salt of a bis(hydroxyphenyl)acetic acid or butyric acid and a higher aliphatic amine. These salts have a reversible color developing and decolorizing function. With this type of recording medium, a colored image can be developed in a specific temperature range with the application of heat thereto, and can be decolorized or erased by applying heat thereto at a higher temperature than the above-mentioned specific temperature range. However, since the color developing effect and the decolorizing effect competitively occur, it is difficult to thermally control these effects by changing the temperature of the recording medium. Therefore, it is difficult to obtain a stable image contrast.

As mentioned above, the conventional reversible thermosensitive recording media utilizing the coloring reaction between a coloring agent and a color developer have many problems and are unsatisfactory for use in practice. In particular, a multiple colored image on a conventional reversible thermosensitive recording medium is completely unsatisfactory.

The inventors of the present invention have previously disclosed a thermosensitive recording medium comprising as the main components a specific fluoran compound and an ascorbic acid-6-o-acyl derivative in Japanese Laid-Open Patent Application 63-173684. This recording medium can assume a color development state with the application of heat thereto at a high temperature of 90° C. or more, and can assume a decolorized state with the application of heat thereto again at temperatures in the range of 65° to 90° C. The recording medium has the characteristics that the image recording and erasing can be performed only by the application of heat.

However, the color development state of the above-mentioned thermosensitive recording medium is not always stable. For instance, when water comes into contact with the surface of the thermosensitive recording medium in the color development state, the colored image is decolorized and erased, and when the thermosensitive recording medium with the colored image printed thereon is stored under high humidity, decolorization occurs and the image density is decreased. Even when heat is again applied to the recording medium to erase the image, the decolorization is not satisfactory. In other words, the density of the image is not decreased to the level of that of the background and the image can still be observed after decolorization. Therefore, these problems must be solved in order to use this type of thermosensitive recording medium in practice.

SUMMARY OF THE INVENTION

It is therefore a first object of the present invention to provide a reversible thermosensitive coloring composition free from the above-mentioned conventional defects, which is capable of performing the color development and the decolorization only by applying heat thereto, with the color development state and decolorization state maintained at room temperature, and the temperature for the decolorization being lower than that for the color development.

A second object of the present invention is to provide a reversible thermosensitive coloring recording medium which can perform the color developing and the erasure repeatedly, with the stable formation of colored images and complete decolorization thereof, using the above-mentioned reversible thermosensitive coloring composition.

A third object of the present invention is to provide a reversible thermosensitive coloring display medium which can perform the color developing and the erasure repeatedly, with the stable formation of colored images and complete decolorization thereof, using the above-mentioned reversible thermosensitive coloring recording medium.

A fourth object of the present invention is to provide a multiple color recording or display medium which is capable of forming images with multiple colors or full-colored images.

A fifth object of the present invention is to provide a reversible thermosensitive coloring recording method of reversibly forming a colored image and decolorizing the same in the above-mentioned reversible thermosensitive coloring recording medium.

A sixth object of the present invention is to provide a reversible thermosensitive coloring display method of reversibly forming a colored image and decolorizing the same in the above-mentioned reversible thermosensitive coloring display medium.

A seventh object of the present invention is to provide a display apparatus using the above-mentioned reversible thermosensitive coloring display medium.

The first object of the present invention is achieved by a reversible thermosensitive coloring composition comprising (i) an electron-donor coloring compound and (ii) an electron-acceptor compound selected from the group consisting of an organic phosphoric acid compound, an aliphatic carboxylic acid, and a phenolic compound, each having a straight chain or branched chain alkyl group or alkenyl group having 12 or more carbon atoms, the electron-donor coloring compound and the electron-acceptor compound being capable of reacting to induce color formation in the reversible thermosensitive coloring composition, and the electron-donor coloring compound and the electron-acceptor compound, when fused and colored in a mixed state, with application of heat thereto, followed by rapidly cooling the fused mixture, exhibiting an exothermic peak in a temperature elevation process in a differential scanning calorific analysis or in a differential scanning thermal analysis.

The second object of the present invention is achieved by a reversible thermosensitive coloring recording medium comprising a support and a reversible thermosensitive coloring recording layer formed thereon which comprises the above-mentioned reversible thermosensitive coloring composition. This reversible thermosensitive coloring recording medium may further comprise a resin layer on the reversible thermosensitive coloring recording layer for making the reversible thermosensitive coloring recording layer smooth and transparent. A magnetic layer may also be interposed between the support and the reversible thermosensitive coloring recording layer in this recording medium or may be provided beside the reversible thermosensitive coloring recording layer on the support to make the recording medium a composite type reversible thermosensitive recording medium. Furthermore, a light-to-heat conversion material may be added to the reversible thermosensitive coloring recording layer or a light-to-heat conversion layer is provided in contact with or near the reversible thermosensitive coloring recording layer to make the recording medium a heat-mode rewritable optical information recording medium.

The third object of the present invention is achieved by a reversible thermosensitive coloring display medium comprising a support and a reversible thermosensitive coloring recording layer formed thereon which comprises the above-mentioned reversible thermosensitive coloring composition. This reversible thermosensitive coloring display medium may further comprise a resin layer on the reversible thermosensitive coloring recording layer to make the recording layer smooth and transplarent.

The fourth object of the present invention is achieved by a reversible thermosensitive coloring recording medium or display medium comprising a support and a plurality of reversible thermosensitive coloring recording layer sections capable of producing different colors, arranged in a regular pattern, for instance, in a stripe pattern or in a matrix pattern.

The fifth object of the present invention is achieved by using the above-mentioned reversible thermosensitive coloring recording medium, comprising the steps of (a) applying heat to the surface of the reversible thermosensitive coloring recording medium to a coloring temperature above the eutectic temperature of the electron-donor coloring compound and the electron-acceptor compound to obtain a colored state; and (b) applying heat to the surface of the reversible thermosensitive coloring recording medium to a decolorizing temperature which is lower than the coloring temperature to obtain a decolorized state.

The sixth object of the present invention is achieved by using the above-mentioned reversible thermosensitive coloring display medium, comprising the steps of applying heat to the surface of the reversible thermosensitive coloring display medium to a coloring temperature above the eutectic temperature of the electron-doner coloring compound and the electron-acceptor compound to obtain a colored state; and applying heat to the surface of the reversible thermosensitive coloring display medium to a decolorizing temperature which is lower than the coloring temperature to obtain a decolorized state.

The seventh object of the present invention is achieved by a display apparatus comprising the above-mentioned reversible thermosensitive coloring display medium, a first heat application means for applying heat imagewise to the surface of the reversible thermosensitive coloring display medium or evenly to the entire surface thereof to a coloring temperature above the eutectic temperature of the electron-doner coloring compound and the electron-acceptor compound to obtain a colored state; and a second heat application means for applying heat imagewise to the surface of the reversible thermosensitive coloring display medium or evenly to the entire surface thereof to a decolorizing temperature which is lower than the coloring temperature to obtain a decolorized state.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIG. 2(*b*) is a chart showing the results of a DSC analysis of the same reversible thermosensitive coloring composition of the present invention as in FIG. 2(*a*) at a temperature elevation rate of 10° C./min.

FIG. 7(*b*) is an x-ray diffraction chart showing the aggregation state of a reversible thermosensitive coloring composition comprising octadecylphosphonic acid serving as a color developer and 3-dibutylamino-7-(o-chlorophenyl)aminofluoran serving as a coloring agent with a molar ratio of 2:1 of the present invention.

FIG. 8(*b*) is a chart showing the changes in the x-ray diffraction of the same reversible thermosensitive coloring composition as in FIG. 8(*a*) in the decolorization process with temperature elevation on a higher angle side.

FIG. 18(*b*) is a schematic cross-sectional view of another example of a composite type recording medium of the present invention which comprises a reversible thermosensitive coloring recording layer and a magnetic recording layer.

FIG. 19(*b*) is a schematic cross-sectional view of another example of a heat-mode rewritable optical information recording medium of the present invention using a reversible thermosensitive coloring composition of the present invention.

FIG. 19(*c*) is a schematic cross-sectional view of a further example of a heat-mode rewritable optical information recording medium of the present invention using a reversible thermosensitive coloring composition of the present invention.

DETAILED DESCRIPTION OF THE PREFERRED EMBODIMENTS

Figure 1:
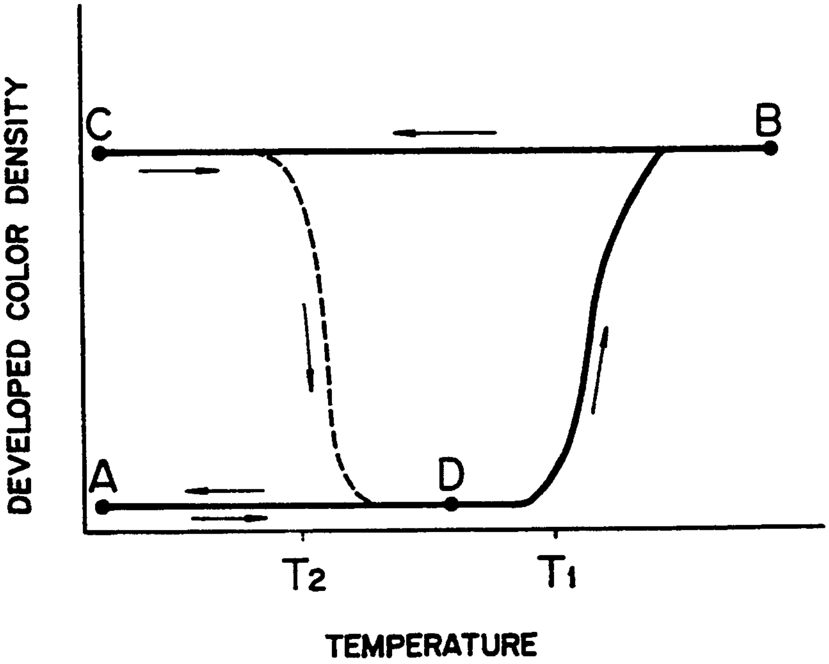
FIG. 1 is a diagram showing the relationship between the color development and decolorization of a reversible thermosensitive coloring composition of the present invention.

The reversible thermosensitive coloring composition according to the present invention utilizes the coloring reaction between an electron-donor coloring compound and an electron-acceptor compound. Examples of the electron-acceptor compound include an organic phosphoric acid, an aliphatic carboxylic acid compound and a phenol compound which have a straight or branched chain alkyl group or alkenyl group with 12 or more carbon atoms. When the mixture of the above-mentioned electron-acceptor compound and electron-donor coloring compound is fused by the application of heat thereto, and then rapidly cooled, the mixture is colored.

Thus the reversible thermosensitive coloring composition is colored. When the temperature of the reversible thermosensitive coloring composition in such a color development state is elevated from room temperature, the electron-donor coloring compound and the electron acceptor compound exhibit an exothermic phenomenon at a temperature lower than the above-mentioned fusing temperature, so that the reversible thermosensitive coloring composition assumes a decolorized state.

Thus the reversible thermosensitive coloring composition can assume a color development state by the application of heat thereto to the temperature of the fusing temperature or more and also can assume a decolorization state by the application of heat thereto to a temperature lower than the fusing temperature.

The reversible thermosensitive coloring composition according to the present invention can maintain the stable color development state and decolorization state at room temperature. The color development state and the decolorization state can be reversibly obtained repeatedly, and such properties are not found in any conventional thermosensitive coloring compositions. This performance has been obtained by use of the color developer with a particular structure. The key features of the color developers for use in the present invention and the color development and decolorization phenomena utilized in the present invention will now be explained.

The color developer employed in the reversible thermosensitive coloring composition according to the present invention has not only a molecular structure having a capability of inducing color formation in the coloring agent, but also a long-chain moiety in the molecule which controls the cohesion between the molecules thereof.

Representative examples of preferable color developers for use in the present invention include an organic phosphoric acid compound, an aliphatic carboxylic acid, and a phenolic compound, each having a straight chain or branched chain alkyl group or alkenyl group having 12 or more carbon atoms.

More specifically, the organic phosphoric acid compounds represented by the following general formula (I) can be preferably employed in the present invention.

$$R_1—PO(OH)_2 \qquad (I)$$

wherein $R_1$ represents a straight chain or branched chain alkyl group or alkenyl group having 12 or more carbon atoms. It is preferable that when $R_1$ is a straight chain alkyl group or alkenyl group, the straight chain alkyl group or alkenyl group have 12 to 30 carbon atoms, and when $R_1$ is a branched chain alkyl group or alkenyl group, the branched chain alkyl group or alkenyl group include at least a straight chain moiety having 12 to 30 carbon atoms.

Specific examples of the organic phosphoric acid compounds represented by general formula (I) are as follows: dodecylphosphonic acid, tetradecylphosphonic acid, hexadecylphosphonic acid, octadecylphosphonic acid, eicosylphosphonic acid, docosylphosphonic acid, tetracosylphosphonic acid, hexacosylphosphonic acid, and octacosylphosphonic acid.

As the aliphatic carboxylic acid compound for use in the color developer, α-hydroxycarboxylic acids represented by the following general formula (II) can be employed.

$$R_2—CH(OH)—COOH \qquad (II)$$

wherein $R_2$ represents a straight chain or branched chain alkyl group or alkenyl group having 12 or more carbon atoms. It is preferable that when $R_2$ is a straight chain alkyl group or alkenyl group, the straight chain alkyl group or alkenyl group have 12 to 30 carbon atoms, and when $R_2$ is a branched chain alkyl group or alkenyl group, the branched chain alkyl group or alkenyl group include at least a straight chain moiety having 12 to 30 carbon atoms.

Specific examples of the α-hydroxycarboxylic acids represented by general formula (II) are as follows: α-hydroxydodecanoic acid, α-hydroxytetradecanoic acid, α-hydroxyhexadecanoic acid, α-hydroxyoctadecanoic acid, α-hydroxypentadecanoic acid, α-hydroxyeicosanoic acid, α-hydroxydocosanoic acid, α-hydroxytetracosanoic acid, α-hydroxyhexacosanoic acid and α-hydroxyoctacosanoic acid.

Furthermore, as the aliphatic carboxylic acid compounds for use in the color developer, halogen-substituted compounds having a straight chain or branched chain alkyl group or alkenyl group having 12 or more carbon atoms, with the halogen bonded to at least one carbon atom at $\alpha$-position or $\beta$-position carbon of the compound can be employed.

Specific examples of such halogen-substituted compounds are as follows: 2-bromohexadecanoic acid, 2-bromoheptadecanoic acid, 2-bromooctadecanoic acid, 2-bromoeicosanoic acid, 2-bromodocosanoic acid, 2-bromotetracosanoic acid, 3-bromooctadecanoic acid, 3-bromoeicosanoic acid, 2,3-dibromooctadecanoic acid, 2-fluorododecanoic acid, 2-fluorotetradecanoic acid, 2-fluorohexadecanoic acid, 2-fluorooctadecanoic acid, 2-fluoroeicosanoic acid, 2-fluorodocosanoic acid, 2-fluorotetracosanoic acid, 2-iodohexadecanoic acid, 2-iodooctadecanoic acid, 3-iodohexadecanoic acid, 3-iodooctadecanoic acid, and perfluorooctadecanoic acid.

As the aliphatic carboxylic acid compound for use in the color developer, compounds having a straight chain or branched chain alkyl group or alkenyl group having 12 or more carbon atoms, including an oxo group with at least one carbon at the $\alpha$-position, $\beta$-position or $\gamma$-position of the aliphatic carboxylic acid compound constituting the oxo group can be employed.

Specific examples of such compounds are as follows: 2-oxododecanoic acid, 2-oxotetradecanoic acid, 2-oxohexadecanoic acid, 2-oxooctadecanoic acid, 2-oxoeicosanoic acid, 2-oxotetracosanoic acid, 3-oxododecanoic acid, 3-oxotetradecanoic acid, 3-oxohexadecanoic acid, 3-oxooctadecanoic acid, 3-oxoeicosanoic acid, 3-oxotetracosanoic acid, 4-oxotetradecanoic acid, 4-oxohexadecanoic acid, 4-oxooctadecanoic acid, and 4-oxodocosanoic acid.

As the aliphatic carboxylic acid compound for use in the color developer, dibasic acid compounds represented by the following general formula (III) can be employed:

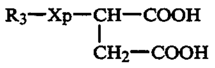

(III)

wherein $R_3$ represents a straight chain or branched chain alkyl group or alkenyl group having 12 or more carbon atoms, X represents an oxygen or sulfur atom and p represents 1 or 2. It is preferable that when $R_3$ is a straight chain alkyl group or alkenyl group, the straight chain alkyl group or alkenyl group have 12 to 30 carbon atoms, and when $R_3$ is a branched chain alkyl group or alkenyl group, the branched chain alkyl group or alkenyl group include at least a straight chain moiety having 12 to 30 carbon atoms.

Specific examples of the dibasic acids represented by general formula (III) are as follows: dodecylmalic acid, tetradecylmalic acid, hexadecylmalic acid, octadecylmalic acid, eicosylmalic acid, docosylmalic acid, tetracosylmalic acid, dodecylthiomalic acid, tetradecylthiomalic acid, hexadecylthiomalic acid, octadecylthiomalic acid, eicosylthiomalic acid, docosylthiomalic acid, tetracosylthiomalic acid, dodecyldithiomalic acid, tetradecyldithiomalic acid, hexadecyldithiomalic acid, octadecyldithiomalic acid, eicosyldithiomalic acid, docosyldithiomalic acid, and tetracosyldithiomalic acid.

As the aliphatic carboxylic acid compound for use in the color developer, dibasic acid compounds represented by the following general formula (IV) can be employed:

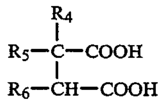

(IV)

wherein $R_4$, $R_5$ and $R_6$ represent hydrogen, an alkyl group or an alkenyl group, at least one of $R_4$, $R_5$ and $R_6$ being a straight chain or branched chain alkyl group or alkenyl group having 12 or more carbon atoms. It is preferable that when $R_4$, $R_5$, and $R_6$ are a straight chain alkyl group or alkenyl group, the straight chain alkyl group or alkenyl group have 12 to 30 carbon atoms, and when $R_4$, $R_5$ and $R_6$ are a branched chain alkyl group or alkenyl group, the branched chain alkyl group or alkenyl group include at least a straight chain moiety having 12 to 30 carbon atoms.

Specific examples of the dibasic acid compounds represented by general formula (IV) are as follows: dodecylbutane diacid, tridecylbutane diacid, tetradecylbutane diacid, pentadecylbutane diacid, octadecylbutane diacid, eicosylbutane diacid, docosylbutane diacid, 2,3-dihexadecylbutane diacid, 2,3-dioctadecylbutane diacid, 2-methyl-3-dodecylbutane diacid, 2-methyl-3-tetradecylbutane diacid, 2-methyl-3-hexadecylbutane diacid, 2-ethyl-3-dodecylbutane diacid, 2-propyl-3-decylbutane diacid, 2-octyl-3-hexadecylbutane acid, and 2-tetradecyl-3-octadecyl diacid.

As the aliphatic carboxylic acid compound for use in the color developer, dibasic acid compounds represented by the following general formula (V) can be employed:

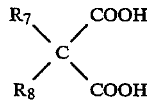

(V)

wherein $R_7$ and $R_8$ each represent hydrogen, an alkyl group or an alkenyl group, at least one of $R_7$ or $R_8$ being a straight chain or branched chain alkyl group or alkenyl group having 12 or more carbon atoms. It is preferable that when $R_7$ and $R_8$ are a straight chain alkyl group or alkenyl group, the straight chain alkyl group or alkenyl group have 12 to 30 carbon atoms, and when $R_7$ and $R_8$ are a branched chain alkyl group or alkenyl group, the branched chain alkyl group or alkenyl group include at least a straight chain moiety having 12 to 30 carbon atoms.

Specific examples of the dibasic acid compounds represented by general formula (V) are as follows: dodecylmalonic acid, tetradecylmalonic acid, hexadecylmalonic acid, octadecylmalonic acid, eicosylmalonic acid, docosylmalonic acid, tetracosylmalonic acid, didodecylmalonic acid, ditetradecylmalonic acid, dihexadecylmalonic acid, dioctadecylmalonic acid, dieicosylmalonic acid, didocosylmalonic acid, methyloctadecylmalonic acid, methyleicosylmalonic acid, methyldocosylmalonic acid, methyltetracosylmalonic acid, ethyloctadecylmalonic acid, ethyleicosylmalonic acid, ethyldocosylmalonic acid, and ethyltetracosylmalonic acid.

As the aliphatic carboxylic acid compound for use in the color developer, dibasic acid compounds represented by the following general formula (VI) can be employed:

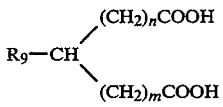

(VI)

wherein $R_9$ represents a straight chain or branched chain alkyl group or alkenyl group having 12 or more carbon atoms; and n is an integer of 0 or 1, m is an integer of 1, 2 or 3, and when n is 0, m is 2 or 3, while when n is 1, m is 1 or 2. It is preferable that when $R_9$ is a straight chain alkyl group or alkenyl group, the straight chain alkyl group or alkenyl group have 12 to 30 carbon atoms, and when $R_9$ is a branched chain alkyl group or alkenyl group, the branched chain alkyl group or alkenyl group include at least a straight chain moiety having 12 to 30 carbon atoms.

Specific examples of the dibasic acid compound represented by general formula (VI) are as follows: 2-dodecyl-pentane diacid, 2-hexadecyl-pentane diacid, 2-octadecyl-pentane diacid, 2-eicosyl-pentane diacid, 2-docosyl-pentane diacid, 2-dodecyl-hexane diacid, 2-pentadecyl-hexane diacid, 2-octadecyl-hexane diacid, 2-eicosyl-hexane diacid, and 2-docosyl-hexane diacid.

In the present invention, as the aliphatic carboxylic acid compound for use in the color developer, tribasic acid compounds such as citric acid acylated by a long chain aliphatic acid can also be employed. Specific examples of such compounds are as follows:

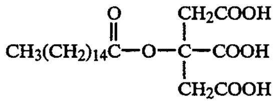

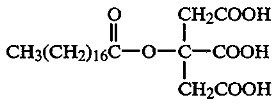

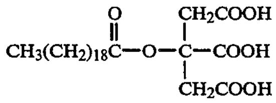

Furthermore, in the present invention, as the phenolic compound for use in the color developer, compounds represented by the following general formula (VII) can be employed:

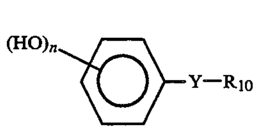

(VII)

wherein Y represents —S—, —O—, —CONH—, or —COO—; and $R_{10}$ represents a straight chain or branched chain alkyl group or alkenyl group having 12 or more carbon atoms. It is preferable that when $R_{10}$ is a straight chain alkyl group or alkenyl group, the straight chain alkyl group or alkenyl group have 12 to 30 carbon atoms, and when $R_{10}$ is a branched chain alkyl group or alkenyl group, the branched chain alkyl group or alkenyl group include at least a straight chain moiety having 12 to 30 carbon atoms.

Specific examples of the phenolic compounds represented by general formula (VII) are as follows: p-(dodecylthio)phenol, p-(tetradecylthio)phenol, p-(hexadecylthio)phenol, p-(octadecylthio)phenol, p-(eicosylthio)phenol, p-(docosylthio)phenol, p-(tetracosylthio)-phenol, p-(dodecyloxy)phenol, p-(tetradecyloxy)-phenol, p-(hexadecyloxy)phenol, p-(octadecyloxy)-phenol, p-(eicosyloxy)phenol, p-(docosyloxy)phenol, p-(tetracosyloxy)phenol, p-dodecylcarbamoylphenol, p-tetradecylcarbamoylphenol, p-hexadecylcarbamoylphenol, p-octadecylcarbamoylphenol, p-eicosylcarbamoylphenol, p-docosylcarbamoylphenol, p-tetracosylcarbamoylphenol, hexadecylgallate, octadecylgallate, eicosylgallate, docosylgallate, and tetracosylgallate.

The reversible thermosensitive coloring composition of the present invention comprises as the main components the above-mentioned color developer and a coloring agent. As the coloring agent for use in the present invention, the following electron-donor compounds can be employed. These coloring agents are colorless or light-colored before the color formation is induced in them. Examples of such compounds are conventionally known triphenylmethane phthalide compounds, fluoran compounds, phenothiazine compounds, leuco auramine compounds and indolinophthalide compounds.

Specific examples of such coloring agents are as follows:

3,3-bis(p-dimethylaminophenyl)-phthalide,
3,3-bis(p-dimethylaminophenyl)-phthalide,
3,3-bis(p-dimethylaminophenyl)-6-dimethylaminophthalide (or crystal Violet Lactone),
3,3-bis(p-dimethylaminophenyl)-6-diethylaminophthalide,
3,3-bis(p-dimethylaminophenyl)-6-chlorophthalide,
3,3-bis(p-dibutylaminophenyl)phthalide,
3-(N-p-tolyl-N-ethylamino)-6-methyl-7-anilinofluoran,
3-pyrrolidino-6-methyl-7-anilinofluoran,
2-[N-(3′-trifluoromethylphenyl)amino]-6-diethylaminofluoran,
2[3,6-bis(diethylamino)-6-(o-chloroaniline)xanthylbenzoic acid lactam],
3-diethylamino-6-methyl-7-(m-trichloromethylanilino)-fluoran,
3-diethylamino-7-(o-chloroanilino)fluoran,
3-dibutylamino-7-(o-chloroanilino)fluoran,
3-N-methyl-N-amylamino-6-methyl-7-anilinofluoran,
3-N-methyl-N-cyclohexylamino-6-methyl-7-anilinofluoran,
3-diethylamino-6-methyl-7-anilinofluoran,
3-(N,N-diethylamino)-5-methyl-7-(N,N-dibenzylamino)fluoran,
benzoyl leuco methylene blue,
6′-chloro-8′-methoxy-benzoindolino-spiropyran,
6′-bromo-2′-methoxy-benzoindolino-spiropyran,
3-(2′-hydroxy-4′-dimethylaminophenyl)-3-(2′-methoxy-5′-chlorophenyl)phthalide,
3-(2′-hydroxy-4′-dimethylaminophenyl)-3-(2′-methoxy-5′-nitrophenyl)phthalide,
3-(2′-hydroxy-4′-diethylaminophenyl)-3-(2′-methoxy-5′-methylphenyl)phthalide, 3-(2′-methoxy-4′-dimethylaminophenyl)-3-(2′-hydroxy-4′-chloro-5′-methoxyphenyl)phthalide,
3-morpholino-7-(N-propyl-trifluoromethylaniline)fluoran,
3-diethylamino-5-chloro-7-(N-benzyl-trifluoromethylanilino)fluoran,
3-pyrrolidino-7-(di-p-chlorophenyl)methylaminofluoran,
3-diethylamino-5-chloro-7-(α-phenylethylamino)fluoran, 3-(N-ethyl-p-toluidino)-7-($\alpha$-phenylethylamino)fluoran,
3-diethylamino-7-(o-methoxycarbonylphenylamino)-fluoran,
3-diethylamino-5-methyl-7-($\alpha$-phenylethylamino)fluoran,
3-diethylamino-7-piperidinofluoran,
2-chloro-3-(N-methoxytoluidino)-7-(p-n-butylanilino)-fluoran,
3-(N-methyl-N-isopropylamino)-6-methyl-7-anilinofluoran,
3-dibutylamino-6-methyl-7-anilinofluoran,
3,6-bis(dimethylamino)fluorenespiro(9,3')-6'-dimethylaminophthalido,
3-(N-benzyl-N-cyclohexylamino)-5,6-benzo-7-$\alpha$-naphthylamino-4'-bromofluoran,
3-diethylamino-6-chloro-7-anilinofluoran,
3-N-ethyl-N-(2-ethoxypropyl)amino-6-methyl-7-anilinofluoran,
3-N-ethyl-N-tetrahydrofurfurilamino-6-methyl-7-anilinofluoran,
3-diethylamino-6-methyl-7-mesidino-4',5'-benzofluoran,
3-N-methyl-N-isobutyl-6-methyl-7-anilinofluoran,
3-N-ethyl-N-isoamyl-6-methyl-7-anilinofluoran,
3-diethylamino-6-methyl-7-(2',4'-dimethylanilino)fluoran.

As preferable coloring agents for use in the present invention, the compounds represented by the following general formulas (VIII) and (IX) can be employed.

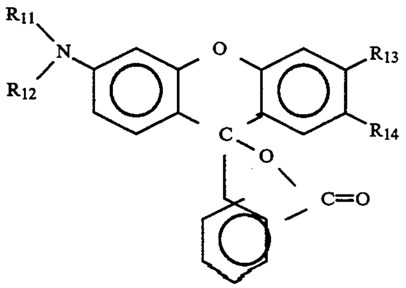

(VIII)

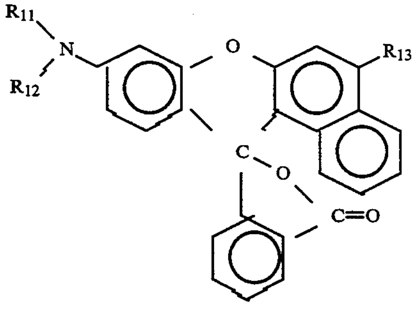

(IX)

wherein $R_{11}$ represents hydrogen or an alkyl group having 1 to 4 carbon atoms, $R_{12}$ represents an alkyl group having 1 to 6 carbon atoms, a cycrohexyl group, or a phenyl group which may have a substituent, $R_{13}$ represents hydrogen, an alkyl group or alkoxyl group having 1 to 2 carbon atoms, or halogen, and $R_{14}$ represents hydrogen, a methyl group, halogen, or an amino group which may have a substituent.

Specific exmaples of such coloring agents are as follows:

3-cyclohexylamino-6-chlorofluoran,
3-dimethylamino-5,7-dimethylfluoran,
3-diethylamino-7-chlorofluoran,
3-diethylamino-7-methylfluoran,
3-diethylamino-6-methyl-7-chlorofluoran,
3-diethylamino-6-methyl-7-(2',4'-dimethylphenyl)aminofluoran,
3-(N-methyl-N-cyclohexyl)amino-6-methyl-7-phenylaminofluoran,
3-(N-propyl-N-methyl)amino-6-methyl-7-phenylaminofluoran,
3-diethylamino-6-methyl-7-phenylaminofluoran,
3-dibutylamino-6-methyl-7-phenylaminofluoran,
3-(N-n-propyl-N-isopropyl)amino-6-methyl-7-phenylaminofluoran,
3-(N-ethyl-N-sec-butyl)amino-6-methyl-7-phenylaminofluoran,
3-diethylamino-7-(m-trifluoromethylphenyl)aminofluoran,
3-(N-n-amyl-N-ethyl)amino-6-methyl-7-phenylaminofluoran,
3-n-octylamino-7-(p-chloro-phenyl)aminofluoran,
3-n-palmitylamino-7-(p-chlorophenyl)aminofluoran,
3-di-n-octylamino-7-(p-chlorophenyl)aminofluoran,
3-(N-n-amyl-N-n-butyl)amino-7-(p-methylcarbonylphenyl)aminofluoran,
3-diethylamino-6-methyl-7-chlorofluoran,
3-(N-ethyl-N-n-hexyl)amino-7-phenylaminofluoran,
3,3-bis(p-dimethylaminophenyl)-6-chlorophthalide,
3-cyclohexylamino-6-chlorofluoran,
3-cyclohexylamino-6-bromofluoran,
3-diethylamino-7-chlorofluoran,
3-diethylamino-7-bromofluoran,
3-dipropylamino-7-chlorofluoran,
3-diethylamino-6-chloro-7-phenylamino-fluoran,
3-pyrrolidino-6-chloro-7-phenylamino-fluoran,
3-diethylamino-6-chloro-7-(m-trifluoromethylphenyl)amino-fluoran,
3-cyclohexylamino-6-chloro-7-(o-chlorophenyl)amino-fluoran,
3-diethylamino-6-chloro-7-(2',3'-dichlorophenyl)amino-fluoran,
3-diethylamino-6-methyl-7-chlorofluoran,
3-dibutylamino-6-chloro-7-ethoxyethylamino-fluoran,
3-diethylamino-7-(o-chlorophenyl)amino-fluoran,
3-diethylamino-7-(o-bromophenyl)amino-fluoran,
3-diethylamino-7-(o-chlorophenyl)amino-fluoran,
3-dibutylamino-7-(o-fluorophenyl)amino-fluoran,
6'-bromo-3'-methoxybenzoindolino-spiropyran,
3-(2'-methoxy-4'-dimethylaminophenyl)-3-(2'-hydroxy-4'-chloro-5'-chlorophenyl)phthalide,
3-(2'-hydroxy-4'-dimethylaminophenyl)-3-(2'-methoxy-5'-chlorophenyl)phthalide,
2-[3,6-bis(diethylamino)]-9-(o-chlorophenyl)amino-xanthylbenzoic acid lactam,
3-N-ethyl-N-isoamylamino-7-chlorofluoran,
3-diethylamino-6-methyl-7-m-trifluoromethylanilinofluoran,
3-pyrrolidino-6-methyl-7-m-trifluoromethylanilinofluoran,
3-(N-cyclohexyl-N-methyl)amino-6-methyl-7-m-trifluoromethylanilinofluoran,
3-morpholino-7-(N-n-propyl-N-m-trifluoromethylphenyl)amino-fluoran,
3-(N-methyl-N-phenylamino)-7-amino-fluoran,
3-(N-ethyl-N-phenylamino)-7-amino-fluoran,
3-(N-propyl-N-phenylamino)-7-amino-fluoran,
3-[N-methyl-N-(p-methylphenyl)amino]-7-amino-fluoran,
3-[N-ethyl-N-(p-methylphenyl)amino]-7-amino-fluoran, 3-[N-propyl-N-(p-methylphenyl)amino]-7-amino-fluoran,
3-[N-methyl-N-(p-ethylphenyl)amino]-7-amino-fluoran,
3-[N-ethyl-N-(p-ethylphenyl)amino]-7-amino-fluoran,
3-[N-propyl-N-(p-ethylphenyl)amino]-7-amino-fluoran,
3-[N-methyl-N-(2',4'-dimethylphenyl)amino]-7-amino-fluoran,
3-[N-ethyl-N-(2',4'-dimethylphenyl)amino]-7-amino-fluoran,
3-[N-propyl-N-(2',4'-dimethylphenyl)amino]-7-amino-fluoran,
3-[N-methyl-N-(p-chlorophenyl)amino]-7-amino-fluoran,
3-[N-ethyl-N-(p-chlorophenyl)amino]-7-amino-fluoran,
3-[N-propyl-N-(p-chlorophenyl)amino]-7-amino-fluoran,
3-(N-methyl-N-phenylamino)-7-methylamino-fluoran,
3-(N-ethyl-N-phenylamino)-7-methylamino-fluoran,
3-(N-propyl-N-phenylamino)-7-methylamino-fluoran,
3-[N-methyl-N-(p-methylphenyl)amino]-7-ethylamino-fluoran,
3-[N-ethyl-N-(p-methylphenyl)amino]-7-benzylamino-fluoran,
3-[N-methyl-N-(2',4'-dimethylphenyl)amino]-7-methylamino-fluoran,
3-[N-ethyl-N-(2',4'-dimethylphenyl)amino]-7-ethylamino-fluoran,
3-[N-methyl-N-(2',4'-dimethylphenyl)amino]-7-benzylamino-fluoran,
3-[N-ethyl-N-(2',4'-dimethylphenyl)amino]-7-benzylamino-fluoran,
3-(N-methyl-N-phenylamino)-7-dimethylamino-fluoran,
3-(N-ethyl-N-phenylamino)-7-dimethylamino-fluoran,
3-[N-methyl-N-(p-methylphenyl)amino]-7-diethylamino-fluoran,
3-[N-ethyl-N-(p-methylphenyl)amino]-7-diethylamino-fluoran,
3-(N-methyl-N-phenylamino)-7-dipropylaminofluoran,
3-(N-ethyl-N-phenylamino)-7-dipropylaminofluoran,
3-[N-methyl-N-(p-methylphenyl)amino]-7-dibenzylamino-fluoran,
3-[N-ethyl-N-(p-methylphenyl)amino]-7-dibenzylamino-fluoran,
3-[N-ethyl-N-(p-methylphenyl)amino]-7-di(p-methylbenzyl)amino-fluoran,
3-[N-methyl-N-(p-methylphenyl)amino]-7-acetylamino-fluoran,
3-[N-ethyl-N-(p-methylphenyl)amino]-7-benzoylamino-fluoran,
3-[N-methyl-N-(p-methylphenyl)amino]-7-(o-methoxybenzoyl)amino-fluoran,
3-[N-ethyl-N-(p-methylphenyl)amino]-6-methyl-7-phenylamino-fluoran,
3-[N-methyl-N-(p-methylphenyl)amino]-6-methyl-7-phenylamino-fluoran,
3-[N-methyl-N-(p-methylphenyl)amino]-6-tert-butyl-7-(p-methylphenyl)amino-fluoran,
3-(N-ethyl-N-phenylamino)-6-methyl-7-[N-ethyl-N-(p-methylphenyl)amino]-fluoran,
3-[N-propyl-N-(p-methylphenyl)amino]-6-methyl-7-[N-methyl-N-(p-methylphenyl)amino]-fluoran,
3-[N-ethyl-N-(p-methylphenyl)amino]-5-methyl-7-benzylamino-fluoran,
3-[N-ethyl-N-(p-methylphenyl)amino]-5-chloro-7-dibenzylamino-fluoran,
3-[N-methyl-N-(p-methylphenyl)amino]-5-methoxy-7-dibenzylamino-fluoran,
3-[N-ethyl-N-(p-methylphenyl)amino]-6-methyl-fluoran,
3-[N-ethyl-N-(p-methylphenyl)amino]-5-methoxy-fluoran,
3-diethylamino-7,8-benzofluoran,
3-(N-ethyl-N-isoamylamino)-7,8-benzofluoran,
3-(N-ethyl-N-n-octylamino)-7,8-benzofluoran,
3-N,N-dibutylamino-7,8-benzofluoran,
3-(N-methyl-N-cyclohexylamino)-7,8-benzofluoran,
3-(N-ethyl-N-p-methylphenylamino)-7,8-benzofluoran,
3-N,N-diallylamino-7,8-benzofluoran, and
3-(N-ethoxyethyl-N-ethylamino)-7,8-benzofluoran.

The color development and decolorization phenomena of the reversible thermosensitive coloring composition of the present invention will now be explained with reference to FIG. 1.

As shown in FIG. 1, the color density of the reversible thermosensitive coloring composition according to the present invention changes depending on the temperature thereof. The abscissa axis of the graph indicates the temperature of the reversible thermosensitive coloring composition, and the ordinate axis of the graph indicates the developed color density on the reversible thermosensitive recording medium.

In FIG. 1, reference symbol A shows the decolorization state of the composition at room temperature, reference symbol B shows the color development state of the composition when the composition is fused by the application of heat thereto, and reference symbol C shows the color development state of the composition at room temperature.

The reversible thermosensitive coloring composition of the present invention is supposed to assume abovementioned decolorization state A. When the temperature of the composition in this state is raised and reaches temperature $T_1$, the color density of the composition begins to increase since the coloring agent and the color developer begin to be fused at the temperature $T_1$. As the temperature of the composition is increased, the developed color density of the composition is increased to reach the color development state B. Even when the temperature of the composition in the state B is decreased to room temperature, the color development state is maintained to reach the state C, passing along the route indicated by the solid line between B and C in the direction of the arrow in FIG. 1.

When the temperature of the coloring composition in the state of C is raised to temperature $T_2$, the image density is decreased and the coloring composition reaches a state D which is a decolorization state. When the temperature of the coloring composition in the state D is decreased, the decolorization state of the coloring composition is maintained, and the composition returns to the initial state A, passing through the route indicated by the broken line in FIG. 1. Thus, in FIG. 1, the temperature $T_1$ is the color development initiation temperature at which the color development begins, and the temperature $T_2$ is the decolorization initiation temperature at which the decolorization begins. The temperature range between $T_1$ and $T_2$ is a decolorization temperature range where the coloring composition assumes a decolorization state.

The color developing and decolorizing phenomenon shown in FIG. 1 is a representative example of the phenomenon when the reversible thermosensitive coloring composition according to the present invention is employed. The color development initiation temperature and the decolorization temperature differ, depending upon the combination of coloring agent and color developer to be employed. The color density in the state B is not always the same as that in the state C. These color densities may be different.

As shown in FIG. 1, the reversible thermosensitive coloring composition according to the present invention in the color development state can be decolorized by the application of heat to a temperature within the above-mentioned decolorization temperature range. The cycle of the color development and decolorization can be repeated in the present invention.

The reversible thermosensitive coloring composition comprising the previously mentioned color developer in combination with an appropriately selected coloring agent can assume a stable color development state and a stable decolorization state which is obtained by the application of heat to a temperature lower than the color development initiation temperature. The decolorization properties and the stable color development state to maintain the recorded image or information are required when the reversible thermosensitive coloring recording medium is used in practice. The coloring composition of the present invention has excellent color development and decolorization properties and is capable of producing highly stable color development state and decolorization state.

The reversible thermosensitive coloring composition according to the present invention comprises as the main components the aforementioned color developer having a long-chain structure and the leuco dye as the coloring agent. There are suitable coloring agents for each color developer. Therefore it is necessary to select a suitable combination of a color developer and a coloring agent for can obtaining satisfactory decolorization and stable color development. The color obtained in the color development state is determined by the structure of the coloring agent, so that the coloring agent is selected in view of this point. A method of selecting the combination of the color developer and the coloring agent will now be explained in detail.

The combination of the color developer and the coloring agent is decided in consideration of the properties obtained, such as the decolorization properties, and the tone of the color in the development state. The decolorization properties are judged by the ease of decolorizing the color in the color development state, which is obtained by heating the coloring agent and the color developer to a temperature above the eutectic temperature thereof, by heating the two to a temperature lower than the eutectic temperature.

Among the above properties, the decolorization properties can be evaluated by the presence or absence of an exothermic peak which can be observed in the course of the temperature-elevation process by the differential thermal analysis (DTA) or differential scanning calorific (DSC) analysis of the coloring composition in the color development state. The exothermic peak corresponds to the decolorizing phenomenon by which the present invention is characterized and serves as a standard for selecting a suitable combination of the coloring agent and the color developer for the coloring composition having excellent decolorization properties.

The relationship between the results of the DTA or DSC analysis and the decolorization properties is shown with reference to the following specific example:

In this example, octadecylphosphonic acid which is previously mentioned as a representative example of the color developer and 3-dibutylamino-7-(o-chlorophenyl)aminofluoran as a coloring agent are employed in the coloring composition. The coloring composition is fused at 175° C., and then promptly cooled, whereby a coloring composition in a color development state was obtained. The results of the DSC analysis of the reversible thermosensitive coloring composition in the color development state are shown in FIGS. 2(*a*) and 2(*b*).

Figure 2A:
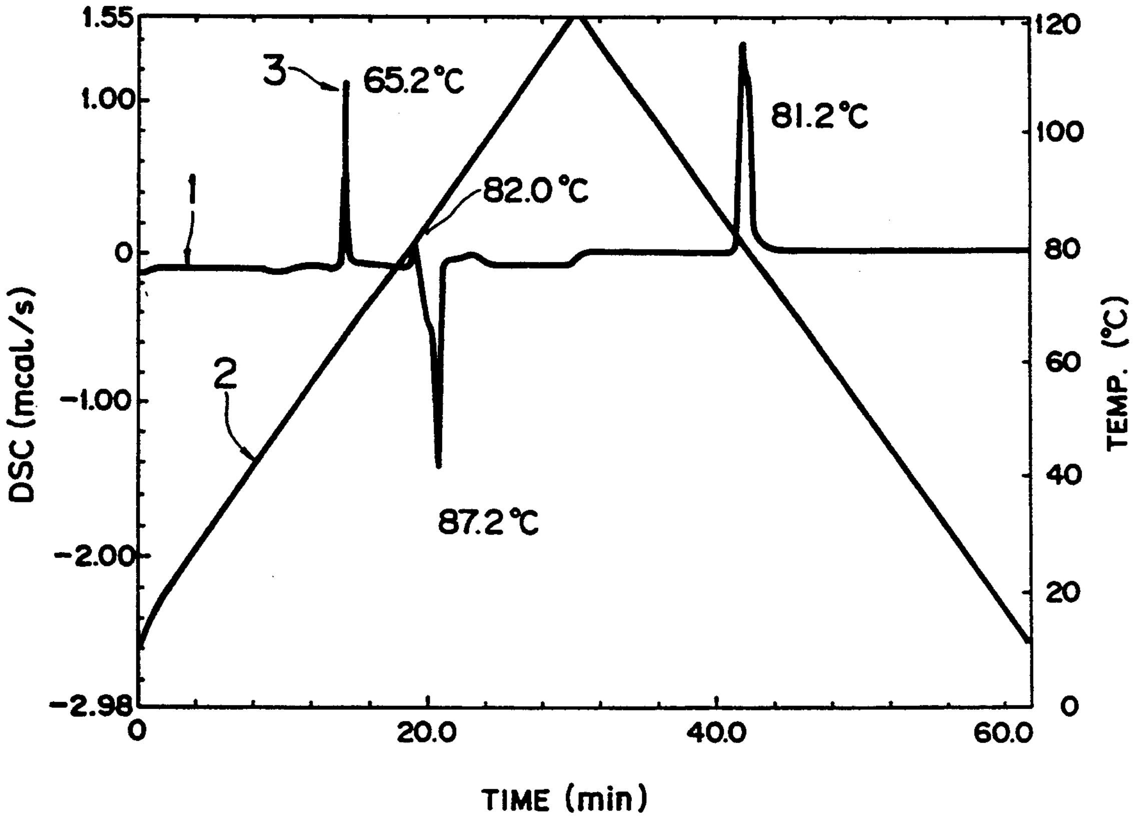
FIG. 2(*a*) is a chart showing the results of a DSC analysis of an example of a reversible thermosensitive coloring composition comprising octadecylphosphonic acid serving as a color developer and 3-dibutylamino-7-(o-chlorophenyl)aminofluoran serving as a coloring agent of the present invention at a temperature elevation rate of 4° C./min.
Figure 2B:
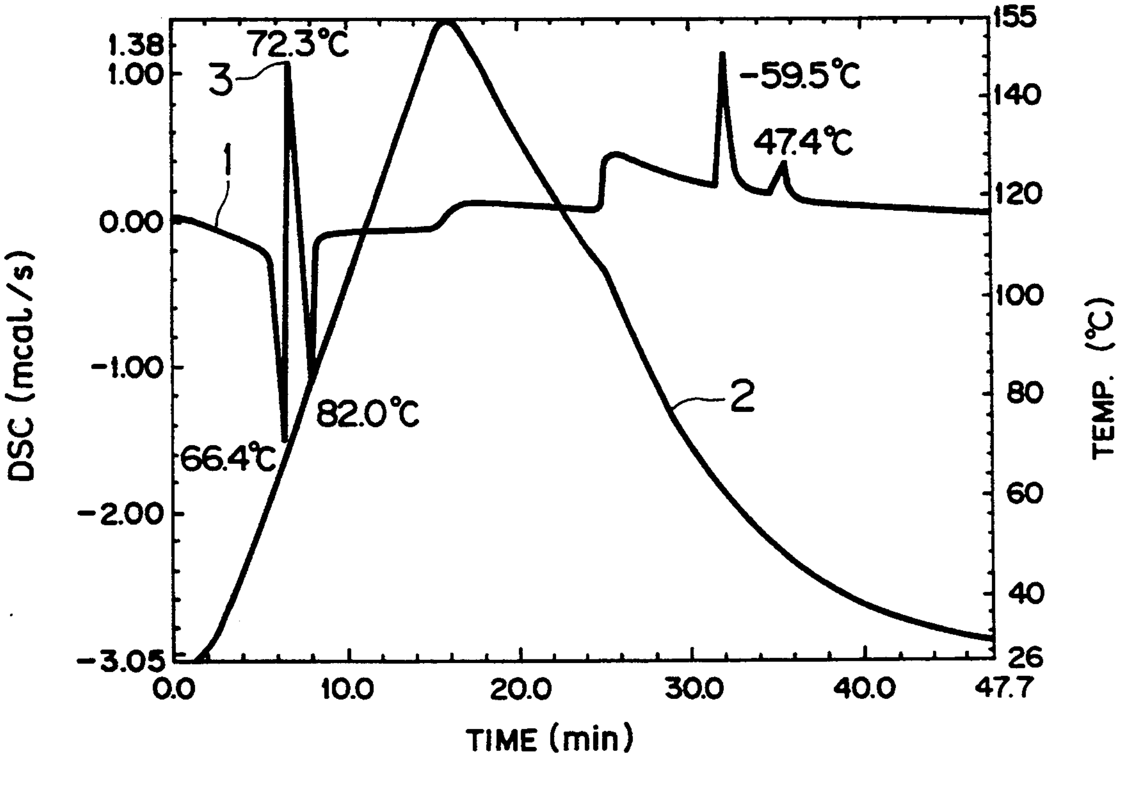

In FIGS. 2(*a*) and 2(*b*), reference numeral 1 indicates a DSC curve which was obtained by the DSC analysis of the coloring composition, reference numeral 2 indicates a temperature curve showing the temperature of the heat applied to the coloring composition, and reference numeral 3 indicates an exothermic peak observed in the course of the elevation of the temperature of the coloring composition.

FIG. 2(*a*) shows the results of the DSC analysis of the coloring composition when the temperature was raised at a rate of 4° C./min, and FIG. 2(*b*) shows the same DSC analysis when the temperature was raised at a rate of 10° C./min. As can be seen from FIGS. 2(*a*) and 2(*b*), the exothermic peak and the endothermic peak differently appear depending on the measuring conditions thereof, and the exothermic peak is clearer in FIG. 2(*a*) than that in FIG. 2(*b*). Therefore, the case where the temperature of the coloring composition was raised at a rate of 4° C./min will now be explained with reference to FIG. 2(*a*).

The coloring composition comprising octadecylphosphonic acid and 3-dibutylamino-7-(o-chlorophenyl)aminofluoran in the color development state assumes an excellent decolorization state when heated once again to 70° C.

Figure 3:
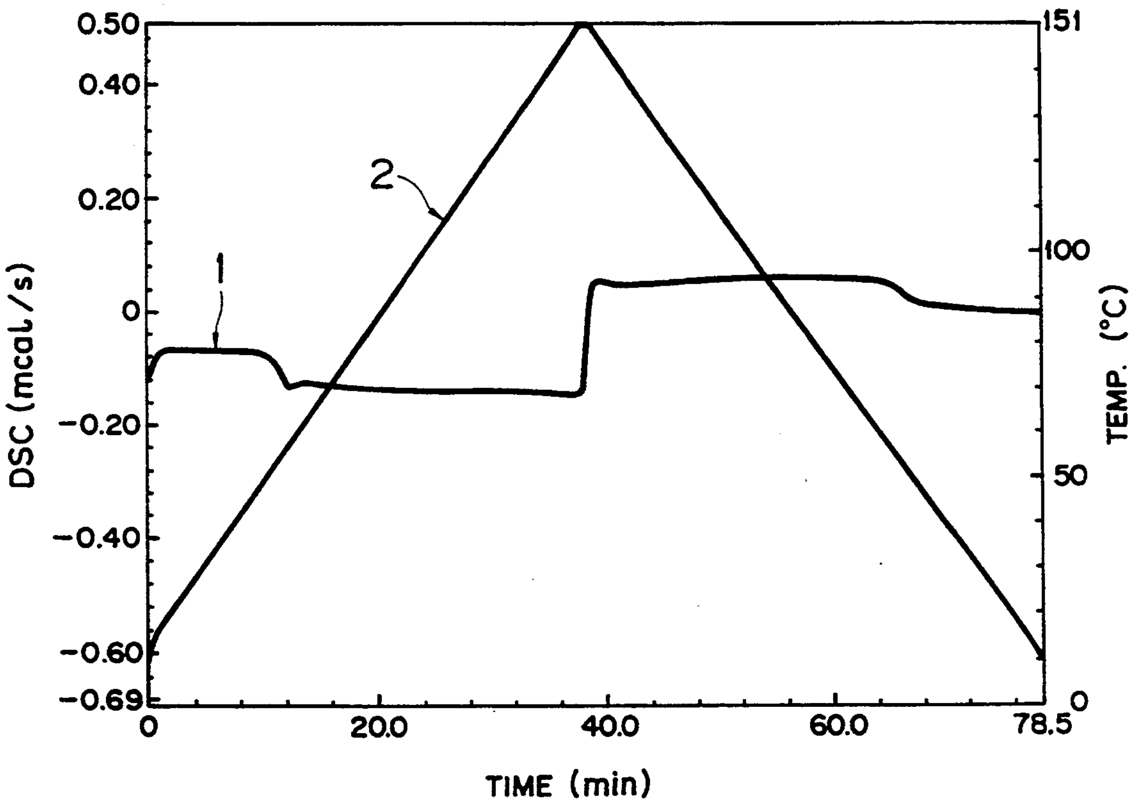
FIG. 3 is a chart showing the results of a DSC analysis of a thermosensitive coloring composition comprising 2,2-bis(p-hydroxyphenyl)propane serving as a color developer and 3-dibutylamino-7-(o-chlorophenyl-)aminofluoran serving as a coloring agent for use in a conventional thermosensitive recording material.

On the other hand, a coloring composition comprising 2,2-bis(p-hydroxyphenyl)propane which is used as a color developer in a conventional thermosensitive recording medium and the above employed 3-dibutylamino-7-(o-chlorophenyl)aminofluoran was subjected to the DSC analysis. The results of the DSC analysis are shown in FIG. 3. In the figure, reference numerals 1 and 2 respectively indicate the same as those in FIGS. 2(*a*) and 2(*b*). The coloring composition with the above-mentioned combination in the color developing condition does not decolorize even when heat is applied thereto to any temperature. As is obvious from the above-mentioned explanation, the exothermic peak is evidently observed in the course of the temperature elevation step in the case where octadecylphosphonic acid is employed, while in the case where 2,2-bis(p-hydroxyphenyl)propane is employed, no exothermic peak is observed. It is also obvious that the presence of the decolorization properties corresponds to the presence of the exothermic peak.

The exothermic peak and the endothermic peak in the DSC analysis generally differently appear, particularly with the sharpness thereof, depending upon the measurement conditions, so that it is necessary that appropriate measurement conditions be selected in the DSC analysis.

Figure 4:
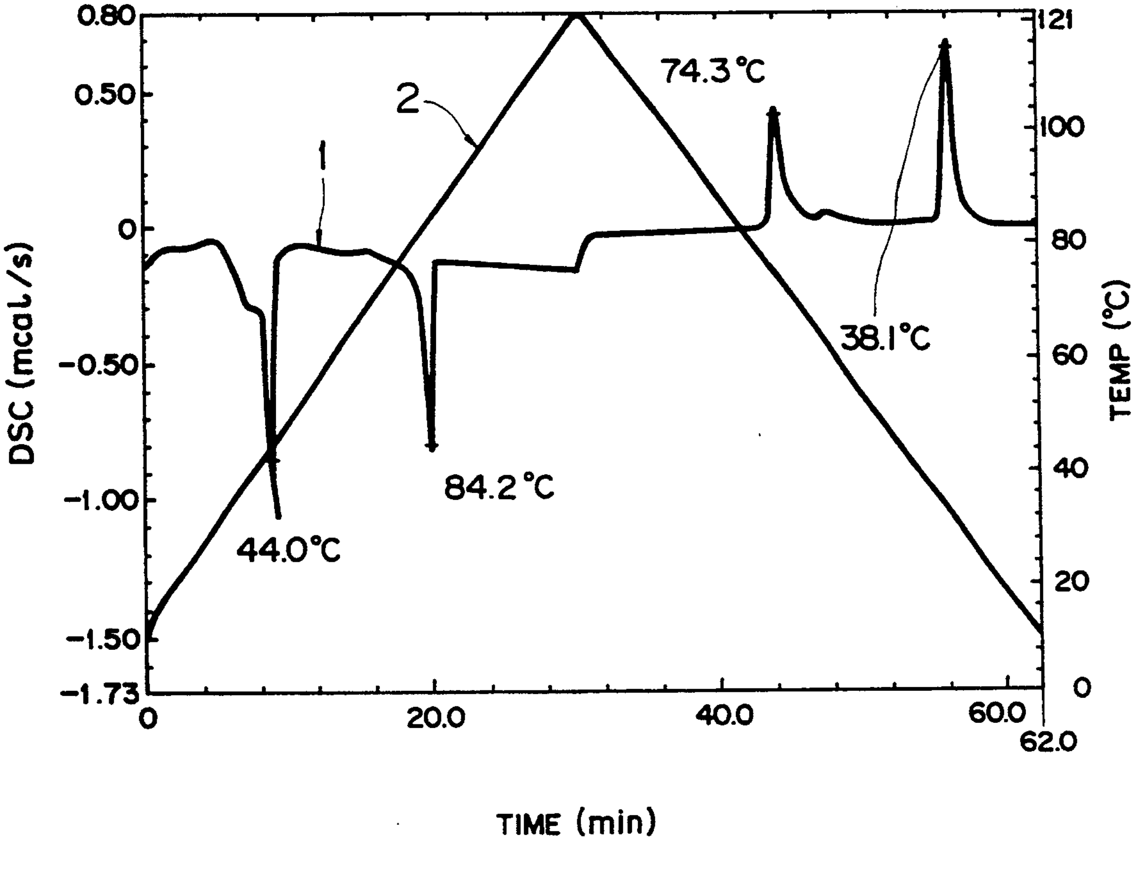
FIG. 4 is a chart showing the results of a DSC analysis of a thermosensitive coloring composition comprising decylphosphonic acid serving as a color developer, having a relatively short alkyl chain, and 3-dibutylamino-7-(o-chlorophenyl)aminofluoran serving as a coloring agent.

FIG. 4 shows the results of the DSC analysis of the case where decylphosphonic acid was employed as a color developer. No exothermic peak is observed when a coloring composition comprising decylphosphonic acid which has a short alkyl chain is employed. Therefore, in this case, the decolorization does not occur with the application of heat to the coloring composition in the color development state.

Figure 5:
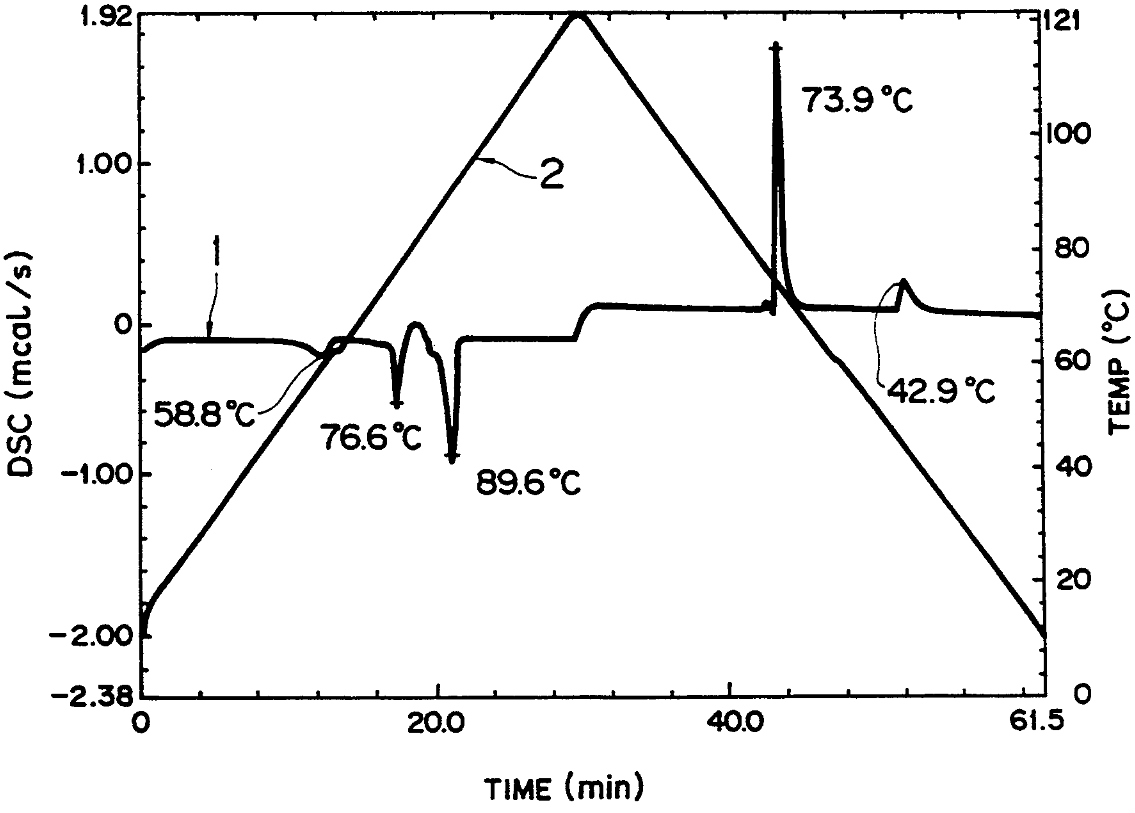
FIG. 5 is a chart showing the results of a DSC analysis of a non-reversible thermosensitive coloring composition comprising octadecylphosphonic acid serving as a color developer and 3-diethylamino-6-methyl-7-phenylamionfluoran sierving as a coloring agent.

FIG. 5 shows the results of the DSC analysis of a coloring composition which comprises octadecylphosphonic acid as a color developer and 3-diethylamino-6-methyl-7-phenylamino-fluoran. In this case, an exothermic peak was not clearly observed. Little decolorization takes place in this coloring composition when heat is applied to the composition in the color development state.

Figure 6:
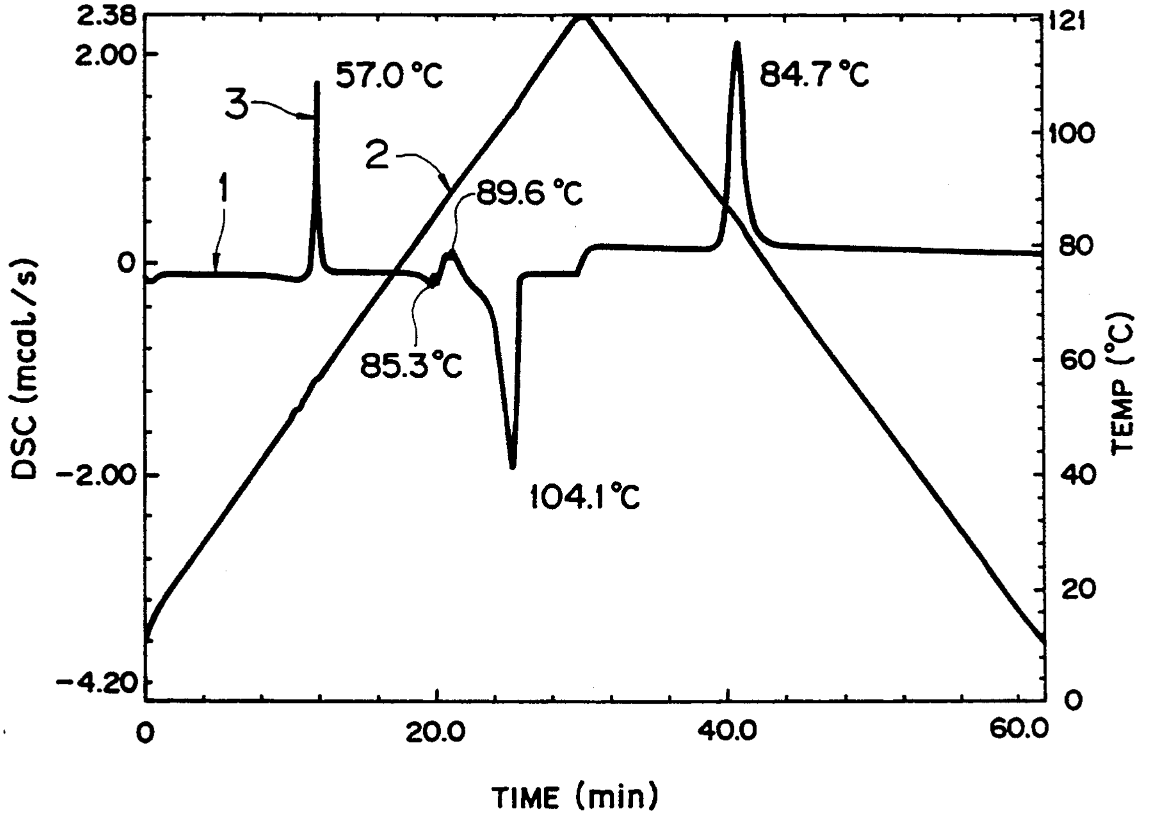
FIG. 6 is a chart showing the results of a DSC analysis of a reversible thermosensitive coloring composition comprising eicosylthiomalic acid serving as a color developer and 3-diethylamino-6-methyl-7-anilinofluoran serving as a coloring agent of the present invention.

FIG. 6 shows the results of the DSC analysis of the case where a coloring composition comprising 3-diethylamino-6-methyl-7-phenylaminofluoran as a coloring agent and eicosyl thiomalic acid was employed. The coloring composition shown in FIG. 6 exhibits excellent decolorizing properties when the coloring composition in the color development state was heated to 70° C., showing a clear exothermic peak during the temperature elevation thereof.

The above results indicate that the combination of the color developers for use in the present invention and a coloring agent suitable for the color developer provides a coloring composition in the color development state, which exhibits excellent decolorization properties heat is applied thereto. The coloring agent which is suitable for the color developer for use in the present invention can beselected bythe resultsof the DTA or DSC analysis of the coloring composition.

The coloring of the reversible thermosensitive coloring composition according to the present invention which comprises the color developer and the coloring agent takes place when the color developer and the coloring agent are heated to the eutectic temperature thereof and react to produce a colored material, and the colored stat can be maintained even by cooling the same to room temperature. Since this coloring composition has a decolorization temperature range at lower temperatures than the eutectic temperature of the coloring composition, it is desirable to promptly cool the coloring composition in the color development state in order to maintain the color development state at room temperature.

If the coloring composition in the color development state is gradually cooled, the color density is often decreased because of the occurrence of the decolorization at the stage passing through the decolorization temperature range.

It is considered that the colored material which is produced by the reaction between the coloring agent and the color developer is in the state where the lactone ring of the coloring agent is open. The coloring composition, after cooled from the fused state, contains the colored material, the molecules of the color developer and the coloring agent which does not directly contribute to the formation of the colored material. In the color development state of the coloring composition, all of these components are solidified by the cohesive forces therebetween. In most of conventional thermosensitive coloring compositions in a color development state, these components are not solidified.

The coloring composition according to the present invention is solid in the color development state. In many cases this aggregation structure of the solidified coloring composition has some regularities. The degree of the regularities depends on the combination or mixing ratio of the color developer and the coloring agent, and the cooling conditions for the coloring composition. It is considered that the aggregation structure of the coloring composition is supported mainly by the cohesion force which works between the long-chain moiety of the color developer which constitutes the colored material and the long-chain moiety of the excessive color development. Such an aggregation structure is considered to relate to the decolorization phenomenon of the coloring composition.

Figure 7A:
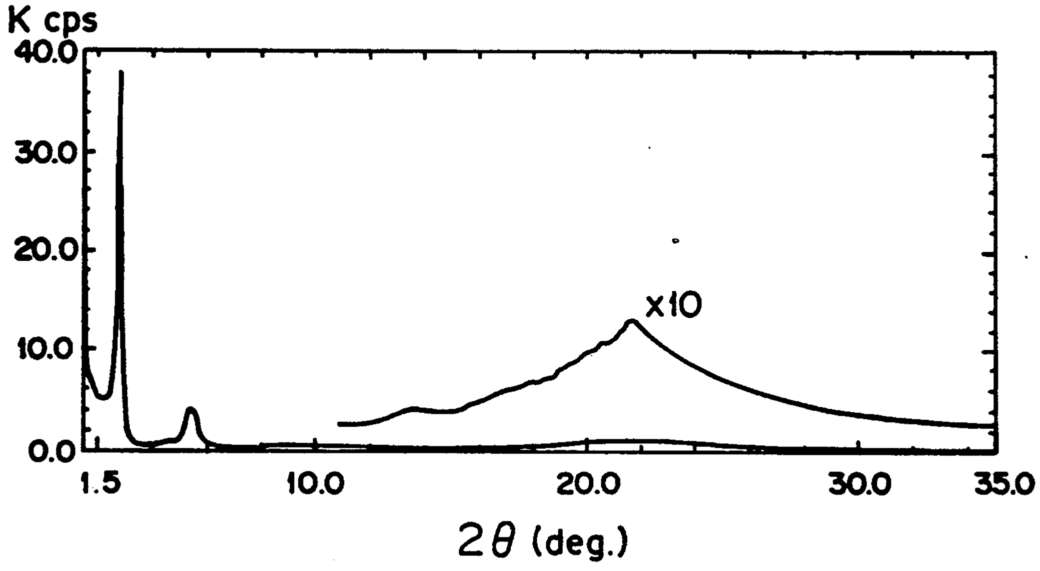
FIG. 7(*a*) is an x-ray diffraction chart showing the aggregation state of a reversible thermosensitive coloring composition comprising octadecylphosphonic acid serving as a color developer and 3-dibutylamino-7-(o-chlorophenyl)aminofluoran serving as a coloring agent with a molar ratio of 5:1 of the present invention.
Figure 7B:
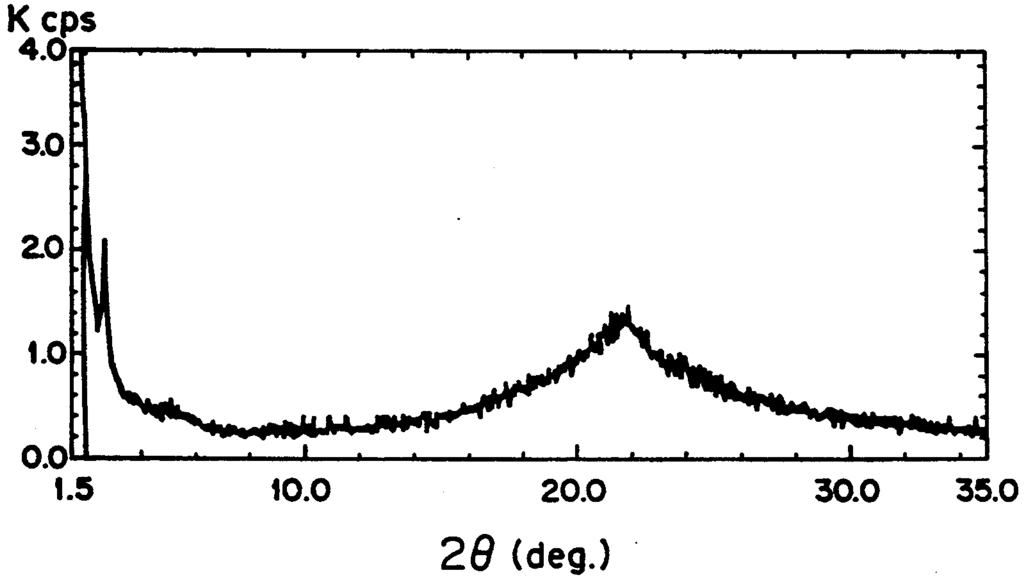

FIGS. 7(*a*) and 7(*b*) show the x-ray diffraction charts of examples of the aggregation structure of the reversible thermosensitive coloring composition of the present invention in the color development state, which comprises octadecylphosphonic acid as the color developer and 3-dibutylamino-7-(o-chlorophenyl)aminofluoran as the coloring agent. This coloring composition is obtained by heating to 175° C., followed by prompt cooling.

More specifically, FIG. 7(*a*) shows the x-ray diffraction chart of the above coloring composition in the color developing state, in which the molar ratio of the color developer to the coloring agent is (5:1), and FIG. 7(*b*) shows the x-ray diffraction chart of the coloring composition in the color development state in which the molar ratio of the color developer to the coloring agent is (2:1).

FIG. 7(*a*) shows that the coloring composition has a distinct lamellar structure, because strong peaks are regularly observed on a low angle side. The layer spacing in this lamellar structure is considered to be created by the aggregation of color developer molecules having a long-chain structure.

Moreover, a broad X-ray diffraction peak which shows the regularity between the long-chain alkyl groups near 21.6° in FIG. 7(*a*). This indicates that the alkyl chains are not in a clear packing state, but the alkyl chains are arranged almost in one direction to form an aggregation state.

On the other hand, the coloring composition shown in FIG. 7(*b*) has a less clear lamellar structure than that of the coloring composition shown in FIG. 7(*a*). However, since an X-ray diffraction peak is observed near 21.6° as in the case of the coloring composition shown in FIG. 7(*a*), it is considered that the alkyl chains are arranged almost in one direction to form an aggregation state. The regularity of the aggregation structure differs depending on the kind of material employed. In the reversible thermosensitive coloring compositions comprising the particular color developers for use in the present invention in the color developing state, the aggregation structure of the alkyl chains can be commonly observed.

The key feature of the coloring composition according to the present invention is the use of such color developers which form the above-mentioned aggregation structure of the long alkyl chains in the color development state because of the cohesive forces thereof.

The reversible thermosensitive coloring composition according to the present invention in the color development state can be decolorized by the application of heat to the previously described specific temperature range. The aggregation structure in the color development is changed as in the course of the decolorization process to reach a state where the molecule of the color developer is separated in the form of crystals from the colored material, so that a stable decolorization state is attained.

Figure 8B:
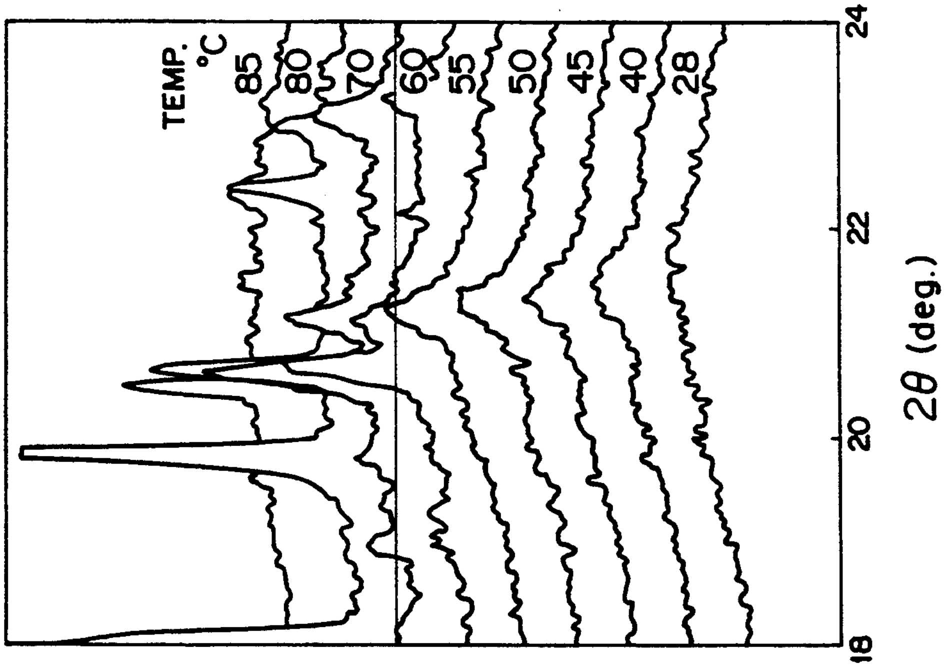
FIG. 8(*a*) is a chart showing the changes in the x-ray diffraction of a reversible thermosensitive coloring composition comprising octadecylphosphonic acid serving as a color developer and 3-dibutylamino-7-(o-chlorophenyl)aminofluoran serving as a coloring agent in the decolorization process with temperature elevation on a lower angle side.
Figure 8A:
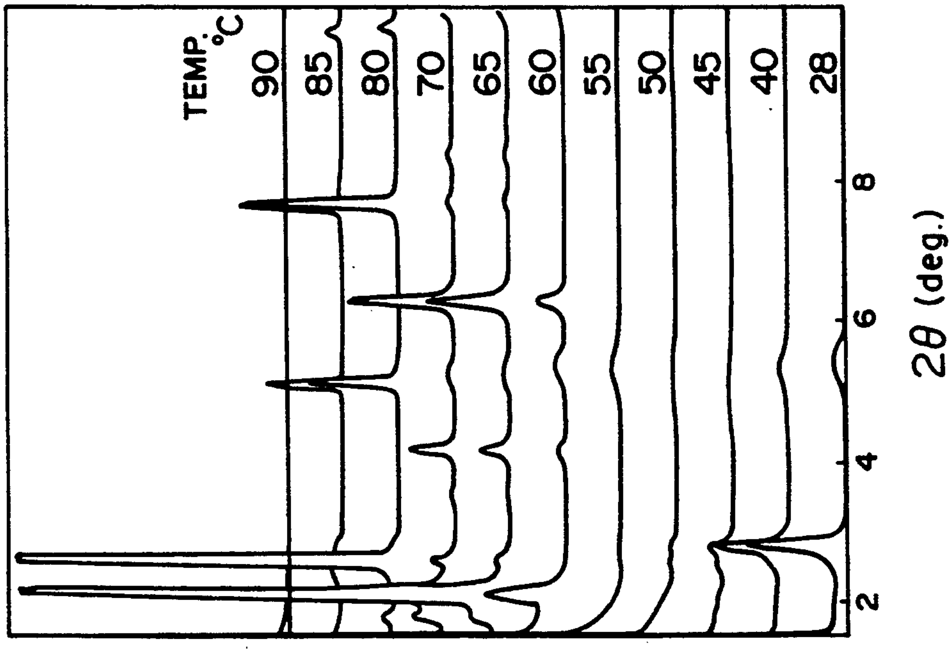

FIGS. 8(*a*) and 8(*b*) are graphs which shows the changes in the X-ray diffraction of the coloring composition as shown in FIG. 7(*a*) in the course of the decolorization process. More specifically, the molar ratio of octadecylphosphonic acid to 3-dibutylamino-7-(o-chlorophenyl)aminofluoran in the coloring composition is (5:1).

FIG. 8(*a*) shows the changes in the X-ray diffraction on a lower angle side in the course of the decolorization process, and FIG. 8(*b*) shows the changes in the X-ray diffraction on a higher angle side in the course of the decolorization. The decolorization initiation temperature of the coloring composition is around at 60° C. Peaks which indicate the lamellar structure on the lower angle side gradually disappear before the elevated temperature reaches the decolorization initiation temperature (about 60° C.). On the other hand, peaks which indicate the regularity of the long chain moiety on the higher angle side becomes more evident. At the decolorization temperature are observed peaks which are different from the peaks indicating the presence of single crystals of the color developer observed in the color development state.

The changes in the X-ray diffraction indicate that the lamellar structure in the color development state gradually collapses in the course of the decolorization process to form a more regular aggregation of the long alkyl chain moiety in a stable packing state, and the single crystals of the color developer are formed to reach the decolorization state. Thus, in the present invention, the long alkyl chain moiety of the color developer is considered to play an important role in the formation of the aggregation structure in the color development process, and the above described decolorization process. This is another key feature of the reversible thermosensitive coloring composition.

The decolorization initiation temperature of the reversible thermosensitive coloring composition according to the present invention can be controlled by changing the length of the alkyl chain of the color developer because of the above-mentioned decolorization mechanism. More specifically, the cohesive force and the mobility of the color developer differ depending upon the length of the alkyl chain.

Figure 9:
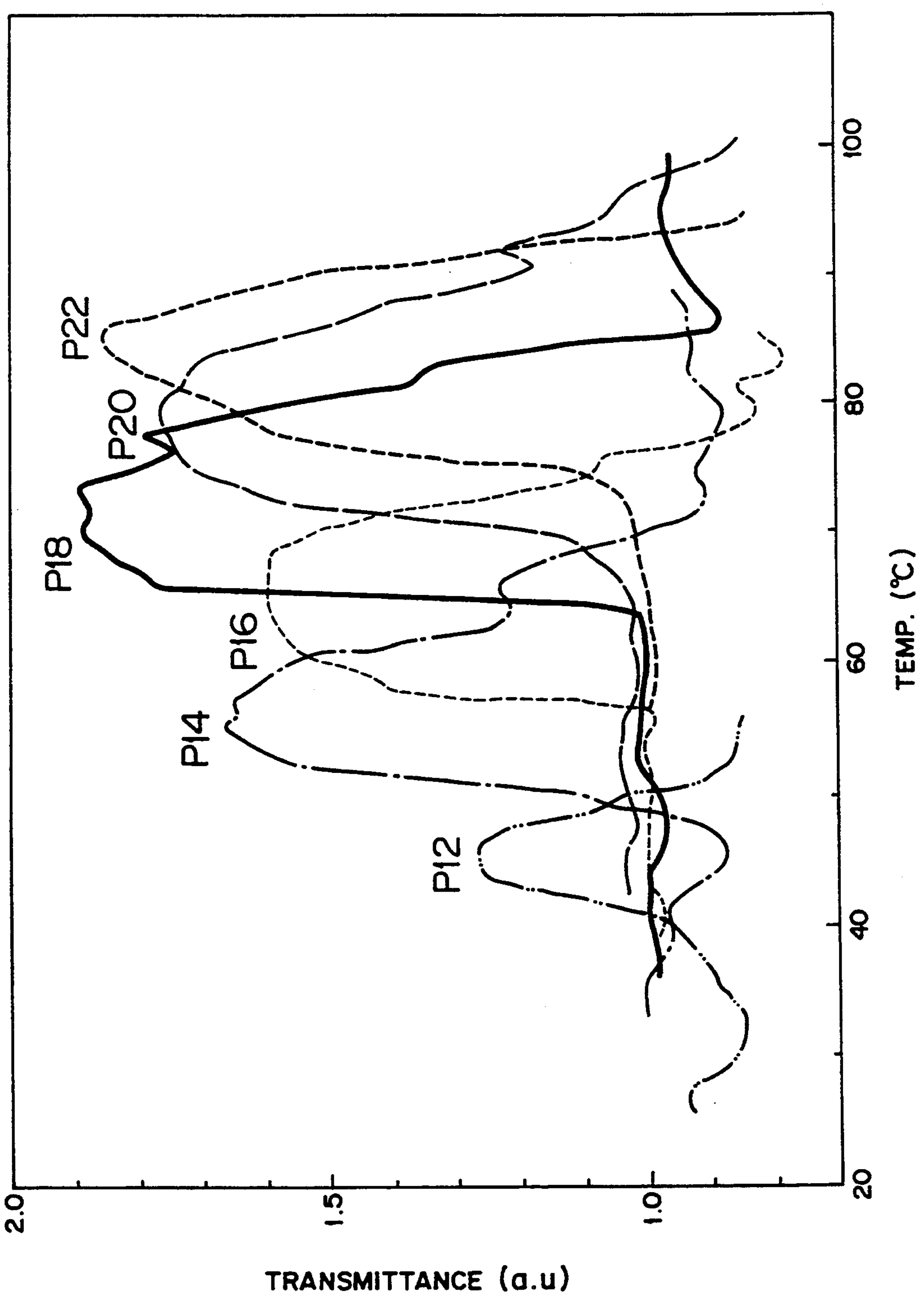
FIG. 9 is diagram showing the changes of the decolorization temperature range of a reversible thermosensitive coloring composition comprising an alkyl phosphonic acid serving as a color developer and 3-dibutylamino-7-(o-chlorophenyl)aminofluoran of the present invention, depending upon the length of the alkyl chain of the color developer, in which the number suffixed to P indicates the number of the carbon atoms of the alkyl chain.

FIG. 9 shows the change of the decolorization temperature range in the case of a coloring composition comprising phosphonic acid as a color developer and 3-dibutylamino-7-(o-chlorophenyl)aminofluoran as a coloring agent in the color development state when the length of the alkyl chain of the phosphonic acid is changed.

More specifically, the changes in the optical transmittance of the coloring composition is measured as the temperature of the coloring composition in the color development state is increased. In this measurement, the initial optical transmittance of the coloring composition is supposed to be 1.0 as shown in FIG. 9.

Therefore in this graph, the temperature at which each curve begins to rise corresponds to the decolorization initiation temperature. The number of each of P16 to P22 affixed to each curve indicates the number of the carbon atoms of the alkyl chain of each phosphonic acid. The decolorization initiation temperature depends upon the length of the phosphonic acid. The longer the alkyl chain, the higher the decolorization initiation temperature and the color development initiation temperature. As a result, as the length of the alkyl chain increases, the decolorization temperature range is shifted toward a higher temperature side in the graph.

It is necessary to use the coloring agent and the color developer in an appropriate ratio in accordance with the properties of the compound employed. It is preferable that molar ratio of the coloring agent to the color developer be in the range of (1:1) to (1:20), and more preferably in the range of (1:2) to (1:10), to obtain an appropriate color density for use in practice.

Even if the molar ratio of the coloring agent to the color developer is in the above-mentioned preferable range, when the amount of the color developer is larger than that of the coloring agent, the decolorization initiation temperature tends to be lowered, while when the amount of the color developer is smaller than that of the coloring agent, the decolorization becomes sensitive to the changes in the temperature. Therefore, the ratio of the coloring agent to the color developer should be decided with the usage and the purpose thereof taken into consideration.

Additives for controlling the crystallization of the color developer can be add to the reversible thermosensitive coloring composition of the present invention for improving its properties such as decolorization properties and the preservability thereof.

A reversible thermosensitive coloring recording medium according to the present invention, which utilizes the above discussed reversible thermosensitive coloring composition, will now be explained.

Figure 10:
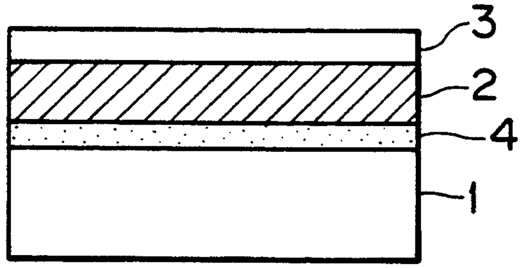
FIG. 10 is a schematic cross-sectional view of a basic structure of a reversible thermosensitive coloring recording medium according to the present invention.

FIG. 10 shows an example of the reversible thermosensitive recording medium of the present invention, which comprises a support 1, an undercoat layer 4 formed thereon, a reversible thermosensitive recording layer 2 comprising the thermosensitive coloring composition overlaid on the undercoat layer 4, and a protective layer 3 formed on the reversible thermosensitive recording layer 2.

Any materials which can support the recording layer 2 thereon can be employed as the materials for the support 1. For example, paper, synthetic paper, a plastic film, a composite film of the paper and the plastic film, and a glass plate can be employed.

The recording layer can be in any form as long as the the reversible thermosensitive coloring composition can be contained therein. If necessary, a binder resin can be added to the recording layer in order to hold the color developer and the coloring agent in the form of a layer.

As the binder resin, for example, polyvinyl chloride, polyvinyl acetate, vinyl chloride-vinyl acetate copolymer, polystyrene, styrene copolymers, phenoxy resin, polyester, aromatic polyester, polyurethane, polycarbonate, polyacrylic acid ester, polymethacrylic acid ester, acrylic acid copolymer, maleic acid copolymer, and polyvinyl alcohol can be employed.

Moreover, micro-capsuled color developers and coloring agents can be employed. The color developers and coloring agents can be micro-capsuled by conventional methods such as the coacervation method, the interfacial polymerization method, or the in-situ polymerization method.

The recording layer can be formed by a conventional method. More specifically, a coloring agent and a color developer are uniformly dispersed or dissolved in water or in an organic solvent, together with a binder resin to prepare a coating liquid. The thus prepared coating liquid is coated on the support and dried, whereby a recording layer is formed.

When no binder resin is employed, the color developer and the coloring agent are fused to prepare a fused film, and the fused film is then cooled to prepare the recording layer.

The binder resin employed in the recording layer serves to maintain the reversible thermosensitive coloring composition in a uniformly dispersed state in the recording layer even when the color development and the decolorization are repeated. It is preferable that the binder resin have high heat resistance. This is because if the binder resin does not have high heat resistance, the reversible thermosensitive coloring composition is caused to coagulate and the presence thereof becomes non-uniform during the application of heat for the color development of the recording layer.

Examples of preferable binder resins for use in the recording layer are phenoxy resin and aromatic polyester, since they can impart high durability to the recording layer for the repeated use thereof. More specifically, when phenoxy resin is employed as a binder resin, the durability of the recording medium can be so improved that the recording layer is not caused to deteriorate even by the application of heat or pressure by a thermal head. This is because phenoxy resin has excellent heat resistance and thermal stability, and high and satisfactory transparency, mechanical strength and film-forming properties. When aromatic polyester is employed as a binder resin, the recording medium is prevented from the deformation and the formation of defective images. This is because aromatic polyester has high mechanical strength, and hardness, excellent transparency and good film-forming properties. Therefore, the durability of the recording medium comprising any of the above-mentioned resins can be maintained even if the recording medium is used repeatedly.

The phenoxy resin for the recording layer of the recording medium according to the present invention is a high-molecular-weight material obtained from the reaction between bisphenol A and epichlorohydrin. The phenoxy resin is commercially available under the trademarks such as "PKHC", "PKHJ" and "PKHH" from Union Carbide Japan K.K.

The aromatic polyester for the recording layer of the recording medium of the present invention is represented by the following general formula:

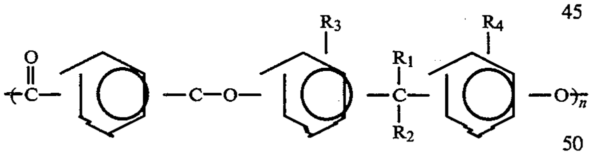

wherein $R_1$ and $R_2$ each represent an alkyl group or a cycloalkyl group, and $R_3$ and $R_4$ each represent an alkyl group or an alkoxy halogen group.

The above aromatic polyester is commercially available under the trademarks such as "U-100", "U-400", "P-1000", "P-1001", "P-1060", "U-4015", "U-5001" and "U-6000" from Unitika Ltd. These can be used alone or in combination.

Cured resins can be employed as binder resins for the recording layer of the reversible thermosensitive recording medium according to the present invention.

Examples of the cured resins include thermosetting resins and ultraviolet curing resins. When a thermosetting resin or ultraviolet curing resin is employed as a binder resin for the recording layer, the durability of the reversible thermosensitive recording medium against the heat and pressure applied in the course of image formation, for instance, by use of a thermal head, is significantly improved, and images with high density can be obtained.

As a matrix resin for the recording layer for use in the present invention, thermosetting resins such as phenol resin, epoxy resin, epoxy resin of a type A of bisphenol, xylene resin, guanamine resin, vinyl ester resin, unsaturated polyester resin, furan resin, polyimide, urethane resin, poly-p-hydroxy benzoic acid, maleic acid resin, melamine resin and urea resin, can be employed.

In addition, as the ultraviolet-curing resin for the recording layer, all monomers and oligomers (or prepolymers), which can be polymerized by ultraviolet-light irradiation to produce a cured resin, can be employed. Examples of such monomers and oligomers are (poly)ester acrylate, (poly)urethane acrylate, epoxy acrylate, polybutadiene acrylate, silicone acrylate and melamine acrylate. The (poly)ester acrylate can be obtained by the reaction of a polyhydric alcohol such as 1,6-hexadiol, propylene glycol (as propylene oxide) or diethylene glycol, a polybasic acid such as adipic acid, phthalic acid, or trimellitic acid, and acrylic acid. Examples of such (poly)ester acrylates are shown as follows:

(a) adipic acid/1,6-hexadiol/acrylic acid $$CH_2{=}CHCOO{+}CH_2)_5[O{-}CO{-}(CH_2)_4COO{+}CH_2)_5]_nOCOCH{=}CH_2$$

wherein n is an integer of 1 to 10.

(b) anhydrous phthalic acid/propylene oxide/acrylic acid

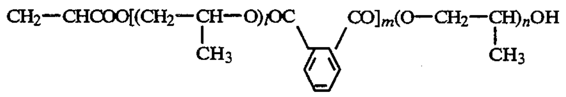

wherein l, m and n are each an integer of 1 to 10.

(c) trimellitic acid/diethylene glycol/acrylic acid

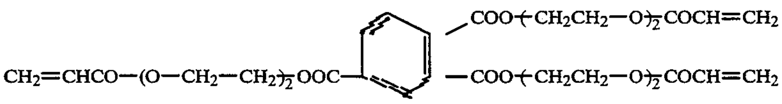

(Poly)urethane acrylate can be obtained by the reaction of a compound having an isocyanate group such as tolulene-diisocyanate (TDI) with an acrylate having a hydroxyl group. An example of the (poly)urethane acrylate is shown below in (d). HEA, HDO and ADA respectively stand for 2-hydroxyethyl acrylate, 1,6-hexanediol and adipic acid.

(d) HEA/TDI/HDO/ADA/HDO/TDI/HEA

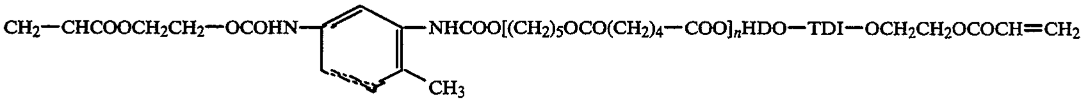

wherein n is an integer of 1 to 10.

Epoxy acrylates can be roughly classified in accordance with the structure into bisphenol A, novolak and alicyclic types. The epoxy acrylates are such compounds in which the epoxy group of epoxy resin is esterified by acrylic acid to convert the function group into an acryloyl group. Examples of the epoxy acrylates are shown below in (e) to (g).

(e) Bisphenol A-epichlorohydrin/acrylic acid

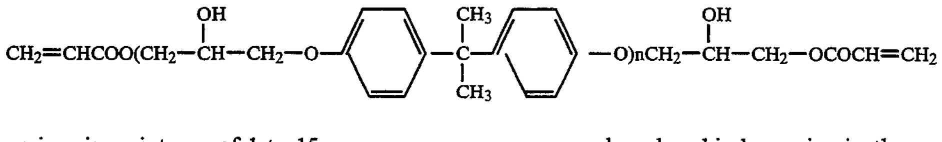

wherein n is an integer of 1 to 15.

(f) Phenol novolak-epichlorohydrin type/acrylic acid

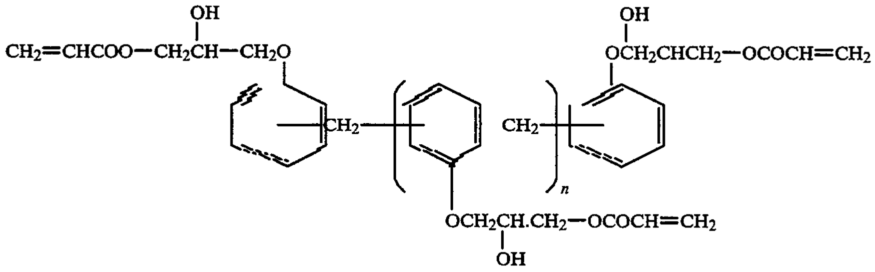

wherein n is a integer of 0 to 5.

(g) Alicyclic type/acrylic acid

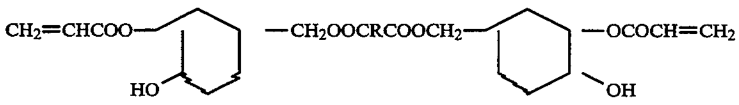

wherein R represents —$(CH_2)$—n, and n is an integer of 1 to 10.

Polybutadiene acrylate can be obtained by allowing 1,2-polybutadiene having OH groups at the terminals thereof to react with isocyanate or 1,2-mercaptoethanol and then with acrylic acids. An example of the polybutadiene is shown below in (h).

(h)

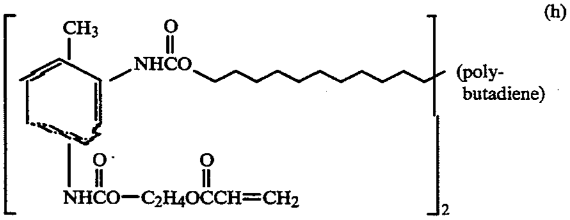

Silicone acrylate is a methacrylic-modified compound by the condensation reaction (demethanolation reaction) of an organfunctional trimethoxysilane and polysiloxane having a silanol group. An example of the silicone acrylate is shown below in (i).

(i)

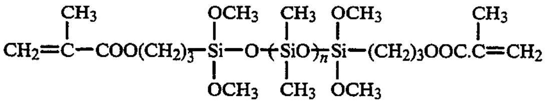

wherein n is an integer of 10 to 14.

Aqueous emulsificated hydrophobic polymers can be employed as binder resins in the present invention. It has been comfirmed that conventional water-soluble polymers are not suitable as binder resins for use with the coloring developer, because the dispersibility of the color developer in the water-soluble polymers is poor, a coating liquid prepared from the color developer and the water-soluble polymers has the shortcomings that foams are formed by expansion, the viscosity thereof is high and the filtration cannot be done smoothly, so that when the coating liquid is coated on a support made of paper and dried, the developed color density is low, and the reversibility between the color development and the decolorization is lost.

According to the present invention, such problems can be solved by use of the aqueous emulsificated hydrophobic polymers.

Examples of the aqueous emulsificated hydrophobic polymers include polyacrylate, polymethacrylate, polyvinyl acetate, vinyl acetate-vinyl chloride copolymer, styrene-butadiene copolymer, acrylonitrile-butadiene copolymer, styrene-acrylate copolymer, ethylene-vinyl acetate copolymer, and polyurethane. The pH of each of the aqueous emulsions of the above hydrophobic polymers is maintained in the range of 6.0 to 9.0. When the pH is 6.0 or less, the fogging occurs in the coating liquid, while when the pH is beyond 9.0, the coloring development performance of the recording layer is lowered.

Comventional water-soluble polymers can be employed in combination with the above aqueous emulsificated hydrophobic polymers. Examples of such water-soluble polymers include polyvinyl alcohol, hydroxyethyl cellulose, carboxymethyl cellulose, methyl cellulose, gelatin, casein, starch, sodium polyacrylate, polyvinyl pyrrolidone, polyacrylamide, maleic acid copolymer, and acrylic acid copolymer. When the water-soluble polymer is used in combination with the aqueous emulsificated hydrohobic polymer, it is preferable that the amount of the hydrophobic polymer be 50 wt. % or more of the total amount of the binder resins.

In the present invention, it is preferable that 0.5 to 5 parts by weight, more preferably 2 to 4 parts by weight, of the color developer be employed per one part by weight of the coloring agent.

Furthermore, it is preferable that 0.5 to 10 parts by weight, more preferably 2 to 5 parts by weight, of the binder resin be employed per one part by weight of the coloring agent.

Additionally, the light-resistance of the reversible thermosensitive coloring recording medium of the present invention can be improved by containing a light stabilizer in the recording layer. As the light stabilizer for use in the present invention, an ultraviolet absorber, an antioxidant, an anti-aging agent, a singlet-oxygen quenching agent, a superoxide-anion quenching agent can be employed.

Specific examples of the ultraviolet absorber are benzophenone-based ultraviolet absorbers such as 2,4-dihydroxy-benzophenone, 2-hydroxy-4-methoxybenzophenone, 2-hydroxy-4-n-octoxybenzophenone, 4-dodecyloxy-2-hydroxybenzophenone, 2,2′-dihydroxy-4-methoxybenzophenone, 2,2′-dihydroxy-4,4′-dimethoxybenzophenone, 2,2′,1,4′-tetrahydrobenzophenone, 2-hydroxy-4-methoxy-2′-carboxybenzophenone, 2-hydroxy-4-oxybenzylbenzophenone, 2-hydroxy-4-chlorobenzophenone, 2-hydroxy-5-chlorobenzophenone, 2-hydroxy-4-methoxy-4′-methylbenzophenone, 2-hydroxy-4-n-heptoxybenzophenone, 2-hydroxy-3,6-dichloro-4-methoxybenzophenone, 2-hydroxy-3,6-dichloro-4-ethoxybenzophenone, 2-hydroxy-4-(2-hydroxy-3-methylacryloxy)propoxybenzophenone; benztriazole-based ultraviolet absorbers such as 2-(2′-hydroxy-5′-methylphenone)benzotriazole, 2-(2′-hydroxy-3′,5′-di-tert-butylphenyl)benzotriazole, 2-(2′-hydroxy-3′-tert-butyl-5′-methylphenyl)benzotriazole, 2-(2′-hydroxy-4′-octoxy)benzotriazole, 2-(2′-hydroxy-3′,5′-di-tert-butylphenyl) 5-chlorobenzo-triazole, 2-(3′-tert-butyl-2′-hydroxy-5′-methylphenyl) 5-chlorobenzotriazole, and 2-(2′-hydroxy-5-ethoxyphenyl)benzotriazole; phenyl salicylate-based ultraviolet absorbers such as phenyl salicylate, p-octylphenyl salicylate, p-tert-butylphenyl salicylate, carboxylphenyl salicylate, methylphenyl salicylate, dodecylphenyl salicylate; dimethyl p-methyoxybenzilidene malonate; 2-ethylhexyl-2-cyano-3,3′-diphenyl acrylate; ethyl-2-cyano-3,3′-diphenyl acrylate; 3,5-di-tert-butyl-p-hydroxy benzoic acid; resorcinol monobenzoate which can be convented into benzophenone by rearrangement when exposed to ulrtaviolet light; 2,4-di-tert-butyphenyl; and 3,5-ditertiary-butyl-4-hydroxybenzoate.

Specific examples of the antioxidant and the anti-aging agent are as follows: 2,6-di-tert-butyl-4-methylphenol, 2,4,6-tri-tert-butylphenol, styrenated phenol, 2,2′-methylenebis(4-methyl-6-tert-butylphenol), 4,4′-isopropylidenebisphenol, 2,6-bis(2′-hydroxy-3′-tert-butyl-5′-methylbenzyl)-4-methylphenol, 4,4′-thiobis-(3-methyl-6-tert-butylphenol), tetrakis-[methylene(3,5-di-tert-butyl-4-hydroxydrocinnamate)]methane, para-hydroxyphenyl-3-naphthylamine, 2,2,4-trimethyl-1,2-dihydroquinoline, thiobis(β-naphthol), mercaptobenzothiazole, mercaptobenzimidazole, aldol-2-naphthylamine, bis(2,2,6,6-tetramethyl-4-piperidyl)sebacate, 2,2,6,6-tetramethyl-4-piperidylbenzoate, dilauryl-3,3′-thiodipropionate, distearyl-3,3′-thiodibrominate, and tris(4-nonylphenol)phosphite.

Examples of the singlet-oxygen-quenching are carotenes, dyestuff, amines, phenols, nickel complexes, and sulfidoes such as 1,4-diazabicycro(2,2,2)octane, β-carotene, 1,2-cyclohexadiene, 2-diethylaminomethylfuran, 2-phenylaminomethylfuran, 9-diethylaminomethyl anthracene, 5-diethylaminomethyl-6-phenyl-3,4-dihydroxypyran, nickel dimethyldithiocarbamate, nickel dibutyldithiocarbamate, nickel 3,5-di-t-butyl-4-hydroxybenzyl-O-ethylphosphonate, nickel 3,5-di-t-butyl-4-hydroxybenzyl-O-butylphosphonate, nickel[2,2′-thiobis(4-t-octylphenolate)]-(n-butylamine), nickel[2,2′-thiobis(4-t-octylphenolate)]-(2-ethylhexylamine), nickel bis[2,2′-thiobis(4-t-octylphenolate)], nickel bis[(2,2′-sulphonebis(4-octylphenolate)], nickel bis(2-hydroxy-5-methoxyphenyl-N-n-butylaldeimine), and nickel bis(dithiobenzyl), nickel bis(dithiobiacetyl).

Examples of the super oxideanion quenching agent are superoxide dismutase, cobalt [III] complexes and nickel [II] complexes. These compounds can be used alone or in combination.

Furthermore, the head matching properties of the reversible thermosensitive recording medium of the present invention can be improved by containing an organic or inorganic filler, or a lubricant.

Examples of the organic filler for use in the present invention are polyolefin particles, polystyrene particles, urea-formaldehyde resin particles, and plastic microballoon.

Examples of the inorganic filler for use in the present invention are sodium aluminum, heavy-duty or light-duty calcium carbonate, zinc oxide, titanium oxide, barium sulfate, silica gel, colloidal silica (10 to 50 μm), alumina gel (10 to 200 μm), active clay, talc, clay satin white, kaolinite, calcined kaolinite, diatomaceous earth, synthetic kaolinite, zirconium compounds and glass microballoon.

Examples of the lubricant for use in the present invention are waxes such as stearic acid amide, zinc stearate, palmitic acid amide, oleic acid amide, lauric acid amide, ethylenebisstearyl amide, methylenebisstearylamide, methylolstearylamide, paraffin wax, polyethylene wax, higher alcohols, higher fatty acids, higher fatty acid esters and silicone compounds. The above compounds can be used alone or in combination.

In the present invention, to obtain a thermosensitive recording medium having excellent chemical resistance, water resistance, rub resistance, light resistance and head matching properties, a protective layer can be formed on the recording layer of the thermosensitive recording medium as an overcoat layer. Examples of the protective layer for use in the present invention include a film layer formed from an aqueous emulsion of a water-soluble polymer compound or a hydrophobic polymer compound, and a film layer made of an ultraviolet-curing resin or an electron radiation curing resin. By providing such a protective layer, a reversible thermosensitive coloring recording medium which is not affected with respect to the repetition of image formation and erasure even if an organic solvent, a plasticizer, an oil, sweat or water comes into contact therewith can be obtained. By containing a light stabilizer in the protective layer, a recording medium which is improved on the light-resistance of the image and the background can be obtained.

Furthermore, by containing the organic or inorganic filler, or a lubricant in the protective layer, a reversible thermosensitive coloring recording medium which is free from the sticking problem between the thermosensitive recording medium and a thermal head or the like and has excellent head matching properties and high reliability can be obtained.

The protective layer for use in the thermosensitive image recording medium of the present invention will now be explained in detail.

There are no particular restrictions to the kinds of the water-soluble polymers and the polymeric aqueous emulsions for use in the protective layer. Conventionally known water-soluble polymers and polymeric aqueous emulsions can be employed. Specific examples of the water-soluble polymers include polyvinyl alcohol, modified polyvinyl alcohol, starch, starch derivatives, cellulose derivatives such as methylcellulose, methoxycellulose, and hydroxyethylcellulose, casein, gelatin, polyvinylpyrrolidone, styrene anhydrous maleic acid copolymer, diisobuthylene anhydrous maleic acid copolymer, polyacrylamide, modified polyacrylamide, methyl vinyl ether-anhydrous maleic acid copolymer, carboxy-modified polyethylene, polyvinyl alcohol/acrylamino block copolymer, melamine-formaldehyde resin, and urea-formaldehyde resin.

Examples of the polymeric aqueous emulsions include polyvinyl acetate, polyurethane, styrene/butadiene copolymer, styrene/butadiene/acryl copolymer, polyacrylic acid, polyacrylate, vinyl chloride/vinyl acetate copolymer, polybutylmethacrylate, and ethylene/vinyl acetate copolymer. These compounds can be used alone or in combination. Further, if necessary, the resin can be cured with the addition of a curing agent.

There are no particular restrictions to the kinds of the ultraviolet-curing resins for use in the present invention. Conventionally known ultraviolet-curing resins can be employed. When the ultraviolet-curing resins are employed, there is a case where a solvent is employed. Examples of the solvent include organic solvents such as tetrahydrofuran, methyl ethyl ketone, methyl isobutyl ketone, chloroform, carbon tetrachloride, ethanol, isopropyl alcohol, ethyl acetate, butyl acetate, toluene, and benzene. To make the handling easier, photo polymerizable monomers, which serve as reactive diluents, can be employed instead of the above solvents.

Examples of the photo polymerizable monomers include 2-ethylhexyl acrylate, cyclohexyl acrylate, butoxyethyl acrylate, neopentyl glycol diacrylate, 1,6-hexanediol diacrylate, polyethylene glycol diacrylate, trimethylolpropane triacrylate, and pentaerythritol triacrylate.

As the ultraviolet-curing resins for use in the present invention, any monomers, oligomers and prepolymers, which can be polymerized reaction by ultraviolet-light irradiation to be cured resin, can be employed. For example, the same resins as those employed in the recording layer can be employed in the protective layer.

In the formation of the protective layer by coating, there are no particular restrictions to the coating method and the coating amount. However, from the view points of the performance and cost, it is preferable that the thickness of the coated protective layer on the recording medium be in the range of 0.1 to 20 $\mu m$, more preferably in the range of 0.5 to 10 $\mu m$.

For further improvement of the light resistance of the reversible thermosensitive coloring recording medium of the present invention, the same additives, light stabilizers and fillers as used in the recording layer can be employed in the protective layer.

In the reversible thermosensitive recording medium of the present invention, an undercoat layer can be formed between the support and the recording layer. In producing the recording medium, coating liquids containing the above-mentioned color developer, coloring agent, and resins are coated on the support.

The undercoat layer serves to prevent the solvents of the above-mentioned coating liquid from penetrating into the support in the course of the coating of the coating liquids, thereby improving the coating operation in the fabrication of the recording medium of the present invention. The undercoat layer also serves to prevent the colored material which is fused with application of the heat during the recording process from penetrating into the support or being absorbed on the support. If such penetration and absorption of the colored material takes place, sufficient decolorization cannot be carried out, resulting in the formation of insufficiently decolorized images. In this sense, the undercoat layer can eliminate the above problems. It is preferable that the undercoat layer be not dissolved in or swelled by the solvent of the coating liquid for the formation of the recording layer.

In the case where the resin employed in the recording layer is soluble in an organic solvent, and the organic solvent is employed in the coating liquid for the recording layer, it is preferable that the undercoat layer comprises a water-soluble polymer, which is neither dissolved in, nor swelled by the organic solvent. Furthermore, in the case where the recording layer is prepared by an aqueous coating liquid comprising a water-soluble polymer or an emulsion of a water-soluble polymer, it is preferable that the undercoat layer be made of a water-resistant resin, such as polyvinyl chloride, polyvinyl acetate, vinyl chloride-vinyl acetate copolymer, polystyrene, polyester, polyurethane, polycarbonate, or acrylic acid be employed or a water-soluble resin be employed in combination with a water-resistant agent.

The water-soluble polymer for use in the undercoat layer is required to be solvent-resistant and to have film-forming properties. Examples of the water-soluble polymer include polyvinyl alcohol, hydroxyethylcellulose, hydroxypropyl-cellulose, methoxycellulose, carboxymethyl-cellulose, methyl-cellulose, gelatin, casein, starch, sodium polyacrylate, polyvinly pyrrolidone, polyacrylamide, maleic acid copolymer, and acrylic acid copolymer.

The undercoat layer can also be made from a hydrophobic polymer emulsion, or a water-soluble polymer and a water-resistant agent in combination is employed. Examples of the hydrophobic polymer emulsion include emulsions of styrene/butadiene copolymer latex, polyvinylidene chloride, acrylonitrile/butadiene/styrene copolymer latex, polyvinyl acetate, vinyl acetate/acrylic acid copolymer, styrene/acrylic acid ester copolymer, ethylene/vinyl acetate copolymer, acrylic acid copolymer, and polyurethane resin. Of these emulsions, the emulsions of styrene/butadiene copolymer, polyvinylidene chloride, and polyvinyl acetate are particularly preferable for use in the present invention.

Examples of the above water-soluble polymer include polyvinyl alcohol, starch and derivatives thereof, celulose derivatives such as methoxycellulose, hydroxyethylcellulose, carboxymethylcellulose, and methylcellulose, sodium polyacrylate, polyvinyl pyrrolidone, acrylamide/acrylic acid ester copolymer, acrylamide/acrylic acid ester/methacrylic acid copolymer, alkali salt of styrene/maleic anhydride copolymer, alkali salt of isobutylene/maleic anhydride copolymer, polyacrylamide, sodium alginate, gelatin, and casein.

The above water-resistant agent serves to make the above-mentioned water-soluble polymers water-resistant by the consendation reaction or crosslinking reaction with the water-soluble polymers. Examples of the water-resistant agent include formaldehyde, glyoxal, chrome alum, melamine, melamine/formaldehyde resin, polyamide resin, polyamide-epichlorohydrin resin. It is preferable that the above water-resistant agent be employed in an amount of 20 to 100 wt. % with respect to the water-soluble polymer.

The reversible thermosensitive coloring composition contained in the recording layer of the reversible thermosensitive coloring recording medium of the present invention can assume a color development state when the coloring composition is temporarily fused by the application of heat thereto. The coloring composition in the color development state can be decolorized with the application of heat thereto to a lower temperature than the eutectic temperature of the coloring composition. The decolorization occurs when the color developer contained in the coloring composition in the color development state is separated out and crystallized. If the time period during which the coloring composition is maintained at the decolorization temperature is short, the decolorization is not sufficient, so that an undecolorized image remains on the recording medium even after the heat application for decolorization. Therefore, it is preferable that a heat insulating layer be interposed between the support and the recording layer of the recording medium in order to impart an insulation effectiveness to the support, whereby the recording medium can assume a complete decolorization state even when heat is applied thereto for a short period of time for high speed recording. The previously mentioned undercoat layer can also be used as the above-mentioned heat insulating layer. Further, it is preferable that the support with an insulation effectiveness be employed.

In the present invention, the following materials can be employed for the heat insulating layer, although the materials for the heat insulating layer are not limited to them:

1. Chemically synthesized heat insulating materials: polyurethane foam, polystyrene foam, polyvinyl chloride foam, and plastic cellular striation.

2. Microballoons dispersed in the heat insulating layer:

Examples of such microballoons are microballoons made of glass, ceramic, or plastics, or the like.

An example of a glass microballoon is a microspherial-void particle made of borosilicate glass, such as "Microsel M." (Trademark) made by Glaper Bell Co., Ltd.. An example of a ceramic microballoon is an aluminosilicate-based microballoon which is used as a premix for the low expansion injection molding or for regular injection molding, such as "Fillite" (Trademark) made by Nippon Fillite Co., Ltd. An example of a plastic microballoon is an expandable plastic filler which is expandable with application of heat.

The expandable filler comprises a shell which is made of a thermoplastic resin containing therein a solvent having a low-boiling point serving as a foaming agent. This filler is expanded by the application of heat. Examples of the thermoplastic resin which is used for preparing the shell of the expandable plastic filler include polystyrene, polyvinyl chloride, polyvinilydene chloride, polyvinyl acetate, polyacrylate, polyacrylonitrile, polybutadiene and their copolymers. Propane, isobutane, or neopentane petroleum ether can be employed as the foaming agent contained in the shell. Examples of the above-mentioned foaming agent are "Micropearl" (Trademark) made by Matsumoto Yushi-Seiyaku Company Ltd. and "Expancel" (Trademark) made by Chemanorde Co., Ltd.

The microballoons can be used together with a binder resin. The thermally expandable microballoons can be used in the form of void particles prior to the coating thereof on the support, or can be expanded with application of heat thereto in the course of the coating.

It is preferable that the diameter of the foamed microballoons be in the range of 10 to 100 μm, more preferably in the range of 10 to 50 μm. Moreover, it is preferable that the thickness of the heat insulating layer be about 0.1 to 50 μm, and more preferably about 0.2 to 20 μm. According to the present invention, synthetic paper can be employed as a heat-resistant support. Further, a micro-void-containing synthetic paper is particularly suitable for the support for use in the present invention.

The reversible thermosensitive coloring recording medium according to the present invention comprises the recording layer comprising the color developer and the coloring agent on the support. In the recording layer, minute particles of an electron-acceptor compound are dispersed in the binder resin and the distribution of the particles is not necessarily uniform on the surface of the recording layer and the inside thereof. In the recording layer, minute vacant portions containing air may be formed because of the non-uniformity of the distribution of the components contained therein. The difference between the light refraction of the air in the vacant portions and that of the recording medium is so large that the light passing through the recording layer is scattered. The result is that the recording layer becomes opaque.

The recording medium comprising this type of recording layer cannot be used as an image recording material for an overhead projector, which requires high optical transmittance.

In the present invention, the above required transparency is obtained by using a transparent support and by providing a resin layer on the recording layer. This resin layer can be provided by uniformly coating a resin with a refractive index of 1.45 to 1.60 at room temperature on the recording layer and dried to harden the coated resin layer. The vacant portions in the recording layer are filled and made the surface thereof is made smooth, whereby a transparent reversible thermosensitive recording medium can be can be obtained, with a minimized light scattering.

Any resin layers which meet the above-mentioned conditions can be employed as the resin layer. It is preferable that the same resin as that employed in the previously mentioned protective layer be employed in the above resin layer, because the resin layer can also serve as the protective layer. When necessary, varieties of additives can be added to the resin layer.

The the recording layer of the reversible thermosensitive recording medium can also be made transparent by the following method: The recording layer is formed by coating on a support a recording layer coating liquid which comprises the color developer, the coloring agent, and a binder dissolved or dispersed in a solvent. Thus a recording layer is formed on the support, which usually assumes a completely white opaque state or has a lower transparency. The thus formed recording layer is subjected to at least one color development, followed by decolorization, whereby the recording layer can be made transparent.

The recording layer can also be made transparent by coating the recording layer coating liquid and drying the same at a temperature higher than the color development initiation temperature, so that the color development is performed simultaneously with the drying of the coating liquid, followed by the decolorization thereof. Thus the recording layer can be made transparent.

Images can be recorded in the reversible thermosensitive coloring recording medium of the present invention by applying heat imagewise to the recording medium by a thermal head. During this recording step, there is the risk that part of the recording layer is peeled off the support and sticks to the thermal head, which causes the formation of impaired images and improper operation of the thermal head. In order to prevent the above-mentioned sticking problem, it is preferable to contain a polymeric cationic electroconductive agent in the recording layer and/or the protective layer.

The polymeric cationic electroconductive agent for use in the recording layer and/or the protective layer is conventionally known. The agent can be prepared as follows: polymer having an amino group is employed as a starting material for preparation of the agent. The amino group of the polymer is converted into the corresponding quaternary ammonium group, whereby the above electroconductive agent can be obtained. More preferably, the above electroconductive agent can be obtained by the copolymerization of an olefinic unsaturated monomer having a quaternary ammonium group and an unsaturated monomer.

A method of preparing the polymeric cationic electroconductive agent by the above-mentioned copolymerization will now be explained in detail.

An olefinic unsaturated monomer having a quaternary ammonium group, represented by the following general formula, is preferably employed:

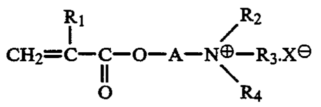

wherein $R_1$ represents hydrogen or a methyl group, A represents an alkylene group having 1 to 4 carbon atoms, or a hydroxyalkylene group having 1 to 4 carbon atoms, $R_2$ and $R_3$ each represent an alkyl group having 1 to 4 carbon atoms, or a hydroxyalkyl group having 2 to 4 carbon atoms, $R_4$ represents an alkyl group having 1 to 4 carbon atoms, or a hydroxyalkyl group or aralkyl group having 2 to 4 carbon atoms, and $X^{\ominus}$ represents a counter anion.

Examples of the above counter anion include a halogen ion ($Cl^-$, $Br^-$), $CH_3OSO_3^-$, $C_2H_5OSO_3^-$, $HSO_4^-$, $H_2PO_4^-$, $CH_3COO^-$, $CH_3SO_3^-$, and $NO_2^-$. Of these counter anions, $Cl^-$, $Br^-$, $CH_3OSO_3^-$, $C_2H_5OSO_3^-$ and $HSO_4^-$ are preferable for use in the present invention.

Specific examples of preferable monomers for use in the present invention are shown in the following table in reference to the above-mentioned general formula.

| Monomer No. | $R_1$ | A | $R_2$ | $R_3$ | $R_4$ | $X^{\ominus}$ |
|---|---|---|---|---|---|---|
| 1 | $CH_3$ | $C_2H_4$ | $CH_3$ | $CH_3$ | $CH_3$ | $Cl^-$ |
| 2 | H | $C_2H_4$ | $CH_3$ | $C_2H_5$ | $CH_3$ | $CH_3OSO_3^-$ |
| 3 | $CH_3$ | $C_2H_5OH$ | $C_2H_5$ | $CH_3$ | $CH_3$ | $Cl^-$ |
| 4 | $CH_3$ | $C_2H_4$ | $CH_3$ | $CH_3$ | $PhCH_2$ | $Cl^-$ |

Further examples of the monomer having a quaternary ammonium group are vinylbenzyl monomers such as vinylbenzyl trialkylammonium salts (vinylbenzyltrimethyl-ammonium chloride and the like.), dialkyl diallyl vinyl monomers such as dialkyl diallyl ammonium salts (dimethyl diallyl ammonium chloride and the like), quaternary compounds of vinyl monomers such as quaternary compounds of vinylimidazoline and vinylpyridine.

As an unsaturated monomer to be copolymerized with the above-mentioned monomer having the quaternary ammonium group, various kinds of vinyl monomers can be employed. Examples of such monomers include unsaturated alkyl esters such as alkyl acrylate, alkyl methacrylate, alkyl crotonate and mono- or dialkyl itaconate; aromatic unsaturated monomers such as styrene, methylstyrene and chlorostyrene; unsaturated nitriles such as acrylonitrile and methacrylonitrile; olefins and haloolefins such as ethylene, vinyl chloride, vinylidene chloride; and vinylesters such as vinyl acetate.

Moreover, unsaturated acids such as acrylic acid, methacrylic acid, crotonic acid, unsaturated acid amides, N-methylol compounds of unsaturated acid amides, glycidyl (meth)acrylate, hydroxyalkyl (meth)acrylate can also be employed.

In the copolymer of the olefinic unsaturated monomer containing the above quaternary ammonium group (A) and the unsaturated monomer (B), it is preferable that the ratio by weight of the monomer (A) be in the range of 5 to 95 wt. %, more preferably in the range of 10 to 60 wt. %, and that of the monomer (B) be in the range of 95 to 5 wt. %, more preferably 90 to 40 wt. % for obtaining appropriate electroconductivity and film hardness. The number-average molecular weight of the copolymer is preferably in the range of 2,000 to 150,000, more preferably in the range of 10,000 to 100,000 for obtaining appropriate film hardness, viscosity, and coating workability. Commercially available polymeric cationic electroconductive agents comprising the above-mentioned copolymer can be employed. Examples of such electroconductive agents are "Elecond 508" (Trademark) made by Soken Chemical & Engineering Co., Ltd., "Chemistat (6300, 8800, 5500)" (Trademark) made by Sanyo Chemical Industries, Ltd., "Conductive Polymer C-280" (Trademark) made by Cargon Co., Ltd. and "Gohsefimer C-760" (Trademark) made by The Nippon Synthetic Chemical Industry Co., Ltd.

In the case where the polymeric cationic electroconductive agent is contained in the thermosensitive recording layer, the added amount is generally in the range of 1 to 20 wt. %, preferably 3 to 15 wt. % of the entire weight of the recording layer.

The protective layer formed on the surface of the thermosensitive recording layer is provided not only with antistatic properties, but also with the function as a sticking preventing layer. The protective layer can be formed from only the polymeric cationic electroconductive agent. The polymeric cationic elctroconductive agent can be contained in a conventional sticking preventing layer. The combined use of the polymeric cationic electroconductive agent for use in the present invention and a sticking preventing agent such as silicone resin, fluorine resin, phosphoric-acid-ester, or a polyoxyethylene-based activator, is effective.

In the case where the polymeric cationic electroconductive agent is contained in the protective layer, and the protective layer is formed on the thermosensitive recording layer, the polymeric cationic electroconductive agent alone or together with a sticking preventing agent in general use is dissolved in water or in an organic solvent to prepare a coating liquid so that the total solid content therein is about 0.1 to 2 wt. %. The thus obtained coating liquid is coated on the recording layer with a deposition amount in the range of 0.001 to 0.5 $g/m^2$ on a dry basis, and dried. When the above deposition amount of the solid content is too little, the electroconductivity of the formed sticking preventing layer and the sticking preventing performance drop. On the other hand, when the deposition amount is too much, when the solid components adhere to the thermal head during the recording process, so that the performance of the thermal head is easily degraded. In the case where the polymeric cationic electroconductive agent is employed in combination with the conventionally employed sticking preventing agent, the ratio by weight of the polymeric cationic electroconductive agent is preferably in the range of 0.05 to 2 parts by weight per 1 part by weight of the sticking preventing agent.

A reversible thermosensitive coloring recording medium provided with a recording layer or protective layer containing a polymeric cationic electroconductive agent can be prepared by the following methods: 1. A method of adding a polymeric cationic electroconductive agent to the recording layer:

An electron-donor coloring compound, an electron-acceptor compound, and a binder resin are uniformly dispersed or dissolved in an organic solvent with the addition of a polymeric cationic electroconductive agent to prepare a recording layer coating liquid. The coating liquid is coated on the support and dried, whereby a reversible thermosensitive recording layer can be formed. 2. A method of providing a protective layer comprising a polymeric cationic electroconductive agent on the recording layer.

An electron-donor coloring compound and an electron-acceptor compound with a binder resin are uniformly dispersed or dissolved in an organic solvent to prepare a recording layer coating liquid. The thus prepared recording layer coating liquid is coated on the support and dried, whereby a reversible thermosensitive coloring recording layer is formed. Then a protective layer coating liquid containing a polymeric cationic electroconductive agent, in which a fluorine-based or silicone-based lubricant may be contained, is coated on the recording layer and dried to prepare an overcoat layer.

A reversible thermosensitive recording method and a display method using the reversible thermosensitive recording medium according to the present invention will now be explained. Each of these methods comprises two steps. In the first step, the coloring composition comprising the electron-donor coloring compound and the electron-acceptor compound in the recording layer is heated to a temperature higher than the eutectic temperature of the electron-donor compound and the electron-acceptor compound of the coloring composition to obtain a color development. In the second step, the coloring composition in the color development state is heated at a temperature lower than the eutectic temperature of the two compounds to obtain a decolorization state.

There are two types of images recorded on the recording medium or on the display medium according to the present invention. In one type, a colored image in the color development state is displayed on the background in the decolorization state. In another type, a decolorized image in the decolorization state is recorded on the colored background in the color development state. In either type, heat is imagewise applied to the recording medium by use of a hot-pen, a thermal head, or a laser beam. As long as heat can be imagewise applied to the recording medium, any means can be employed for image formation.

In the case where the entire surface of the recording medium is subjected to the color development or the decolorization, the recording medium is brought into contact with a heat roller or a heat plate, or exposed to hot air, or placed in a heated temperature-controlled chamber, or irradiated with, for instance, an infrared ray. Alternatively, heat can be applied to the entire surface of the recoding medium by a thermal head.

Figures 11A, 11B:
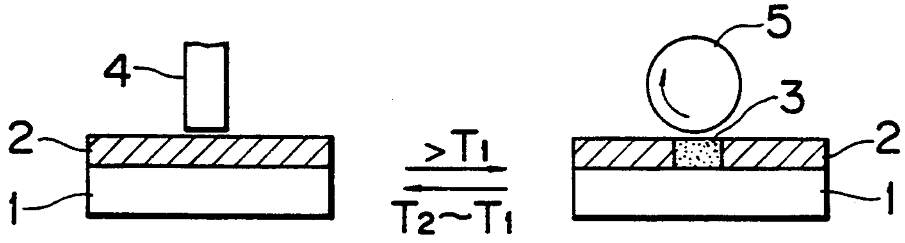
FIGS. 11(*a*) and 11(*b*) are digrams showing a recording method of the present invention using a reversible thermosensitive coloring recording medium of the present invention.

FIGS. 11(*a*) and 11(*b*) are schematic cross-sectional illustrations of an example of a reversible thermosensitive recording method according to the present invention, using the recording medium. FIG. 11(*a*) shows a decolorization process and the recording medium in the decolorization state, and FIG. 11(*b*) shows a recording process and the recording medium in the color development state. In these figures, reference numeral 1 indicates a support; reference numeral 2, a recording layer in the decolorization state; reference numeral 3, a colored portion in the recording layer 2; reference numeral 4, a thermal head; and reference numeral 5, a heat application roller for color development.

The recording layer in the recording medium and that in the display medium have a decolorization range on a lower temperature side than the eutectic temperature of the color developer and the coloring agent in the recording layer, that is, the color development initiation temperature, as mentioned previously with respect to the reversible thermosensitive coloring composition with reference to FIG. 1. Furthermore, since the color development initiation temperature and the decolorization initiation temperature vary depending upon the combination of the materials for the color developer and the coloring agents, it is necessary to adjust the temperature of the heat application means such as the above-mentioned thermal head and heat application roller, and the thermal applied thereby.

When a decolorization state is formed by heating the recording layer in the color development state to the decolorization initiation temperature, there is a case where the decolorization properties vary depending upon the conditions for the formation of the decolorization state. In such a case, it is preferable to adjust the cooling rate in the color development state appropriately. For instance, when the color development state is formed by a thermal head, heat is applied imagewise to the recording layer to a temperature above the eutectic temperature by the thermal head as the recording layer in its entirety is heated to a temperature lower than the eutectic temperature by a heat application means other than the thermal head, whereby the color development state can be obtained imagewise in the recording layer. This method can decrease the cooling rate, so that the decolorization properties of the color development state can be improved.

More specifically, this method can be carried out, for instance, by making adjustable the temperature of a platen roller which is disposed in such a configuration that the recording medium is interposed between the platen roller and the thermal head. The temperature of the platen roller is set below the color development initiation temperature preferably below the decolorization initiation temperature range. This is to make appropriate the time period through which the recording layer passes the decolorization initiation temperature range from the eutectically fused state to the cooled state, that is, not making the time period too long.

The previously mentioned temperature-adjustable platen roller can be fabricated, for instance, by use of a metal pipe covered with a rubber provided with an inner heating lamp inside the metal pipe, or by use of a surface heating resistor, or an electronic heating and cooling element to heat or cool the portion of the platen which comes into contact with the surface of the recording medium.

An image display apparatus according to the present invention using the above-mentioned display medium will now be explained with reference to the accompanying drawings.

The image display apparatus comprises (a) the above-mentioned reversible thermosensitive coloring display medium with the reversible thermosensitive coloring recording layer comprising the electron-donor coloring compound and the electron-acceptor compound, (b) a first heat application means for applying heat imagewise to the surface of the reversible thermosensitive coloring display medium or uniformly to the entire surface thereof to a color development temperature above the eutectic temperature of the electron-donor coloring compound and the electron-acceptor compound to obtain a color development state, and (c) a second heat application means for applying heat imagewise to the surface of the reversible thermosensitive coloring display medium in the color development state or uniformly to the entire surface thereof to a decolorization temperature which is lower than the eutectic temperature to obtain a decolorization state.

It is preferable that the display medium be in the form of an endless belt because the formation of images and the erasure thereof can be effectively performed only by moving the display medium in one direction.

A specific example of the display apparatus of the present invention will now be explained with reference to FIGS. 12 and 13.

Figure 12:
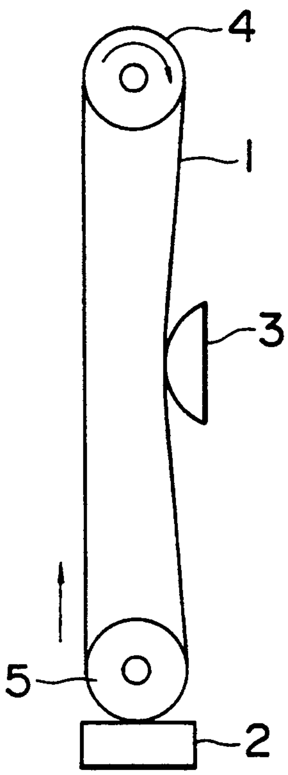
FIG. 12 is a schematic diagram of an image display apparatus of the present invention using a reversible thermosensitive coloring display medium of the present invention.

FIG. 12 is a diagram of the image display apparatus according to the present invention. In the figure, reference numeral 1 indicates a display medium 1 in the form of an endless belt comprising the reversible thermosensitive coloring recording medium of the present invention; reference numeral 2, a thermal head 2 for applying heat to a display region of the display medium 1 in order to form images in the display region; reference numeral 3, a thermal head for applying heat selectively to the display region or the entire surface of the display medium to erase the images formed thereon; and reference numerals 4 and 5, a pair of rollers for rotating the display medium.

In this example, images are formed on the display medium 1 by the thermal head 2 or erased therefrom by the thermal head 3 as the display medium 1 is rotated in the direction of the arrow. Thus, the recording of information, and the erasure thereof, which are the most basic operations of this apparatus, are performed at independently different positions, and the display operation is performed by the periodical rotation of the recording medium, so that it is possible to construct a thermal display apparatus with a large picture display portion by this simple mechanism.

Figure 13:
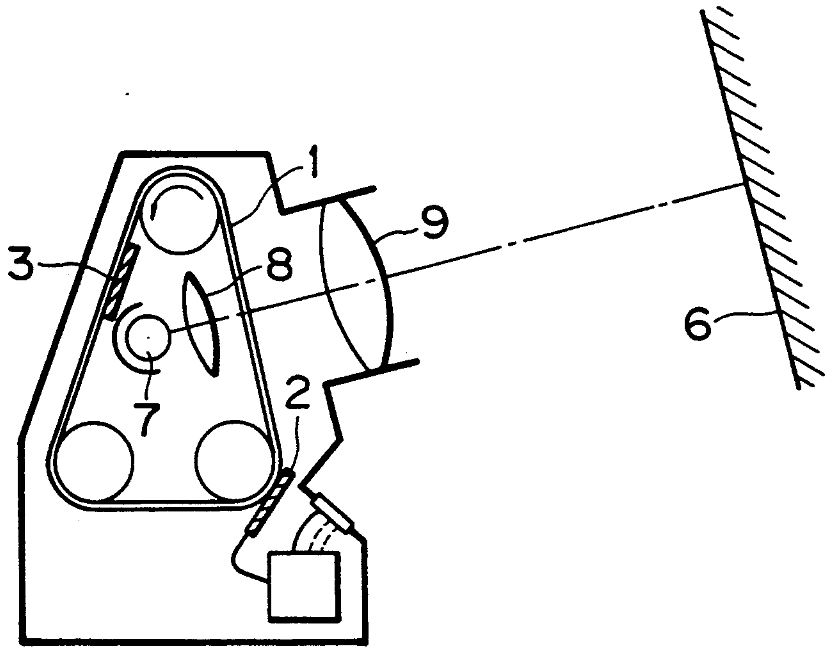
FIG. 13 is a schematic diagram of a projector type image display apparatus of the present invention a reversible thermosensitive display medium of the present invention.

FIG. 13 is a diagram of an image display apparatus suitable for use as a projector. In the figure, reference numeral 1 indicates a display medium 1 in the form of an endless belt comprising the reversible thermosensitive coloring recording medium of the present invention; reference numeral 6, a screen; reference numeral 2, a thermal head for recording; reference numeral 3, a thermal head for erasure; reference numeral 7, a light source; and reference numerals 8 and 9, projection lenses.

In this example, images are formed on the recording medium 1 by the thermal head 2 or erased therefrom by the thermal head 3 as the display medium 1 rotated in the direction of the arrow. The recorded images are projected onto the screen 6 by an optical system comprising the light source 7, and the projection lenses 8 and 9. Thus, the recording of information, and the erasure thereof, which are the most basic operations of this apparatus, are performed at independently different positions, and the display operation is performed by the periodical rotation of the recording medium, so that it is possible to construct a projector with a large picture display portion by this simple mechanism.

A multiple color display medium according to the present invention, which comprises a support and a plurality of reversible thermosensitive coloring recording layer sections capable of producing different colors arranged thereon in a stripe pattern or in a matrix pattern thereon, will now be explained.

The reversible thermosensitive coloring composition according to the present invention can reversibly assume the color development state or the decolorization state by the application of heat thereto to different temperatures. The hue of the coloring composition in the color development state can be changed in accordance with the selection of the coloring agent to be contained in the coloring composition. In other word, images with a variety of colors can be obtained on the recording medium by using different coloring agents in the coloring composition.

Figure 14A:
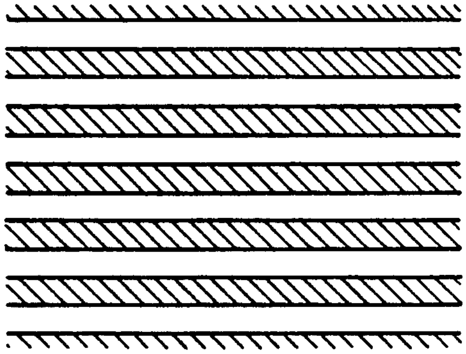
FIGS. 14(*a*) to 14(*c*) and FIGS. 15 to 17 are schematic plan views of a variety of multiple colored display patterns of multiple color display media of the present invention, fabricated by using reversible thermosensitive coloring display media of the present invention.
Figure 14B:
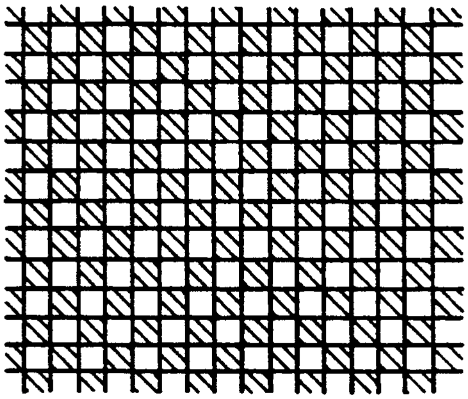
Figure 14C:
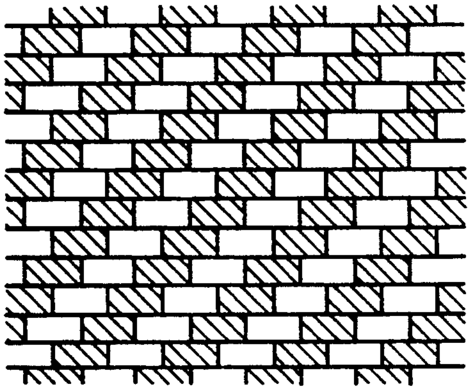

FIGS. 14(*a*) to 14(*c*) and 15 to 17 schematically show a variety of the above-mentioned patterns of the reversible thermosensitive recording layer sections capable of producing different colors, which are arranged in a stripe pattern or in a matrix pattern on the support of the multiple color display medium in the color development state of the present invention.

FIGS. 14(*a*) to 14(*c*) are the plan views of examples of the multiple colored display patterns of the multiple color display medium of the present invention. The colored display patterns are regularly arranged in the form of stripes in FIG. 14(*a*) and in the form of a matrix in FIGS. 14(*b*) and 14(*c*). In the multiple colored display pattern in FIG. 14, different colors are produced in the recording layer in the shaded areas and non-shaded areas.

When images formed on this multiple color display medium are seen through the support or by projecting the images on a screen, a transparent support made of, for example, a plastic film, is employed for the support. On the other hand, when the images are seen as reflected images, the support is made of an opaque material, for instance, a white support made by dispersing a white pigment in a transparent film, or by providing a white pigment layer on a transparent film.

A recording layer consisting of a plurality of reversible thermosensitive coloring recording sections capable of producing different colors, which are arranged in a regular pattern on the support of the multiple color display medium of the present invention can be prepared by printing a mixture of the reversible thermosensitive coloring composition of the present invention and a binder resin on the support, for instance, by screen printing.

Figure 15:
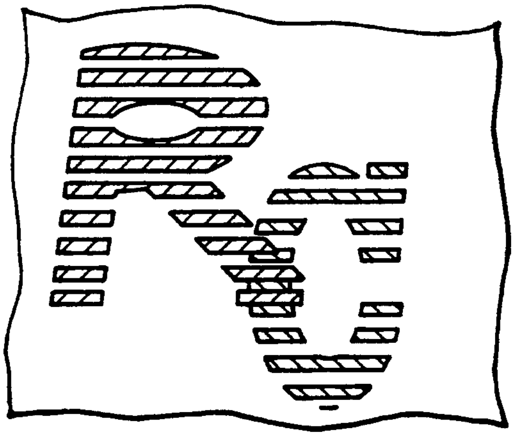

FIG. 15 shows an example of the multiple color display medium according to the present invention, in which two kinds of reversible thermosensitive coloring recording sections, each capable of producing a different color, are arranged in a stripe pattern on the support, and multiple colored images are formed by selective application of heat thereto by the line scanning of a thermal head. The two characters (R and C) in the multiple color display medium in the figure are developed in different colors by selective heat application to the different reversible thermosensitive coloring recording sections in the stripe pattern. Two kinds of stripes with different colors are alternately arranged in the overlapping portion of the two characters, so that when the pitch between the two stripes is small, the color of the overlapping portion appears to be in a mixed color of the two colors, depending upon the observing distance. Therefore, the images with three colors can be observed on the display medium according to the present invention.

Figure 16:
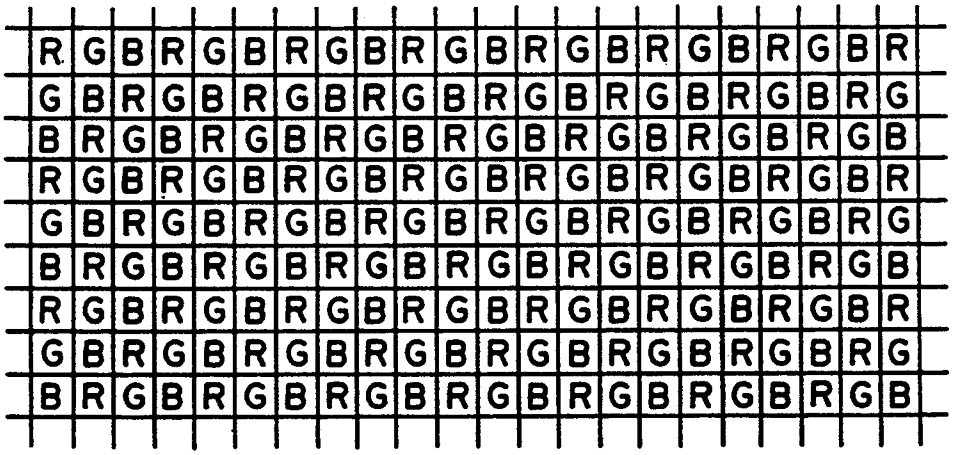

FIG. 16 is an example of an image developed on the multiple color display medium of the present invention, in which three types of reversible thermosensitive coloring recording layer sections, each being capable of producing a different color, are arranged in a stripe pattern. Each picture element, of which each matrix pattern producing a different color, can be reduced in size to the size of each picture element of the thermal head employed. For instance, when the recording layer is composed of three reversible thermosensitive coloring recording layer sections in a matrix pattern, which are respectively capable of developing red (R), green (G) and blue (B), that is, the three primary colors, not only three-colored images, but also full-colored images can be obtained. The color gradation can be accomplished by forming different color development units with respect to each color, each unit comprising a different number of picture elements.

Figure 17:
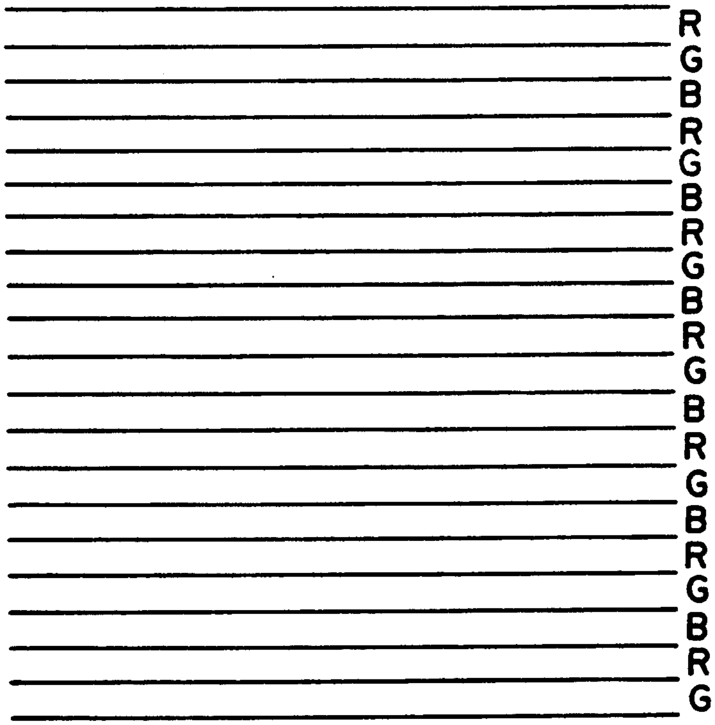

FIG. 17 shows a further example of the multiple color display medium of the present invention, in which the recording layer is composed of three kinds of reversible thermosensitive coloring recording layer sections arranged in a stripe pattern, each kind of reversible thermosensitive coloring recording layer section being capable of producing a different color, so that the three primary colors can be produced by this multiple color display medium. Therefore multiple colored and full-colored images can be produced in this multiple color display medium by selectively developing each stripe of the recording layer section by a thermal head.

The reversible thermosensitive coloring recording medium according to the present invention may further comprise an additional recording layer which is different from the reversible thermosensitive coloring recording layer to form a composite type recording medium. The additional recording layer may be supported on the same support as for the reversible thermosensitive coloring recording layer beside the reversible thermosensitive coloring recording layer, or these two recording layers may be overlaid on the support.

A representative example of such a composite type recording medium is one which includes both the reversible thermosensitive coloring recording layer and a magnetic recording layer.

Conventional magnetic recording type prepaid cards, credit cards, bank deposit cards, and notes include only a magnetic recording portion, and information recorded therein can be read only through a magnetic card reader.

It would be useful to use a reversible thermosensitive coloring recording medium comprising both the reversible thermosensitive recording layer and the magnetic recording layer, because some particular information, such as the balance in hand in a prepaid card, could be displayed by the reversible thermosensitive coloring recording layer in the recording medium. Furthermore, multiple colored images can be developed on the reversible thermosensitive coloring recording medium according to the present invention. Therefore, this composite type recording medium is much more convenient than the conventional recording media.

A composite recording medium comprising the reversible thermosensitive coloring recording layer and a magnetic recording layer of the present invention will now be explained more specifically with reference to FIGS. 18(*a*) and 18(*b*). The reversible thermosensitive coloring recording layer and the magnetic recording layer can be provided side by side on the same support. However, it is preferable that the recording layer and the reversible thermosensitive coloring recording layer be successively overlaid on the support from the view points of the recording area and capacity and the beauty of the design.

Figure 18A:
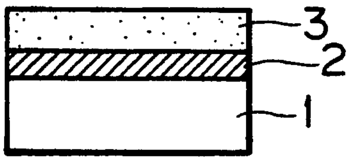
FIG. 18(*a*) is a schematic cross-sectional view of an example of a composite type recording medium of the present invention which comprises a reversible thermosensitive coloring recording layer and a magnetic recording layer.
Figure 18B:
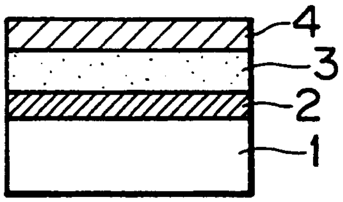

FIG. 18(*a*) is a schematic illustration of an example of the composite type reversible thermosensitive recording medium according to the present invention, which comprises a support 1, a magnetic recording layer 2 formed on the support 1, and a reversible thermosensitive recording coloring layer 3 on the magnetic layer 2.

FIG. 18(*b*) is a schematic illustration of another example of the composite type reversible thermosensitive recording medium according to the present invention, which comprises a support 1, a magnetic recording layer 2 formed on the support 1, a reversible thermosensitive recording coloring layer 3 formed on the magnetic layer 2, and a protective layer 4 formed on the reversible thermosensitive recording layer 3.

With the above-mentioned recording media comprising the magnetic recording layer and the reversible thermosensitive coloring recording layer formed thereon, magnetic recording and thermal image recording can be independently performed.

It is preferable that the distance from a magnetic head to the surface of the magnetic recording layer be about 10 μm or less in order to perform the magnetic recording and the erasure smoothly. Therefore, in the case where the protective layer 4 is overlaid on the reversible thermosensitive coloring recording layer 3 as shown in FIG. 18 (*b*), or an intermediate layer such as an adhesive layer (not shown) is interposed between the magnetic recording layer 2 and the reversible thermosensitive coloring recording layer 3 or between the reversible thermosensitive coloring recording layer 3 and the protective layer 4, the total distance from a magnetic head to the surface of the magnetic layer 3 is preferably about 10 μm or less, more preferably 8 μm or less.

The magnetic recording layer for use in the present invention can be provided on the support with depositing a magnetic material by vacuum-deposition or sputtering or by applying to the support a coating liquid comprising a magnetic material and a binder resin.

Examples of the magnetic material include conventionally employed magnetic materials such as iron, cobalt, nickel, and alloys and compounds thereof. Examples of the binder resin are conventional resins such as thermosetting resins, radiation curing resins, and thermoplastic resins.

Examples of the materials for preparing the protective layer are conventionally employed thermosetting resins, radiation curing resins, thermoplastic resins, and inorganic materials such as transparent metallic oxide. When the protective layer is formed on the reversible thermosensitive coloring recording layer by a coating method, it is necessary to select the materials and solvents which have no adverse effects on the recording layer.

The reversible thermosensitive coloring composition according to the present invention is suitable for use as the recording material for the reversible coloring recording medium and display medium. However, the reversible thermosensitive coloring composition according to the present invention is not limited to these applications, but can be applied to a variety of materials, which utilized the reversible color development and decolorization properties. If the coloring composition is used as an image formation material for a toner for electrophotography, an ink for the ink-jet recording method, and an ink layer for a thermal transfer recording medium, erasable images can be formed with ease.

Furthermore, the coloring composition is also suitable for use in an optical recording layer of a heat-mode rewritable optical recording medium.

A heat-mode rewritable optical information recording medium using the coloring composition according to the present invention will now be explained. The optical information recording medium comprises a support and a optical recording layer formed thereon comprising the reversible thermosensitive coloring compound according to the present invention. A condensed laser beam is applied to the recording layer to form a small colored or decolorized spot thereon, whereby information is recorded in the recording layer or erased therefrom.

When the optical recording layer absorbs light for recording, the absorbed light is converted to a heat energy, and the recording layer is heated by the converted energy. When the optical recording layer does not absorb such light, it is necessary that a light absorbing layer be formed in contact with the recording layer or near the recording layer. This light absorbing layer serves as a light-to-heat conversion layer and the heat energy converted from the absorbed light therein is used to heat the optical recording layer for recording. When a light-to-heat conversion material may be added to the recording layer instead of the provision of the light absorbing layer for the purpose of recording information in the recording layer.

Figure 19A:
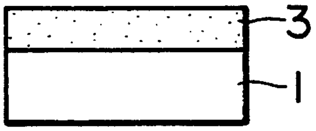
FIG. 19(*a*) is a schematic cross-sectional view of an example of a heat-mode rewritable optical information recording medium of the present invention using a reversible thermosensitive coloring composition of the present invention.
Figure 19B:
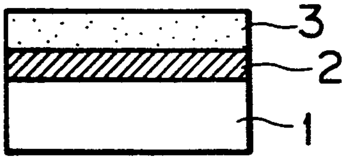
Figure 19C:
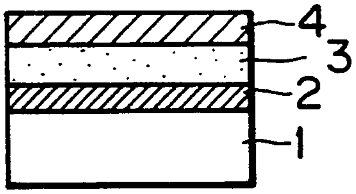

FIGS. 19(*a*), 19(*b*) and 19(*c*) are the schematic cross-sectional views of examples of the heat-mode rewritable optical information recording medium using the coloring composition according to the present invention.

FIG. 19(*a*) shows an optical information recording medium comprising a support 1 and a heat-mode optical recording layer 3 formed thereon. When necessary, a light-to-heat conversion material can be added in the heat-mode optical recording layer 3.

FIG. 19(*b*) shows an optical recording medium comprising a support 1, a light-to-heat conversion layer 2 formed on the support, and a heat-mode optical recording layer 3 formed on the light-to-heat conversion layer 2.

FIG. 19(*c*) shows an optical recording medium comprising a support 1, a light-to-heat conversion layer 2 formed on the support, a heat-mode optical recording layer 3 formed on the light-to-heat conversion layer 2, and a protective layer 4 overlaid on the heat-mode optical recording layer 3.

As the materials for the light-to-heat conversion layer of the optical recording medium of the present invention, for example, a metal or semi-metal such as platinum, titanium, silicon, chromium, nickel, germanium, aluminum can be employed. The above light-to-heat conversion layer of the optical recording medium can be used as a light reflection layer which reflects part of light incident thereon. The light-to-heat conversion layer used as a light reflection layer is especially advantageous when reflection light is utilized.

Examples of a light-absorbing agent employed for the light-to-heat conversion are azo dyes, cyanine dyes, naphthoquinone dyes, anthraquinone dyes, squalilium dyes, phthalocyanine dyes, naphthalocyanine dyes, naphthoquinone dyes, porhyrin dyes, indigo dyes, dithole complex dyes, azulenium dyes, quinoneimine dyes, and quinonediimine dyes. An appropriate light-absorbing agent is selected, depending upon the wavelength of the light employed for recording and erasure.

In the fabrication of the recording medium according to the present invention, the recording layer can be prepared by the following methods:

In the formation of the recording layer, when the coloring agent and the color developer for use in the recording layer are protected by a binder resin, these components are dissolved in a suitable solvent to prepare a coating liquid for the formation of the recording layer. The coating liquid is then coated on the support or other layer and dried. Alternatively, these components can be dispersed in a solution of a resin in a ball mill to prepare a coating liquid, which is coated on the support or other layer. These methods are advantageous over other methods in the production of the recording medium because conventional coating methods such as the spin coating method and the dip coating method can be employed.

In the case where the recording layer is formed without using any resins, the coloring agent and the color developer are placed on a heated support to fuse the mixture of the coloring agent and the color developer to form a thin liquid layer of the mixture, followed by cooling the thin liquid layer, whereby a recording layer is formed on the support. The thus formed recording layer is not in a dispersion state, but in a crystallized thin-film state. Therefore, the thus prepared recording layer is suitable for high-density recording.

There are two recording modes for the optical information recording medium using the coloring composition according to the present invention. In one mode, spots in the color development state are formed in the recording layer in the decolorization state. In the other mode, spots in the decolorization state are formed in the recording layer in the color development state.

When the color development state is utilized for recording, the recording layer in the color development state at the previously mentioned eutectic temperature is gradually cooled so as to slowly pass through the decolorization temperature, whereby a completely decolorized state can be obtained in the recording layer. Alternatively, the recording layer in the color development state at the eutectic temperature is rapidly cooled to obtain a complete color development state and then the temperature of the recording layer is gradually raised to a decolorization initiation temperature to obtain a completely decolorized state, followed by cooling the recording layer. The latter method is better in obtaining a completely decolorized state than the former method and more suitable for high-density recording.

When the decolorization state is utilized for recording, the recording layer in the color development state at the eutectic temperature is rapidly cooled, so that a complete color development state is obtained.

As can be seen from the diagram in FIG. 1 showing the relationship between the color development and decolorization of the recording layer and the temperature, the color development can be attained by heating the recording layer to a temperature above a predetermined temperature and cooling the same, while the decolorization is attained by heating the recording layer to a temperature range lower than the predetermined temperature, followed by cooling the same. Therefore, the radiation conditions for the formation of the color development state have a larger tolerance than the conditions for the formation of the decolorization. Therefore a recording system which utilizes the color development state for recording information, which generally requires high speed, is easier to be constructed.

The support for the optical information recording medium using the coloring composition according to the present invention can be made of, for example, a glass plate, or a plastic plate, made of acrylic resin, polycarbonate. The protective layer for the optical information recording medium is preferably made of a material which is transparent to recording light, reproduction light and erasure light.

Furthermore, recording by use of laser beams can also be carried out for high-density recording in the optical information recording medium of the present invention, which is particularly suitable for use in a high-density recording display or a large display of projector type.

EXAMPLE 1

Example 1-1

3-dibutylamino-7-(o-chlorophenyl)aminofluoran (a coloring agent) and dodecylphosphonic acid (a color developer) were mixed in a 1:2 molar ratio and pulverized in a mortar. A glass plate with a thickness of 1.2 mm was placed on a hot plate and was heated to 170° C. A small amount of the above mixture was placed on the thus heated glass plate. The mixture was melted and turned black at the same time.

Subsequently, a cover glass was placed on the above melted mixture and the melted mixture was spread so as to have a uniform thickness. Then the melted mixture with the cover glass thereon was immediately immersed in ice water to quickly lower the temperature of the melted mixture. Then the melted mixture was taken out from the ice water quickly, and the water remaining on the melted mixture was removed, whereby a reversible thermosensitive coloring composition No. 1-1 of the present invention was obtained in the form of a colored thin film.

Examples 1-2 to 1-6

The procedure for preparing the reversible thermosensitive coloring composition in Example 1-1 was repeated except that dodecylphosphonic acid employed as the color developer in Example 1-1 was replaced by each of the phosphonic acids with a long-chain alkyl group as shown in Table-1, whereby the reversible thermosensitive coloring compositions No. 1-2 to No. 1-6 of the present invention were obtained.

TABLE 1

| Example No. | Color Developer | Decolorization Initiation Temperature (°C.) |
|---|---|---|
| 1-1 | Dodecylphosphonic acid | 39 |
| 1-2 | Tetradecylphosphonic acid | 48 |
| 1-3 | Hexadecylphosphonic acid | 56 |
| 1-4 | Octadecylphosphonic acid | 64 |
| 1-5 | Eicosylphosphonic acid | 69 |
| 1-6 | Docosylphosphonic acid | 74 |

The thus obtained reversible thermosensitive coloring compositions were subjected to a test for the evaluation of the color development properties and the decolorizing properties thereof.

A heating apparatus was provided on a specimen carrier of an optical microscope and each sample of the above obtained reversible thermosensitive coloring compositions was placed on the heating apparatus. The samples were inspected as the temperature thereof was elevated at a heating rate of 4° C./min.

Furthermore, the amount of light transmitted from a light source of the optical microscope through the sample to the occular portion of the optical microscope was measured. When the reversible thermosensitive coloring composition was decolorized, the amount of the transmitted light was increased. The decolorization initiation temperature was determined from the temperature at which the amount of the transmitted light was changed. It was confirmed that when the coloring composition was heated again until it was fused, the above reversible thermosensitive coloring composition was again colored.

FIG. 9 shows the transmittance of each reversible thermosensitive coloring composition comprising one of phosphonic acids with a straight chain alkyl group having 12 to 22 carbon atoms. In FIG. 9, each of the number suffixed to P12, P14, P16, P18, P20 and P22 stands for the number of the carbon atoms in the alkyl group.

The transmittance of the reversible thermosensitive coloring compositions in the initial color development state is supposed to be 1.0 for comparison. FIG. 9 shows that each reversible thermosensitive coloring composition comprising the phosphonic acid has its own decolorization temperature range, and that the longer the length of the alkyl chain of the phosphonic acid contained in the composition, the higher the decolorization initiation temperature thereof.

Table-1 shows the decolorization initiation temperature of each reversible thermosensitive coloring composition.

Furthermore, each of the above-mentioned colored reversible thermosensitive coloring compositions comprising the phosphonic acid was subjected to a DSC analysis. All of the above reversible thermosensitive coloring compositions had an exothermic peak in a temperature range lower than the eutectic temperature of the composition during the temperature elevation process in the DSC analysis.

Figure 20:
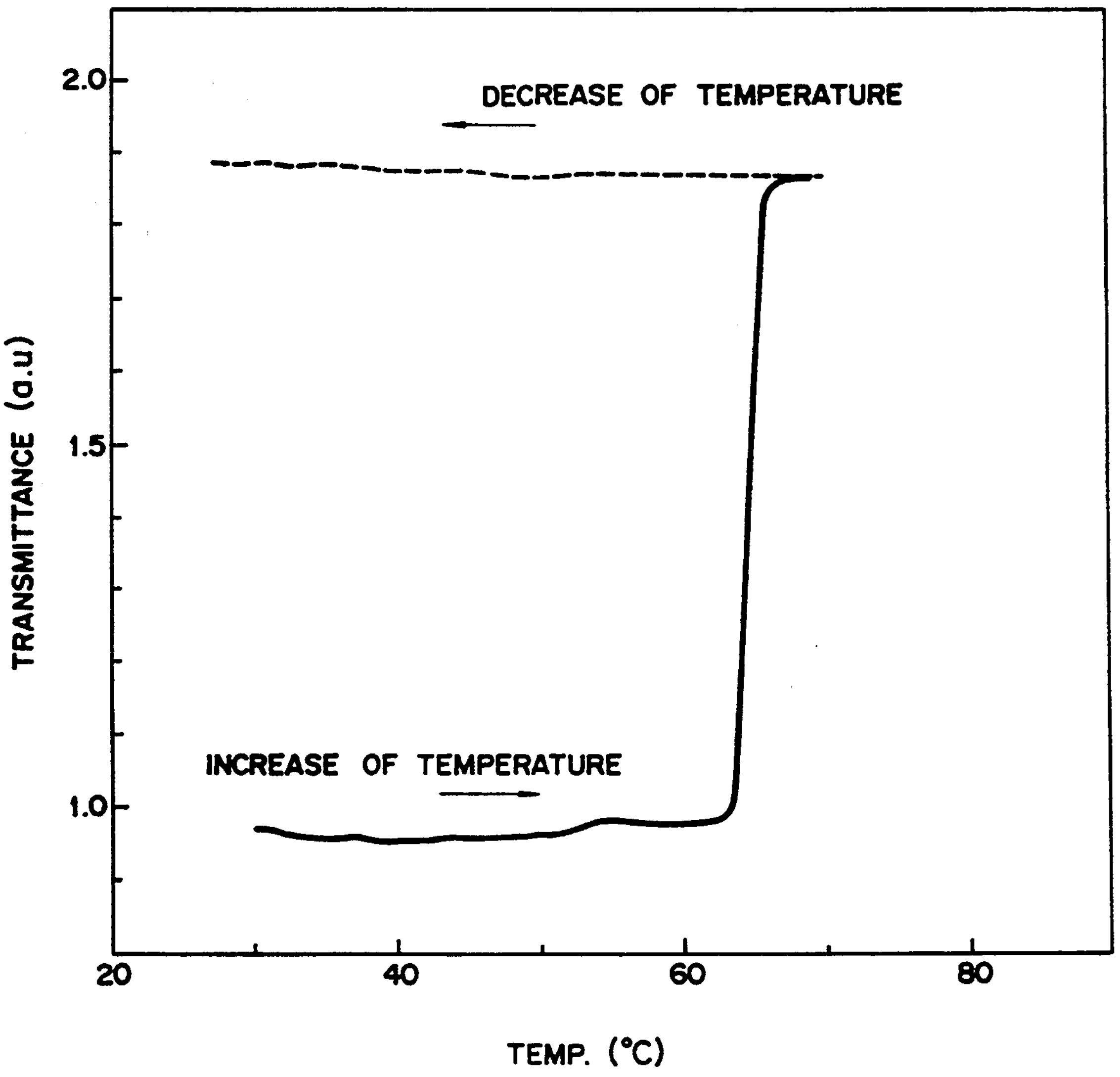
FIG. 20 is diagram showing the steps for obtaining a reversible thermosensitive coloring composition comprising octadecylphosphonic acid serving as a color developer and 3-dibutylamino-7-(o-chlorophenyl-)aminofluoran serving as a coloring agent in a color development state from a decolorization state thereof.

The temperature of the reversible thermosensitive coloring composition comprising 3-dibutylamino-7-(o-chlorophenyl)aminofluoran and octadecylphosphonic acid with a molar ratio of 1:2 in the color development state obtained in Example 1-4 was raised to 70° C. in the decolorization temperature range thereof and then decreased to room temperature. FIG. 20 shows the changes in the transmittance of the above reversible thermosensitive coloring composition. The figure shows that the reversible thermosensitive coloring composition was decolorized at 70° C. and maintained the same decolorization state even when the temperature was decreased thereafter.

Example 1-7

Figure 21:
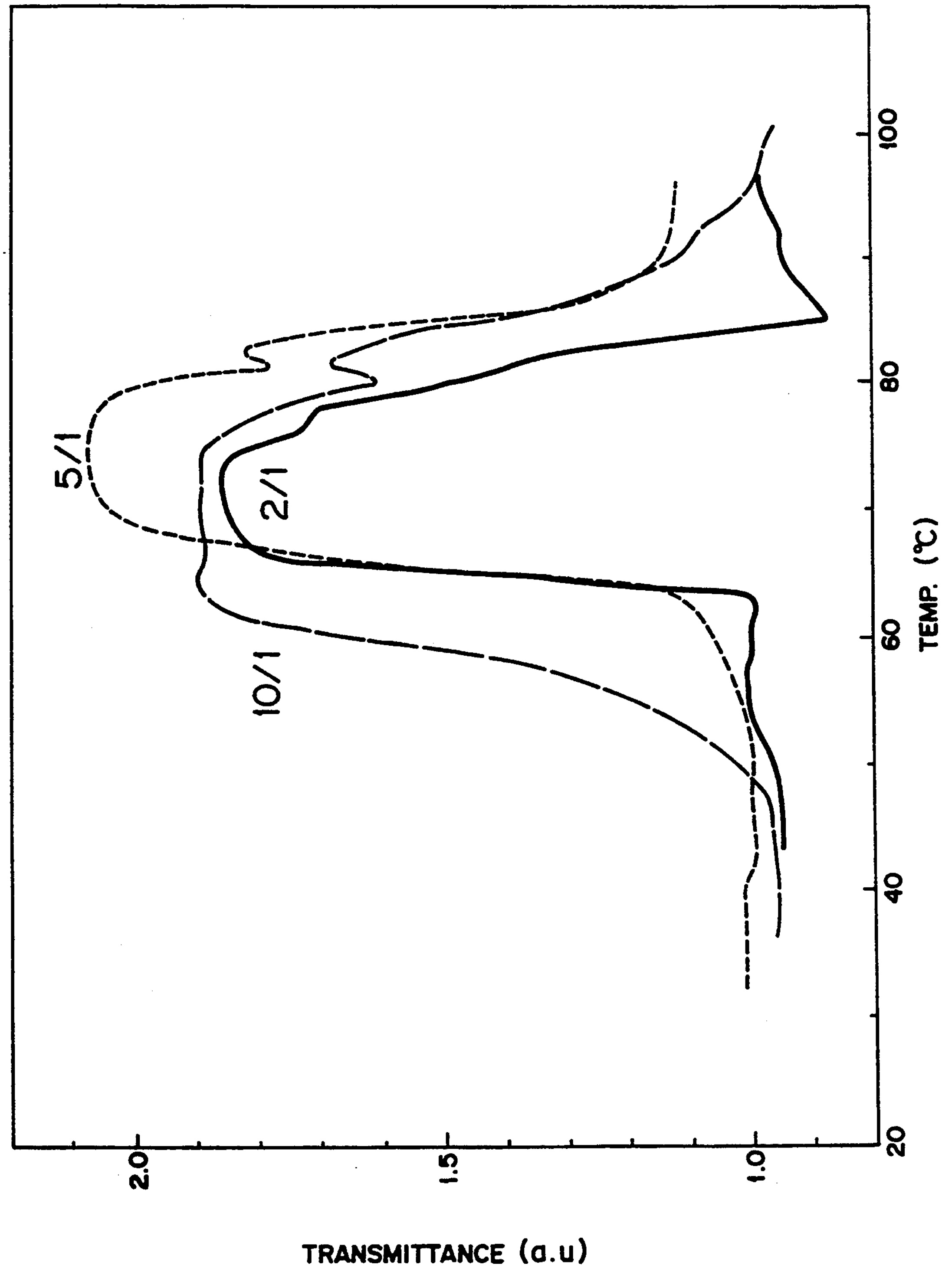
FIG. 21 is a graph showing the decolorization temperature ranges of the reversible thermosensitive coloring compositions comprising octadecylphosphonic acid serving as a color developer and 3-dibutylamino-7-(o-chlorophenyl)aminofluoran serving as a coloring agent of the present invention when the mixing molar ratio of the color developer and the coloring agent is changed.

The procedure for preparing the reversible thermosensitive coloring composition in Example 1-4 was repeated except that the mixing molar ratio of 3-dibutylamino-7-(o-chlorophenyl)aminofluoran and octadecylphosphonic acid (1:2) in Example 1-4 was changed to 1:10, whereby a reversible thermosensitive coloring composition of the present invention was obtained. The transmittance of the thus obtained reversible thermosensitive coloring composition is shown in FIG. 21. The above reversible thermosensitive coloring composition also has its own definite decolorization temperature range.

Example 1-8

The procedure for preparing the reversible thermosensitive coloring composition in Example 1-4 was repeated except that the mixing molar ratio of 3-dibutylamino-7-(o-chlorophenyl)aminofluoran and octadecylphosphonic acid (1:2) in Example 1-4 was changed to 1:5, whereby a reversible thermosensitive coloring composition of the present invention was obtained. The transmittance of the thus obtained reversible thermosensitive coloring composition is shown in FIG. 21. The above reversible thermosensitive coloring composition also has its own definite decolorization temperature range.

COMPARATIVE EXAMPLE 1

Comparative Example 1-1

The procedure for preparing the reversible thermosensitive coloring composition in Example 1-1 was repeated except that the dodecylphosphonic acid employed as the color developer in Example 1-1 was replaced by decyl-phosphonic acid, whereby a comparative reversible thermosensitive coloring composition (a) in the color development state was obtained. The transmittance of the thus obtained colored composition is shown by curve (a) in FIG. 22. The above composition had no specific temperature range in which the transmittance increased. Moreover, the decolorization of the composition was not observed.

Comparative Example 1-2

Figure 22:
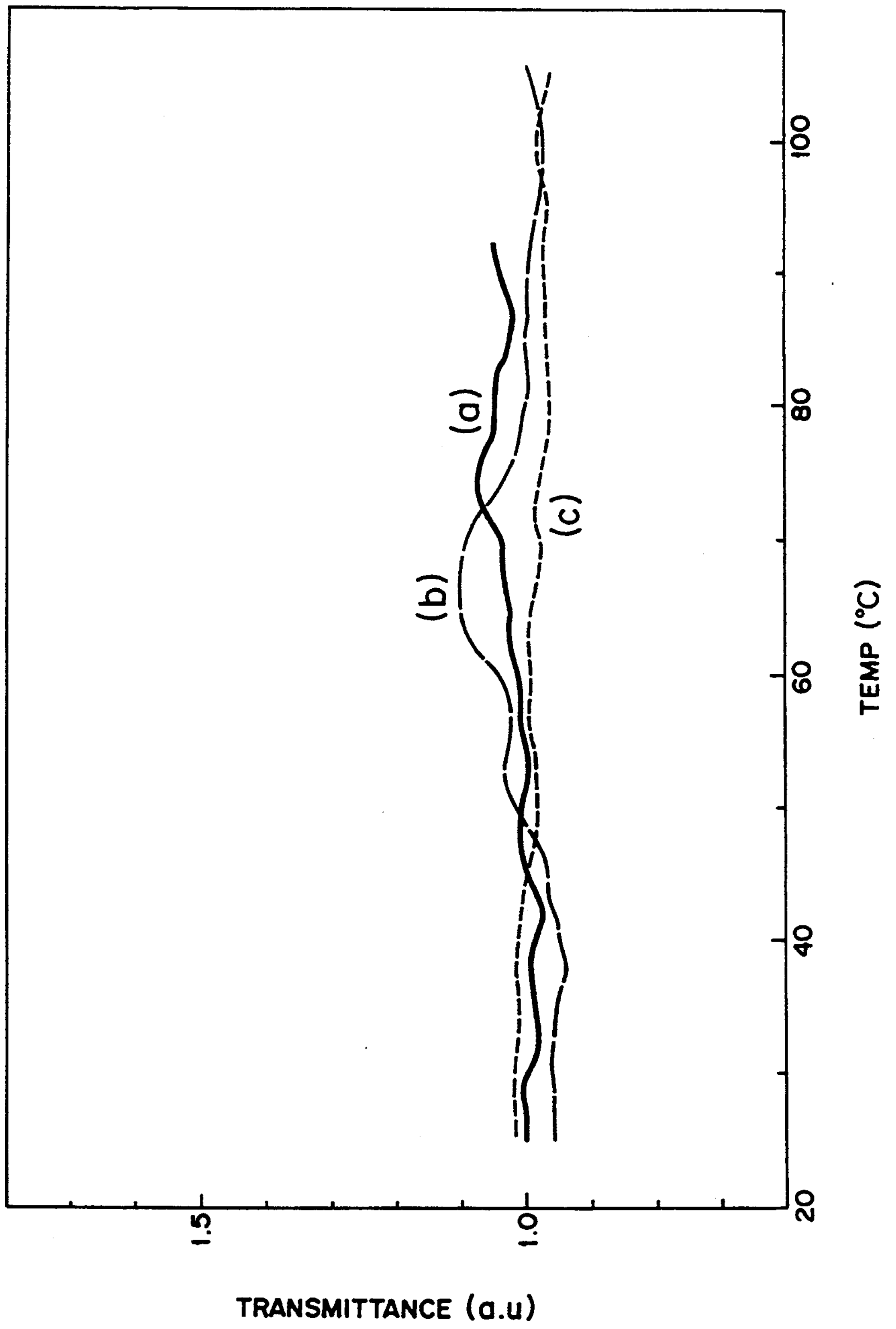
FIG. 22 is a graph showing the changes in the optical transmittance of comparative reversible thermosensitive coloring compositions, depending upon the changes in the temperature. Comparative coloring composition.

The procedure for preparing the reversible thermosensitive coloring composition in Example 1-4 was repeated except that the 3-dibutylamino-7-(o-chlorophenyl)-aminofluoran employed as the coloring agent in Example 1-4 was replaced by 3-(N-n-propyl-N-methyl)amino-6-methyl-7-phenylaminofluoran, whereby a comparative reversible thermosensitive coloring composition (b) in the color development state was obtained. The curve (b) in FIG. 22 shows the changes in the transmittance of the thus obtained coloring composition depending upon the temperature thereof. The decolorization of the above composition was not observed even when the temperature was raised.

The above-mentioned coloring compositions (a) and (b) in the color development state were subjected to the DSC analysis. FIGS. 4 and 5 respectively show the results of the DSC analysis of the composition (a) and the composition (b). No exothermic peaks were observed in the temperature elevation process in the DSC analysis of the compositions (a) and (b).

EXAMPLE 2

Example 2-1

The procedure for preparing the reversible thermosensitive coloring composition in Example 1-1 was repeated except that the dodecylphosphonic acid employed as the color developer in Example 1-1 was replaced by eicosylthiomalic acid, whereby a reversible thermosensitive coloring composition of the present invention in the color development state was obtained.

Examples 2-2 to 2-6

The procedure for preparing the reversible thermosensitive coloring composition in Example 2-1 was repeated except that the 3-dibutylamino-7-(o-chlorophenyl)aminofluoran employed as the coloring agent in Example 2-1 was replaced by each of the fluoran compounds as shown in Table-2, whereby the reversible thermosensitive coloring compositions of the present invention in the color development state were obtained.

TABLE 2

| Example No. | Coloring Agent | Decolorization Initiation Temperature (°C.) |
|---|---|---|
| 2-1 (a) | 3-dibutylamino-7-(o-chloro-phenyl)aminofluoran | 47 |
| 2-2 (b) | 3-dibutylamino-6-methyl-7-phenyl-aminofluoran | 51 |

TABLE 2-continued

| Example No. | Coloring Agent | Decolorization Initiation Temperature (°C.) |
|---|---|---|
| 2-3 (c) | 3-diethylamino-6-methyl-7-phenyl-aminofluoran | 60 |
| 2-4 (d) | 3-(N-methyl-N-cyclohexyl)amino-6-methyl-7-phenylaminofluoran | 55 |
| 2-5 (e) | 3-(N-methyl-N-propyl)amino-6-methyl-7-phenylaminofluoran | 62 |
| 2-6 (f) | 3-diethylamino-E-methyl-7-(2',4'-dimethylphenyl)aminofluoran | 51 |

Figure 23:
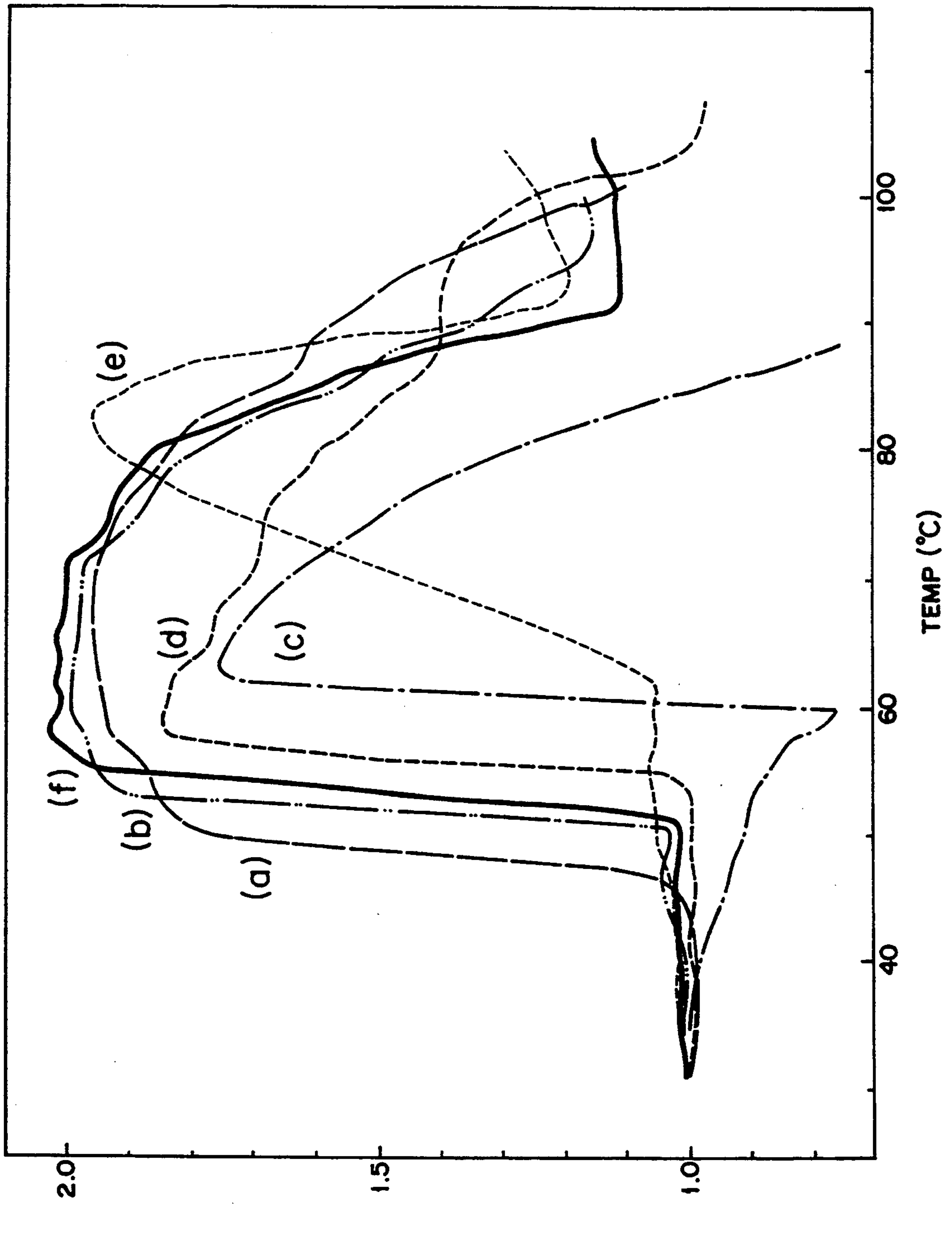
FIG. 23 is a graph showing the decolorization temperature ranges of reversible thermosensitive coloring compositions of the present invention, which comprise eicosylmalic acid serving as a color developer and various fluoran compounds serving as coloring agents.

FIG. 23 shows the transmittance of each of the thus obtained colored compositions and Table-2 shows the decolorization initiation temperatures thereof. These coloring compositions in the color development state had their own definite decolorization temperature ranges, so that these coloring compositions were reversible thermosensitive coloring compositions.

Figure 24:
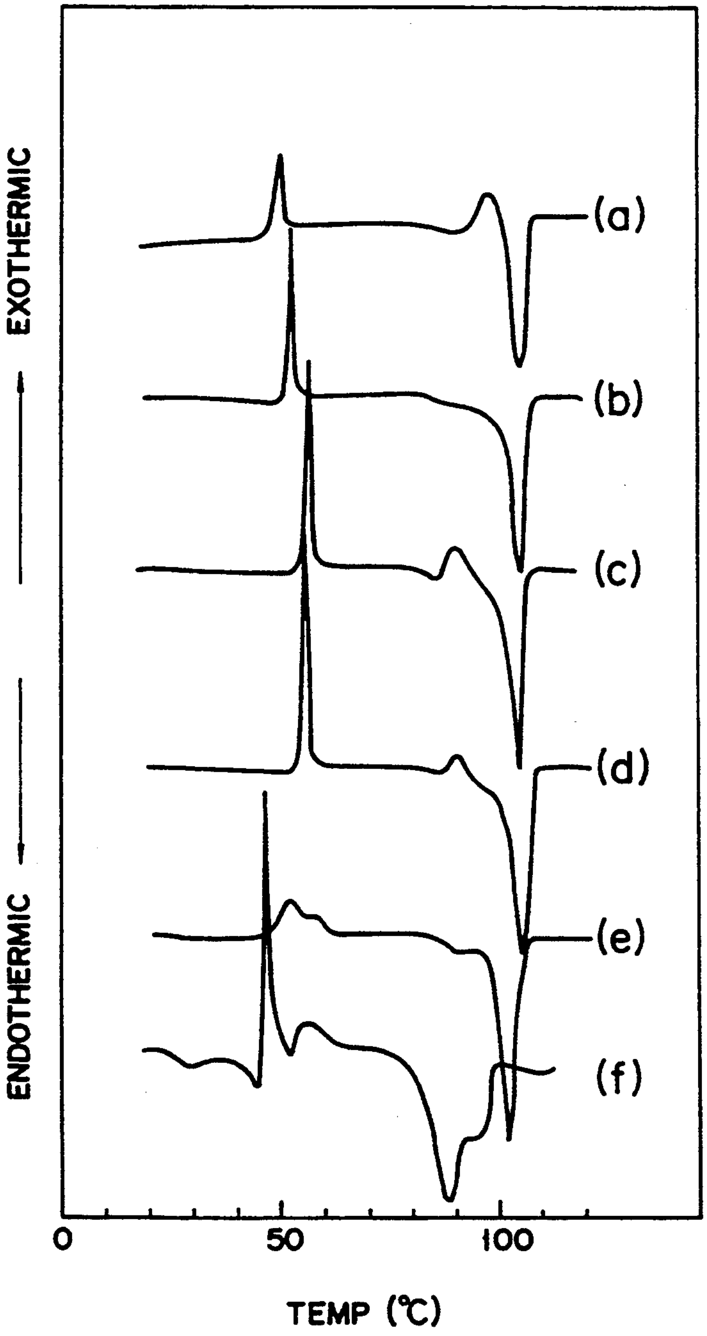
FIG. 24 is a graph showing the results of a DSC analysis of reversible thermosensitive coloring compositions of the present invention, which comprise eicosylmalic acid serving as a color developer and various fluoran compounds serving as coloring agents.

Furthermore, the above reversible thermosensitive coloring compositions were subjected to the DSC analysis. The results of the analysis are shown in FIG. 24. The above reversible thermosensitive coloring compositions had their own exothermic peaks in the temperature elevation process in the DSC analysis.

COMPARATIVE EXAMPLE 2

The procedure for preparing the reversible thermosensitive coloring composition in Example 2 was repeated except that the eicosylthiomalic acid employed as the color developer in Example 2 was replaced by 2,2-bis-p-hydroxyphenylpropane, whereby the comparative reversible thermosensitive coloring compositions in the color development state were obtained.

The transmittance of each of the thus obtained coloring compositions in the color development state was measured. All of the above compositions had no decolorization temperature ranges and remained in the color development state in the temperature elevation process. The curve (c) in FIG. 22 shows the transmittance of the composition comprising 2,2-bis-p-hydroxyphenylpropane and 3-dibutylamino-7-(o-chlorophenyl)aminofluoran.

EXAMPLE 3

Example 3-1

A coating liquid for the formation of a recording layer was prepared by pulverizing a mixture of the following components in a ball mill so as to have a particle size of 1 to 4 μm:

| | parts by weight |
|---|---|
| 3-dibutylamino-7-(o-chlorophenyl)-aminofluoran (coloring agent) | 10 |
| Tetradecylphosphonic acid (color developer) | 30 |
| Vinyl chloride - vinyl acetate copolymer (Trademark "VYHH", made by Union Carbide Japan K.K.) (binder resin) | 45 |
| Toluene (solvent) | 200 |
| Methyl ethyl ketone (solvent) | 200 |

The thus obtained coating liquid was coated by a wire bar on a polyester film with a thickness of 100 μm, and then dried, so that a recording layer with a thickness of about 6.0 μm was formed on the support. Thus a reversible thermosensitive coloring recording medium of the present invention was obtained.

Examples 3-2 to 3-69

The procedure for preparing the reversible thermosensitive coloring recording medium in Example 3-1 was repeated except that the formulation of the coating liquid for the recording layer in Example 3-1 was changed to the following formulations as shown in Table-3, so that the reversible thermosensitive coloring recording media of the present invention were obtained.

TABLE 3

| Ex. No. | Coloring Agent | Color Developer | Resin | Solvents |
|---|---|---|---|---|
| 3-1 | 3-dibutylamino-7-(o-chlorophenyl)amino-fluoran: 10 | Tetradecylphosphonic acid: 30 | Vinyl chloride - vinyl acetate copolymer (Trademark "VYHH" made by Union Carbide Japan K.K.): 45 | Toluene: 200 Methyl ethyl ketone: 200 |
| 3-2 | 3-dibutylamino-7-(o-chlorophenyl)amino-fluoran: 10 | Hexadecylphosphonic acid: 30 | Vinyl chloride - vinyl acetate copolymer (Trademark "VYHH" made by Union Carbide Japan K.K.): 45 | Toluene: 200 Methyl ethyl ketone: 200 |
| 3-3 | 3-dibutylamino-7-(o-chlorophenyl)amino-fluoran: 10 | Octadecylphosphonic acid: 30 | Vinyl chloride - vinyl acetate copolymer (Trademark "VYHH" made by Union Carbide Japan K.K.): 45 | Toluene: 200 Methyl ethyl ketone: 200 |
| 3-4 | 3-dibutylamino-7-(o-chlorophenyl)amino-fluoran: 10 | Eicosylphosphonic acid: 30 | Vinyl chloride - vinyl acetate copolymer (Trademark "VYHH" made by Union Carbide Japan K.K.): 45 | Toluene: 200 Methyl ethyl ketone: 200 |
| 3-5 | 3-dibutylamino-7-(o-chlorophenyl)amino-fluoran: 10 | Docosylphosphonic acid: 30 | Vinyl chloride - vinyl acetate copolymer (Trademark "VYHH" made by Union Carbide Japan K.K.): 45 | Toluene: 200 Methyl ethyl ketone: 200 |
| 3-6 | 3-[N-ethyl-N-(p-methyl-phenyl)amino]-6-methyl-7-phenylamino-fluoran: 10 | Octadecylphosphonic acid: 30 | Vinyl chloride - vinyl acetate copolymer (Trademark "VYHH" made by Union Carbide Japan K.K.): 45 | Toluene: 200 Methyl ethyl ketone: 200 |

TABLE 3-continued

| Ex. No. | Coloring Agent | Color Developer | Resin | Solvents |
|---|---|---|---|---|
| 3-7 | 3-[N-ethyl-N-(p-methylphenyl)amino]-6-methyl-7-phenylaminofluoran: 10 | Eicosylphosphonic acid: 30 | Vinyl chloride - vinyl acetate copolymer (Trademark "VYHH" made by Union Carbide Japan K.K.): 45 | Toluene: 200 Methyl ethyl ketone: 200 |
| 3-8 | 3-(N-ethyl-N-isoamyl)-amino-7,8-benzofluoran: 10 | Octadecylphosphonic acid: 30 | Vinyl chloride - vinyl acetate copolymer (Trademark "VYHH" made by Union Carbide Japan K.K.): 45 | Toluene: 200 Methyl ethyl ketone: 200 |
| 3-9 | 3-(N-ethyl-N-isoamyl)-amino-7,8-benzofluoran: 10 | Eicosylphosphonic acid: 30 | Vinyl chloride - vinyl acetate copolymer (Trademark "VYHH" made by Union Carbide Japan K.K.): 45 | Toluene: 200 Methyl ethyl ketone: 200 |
| 3-10 | 3-diethylamino-7-(o-chlorophenyl)aminofluoran: 10 | Octadecylphosphonic acid: 30 | Polystyrene (Made by Aldrich Japan Inc.): 20 (MW: 280,000) | Toluene: 200 Methyl ethyl ketone: 200 |
| 3-11 | 3-dibutylamino-7-(o-chlorophenyl)aminofluoran: 10 | Octadecylphosphonic acid: 30 | Saturated polyester (Trademark "Vylon200" made by TOYOBO CO., Ltd.): 45 | Toluene: 200 Methyl ethyl ketone: 200 |
| 3-12 | 3-dibutylamino-7-(o-chlorophenyl)aminofluoran: 10 | Eicosylphosphonic acid: 30 | Acrylic resin (Trademark "BR102" made by Mitsubishi Rayon Engineering Co., Ltd.): 45 | Toluene: 200 Methyl ethyl ketone: 200 |
| 3-13 | 3-dibutylamino-7-(o-chlorophenyl)aminofluoran: 10 | Eicosylphosphonic acid: 30 | Vinyl acetate resin (Made by Aldrich Japan Inc.): 45 | Toluene: 200 Methyl ethyl ketone: 200 |
| 3-14 | 3-cyclohexylamino-6-chlorofluoran: 10 | Eicosylphosphonic acid: 30 | Ethylcellulose (Made by Kanto Chemical Co., Inc.): 20 | Toluene: 200 Methyl ethyl ketone: 200 |
| 3-15 | 3-dibutylamino-7-(o-chlorophenyl)aminofluoran: 10 | α-hydroxyhexadecanoic acid: 30 | Vinyl chloride - vinyl acetate copolymer (Trademark "VYHH" made by Union Carbide Japan K.K.): 45 | Toluene: 200 Methyl ethyl ketone: 200 |
| 3-16 | 3-dibutylamino-7-(o-chlorophenyl)aminofluoran: 10 | α-hydroxyoctadecanoic acid: 30 | Vinyl chloride - vinyl acetate copolymer (Trademark "VYHH" made by Union Carbide Japan K.K.): 45 | Toluene: 200 Methyl ethyl ketone: 200 |
| 3-17 | 3-[N-ethyl-N-(p-methylphenyl)amino]-6-methyl-7-phenylaminofluoran: 10 | α-hydroxyoctadecanoic acid: 30 | Vinyl chloride - vinyl acetate copolymer (Trademark "VYHH" made by Union Carbide Japan K.K.): 45 | Toluene: 200 Methyl ethyl ketone: 200 |
| 3-18 | 3-diethylamino-7-(o-chlorophenyl)aminofluoran: 10 | α-hydroxyoctadecanoic acid: 30 | Vinyl chloride - vinyl acetate copolymer (Trademark "VYHH" made by Union Carbide Japan K.K.): 45 | Toluene: 200 Methyl ethyl ketone: 200 |
| 3-19 | 3-diethylamino-7-(o-chlorophenyl)aminofluoran: 10 | α-hydroxyeicosanoic acid: 30 | Vinyl chloride - vinyl acetate copolymer (Trademark "VYHH" made by Union Carbide Japan K.K.): 45 | Toluene: 200 Methyl ethyl ketone: 200 |
| 3-20 | 3-dibutylamino-7-(o-chlorophenyl)aminofluoran: 10 | α-hydroxyeicosanoic acid: 30 | Vinyl chloride - vinyl acetate copolymer (Trademark "VYHH" made by Union Carbide Japan K.K.): 45 | Toluene: 200 Methyl ethyl ketone: 200 |
| 3-21 | 3-dibutylamino-7-(o-chlorophenyl)aminofluoran: 10 | α-hydroxytetradecanoic acid: 30 | Vinyl chloride - vinyl acetate copolymer (Trademark "VYHH" made by Union Carbide Japan K.K.): 45 | Toluene: 200 Methyl ethyl ketone: 200 |
| 3-22 | 3-dibutylamino-7-(o-chlorophenyl)aminofluoran: 10 | 2-bromodocosanoic acid: 30 | Vinyl chloride - vinyl acetate copolymer (Trademark "VYHH" made by Union Carbide Japan K.K.): 45 | Toluene: 200 Methyl ethyl ketone: 200 |
| 3-23 | 3-dibutylamino-7-(o-chlorophenyl)aminofluoran: 10 | 2,3-dibromooctadecanoic acid: 30 | Vinyl chloride - vinyl acetate copolymer (Trademark "VYHH" made by Union Carbide Japan K.K.): 45 | Toluene: 200 Methyl ethyl ketone: 200 |
| 3-24 | 3-dibutylamino-7-(o- | 3-fluorooctadecanoic | Vinyl chloride - vinyl | Toluene: 200 |

TABLE 3-continued

| Ex. No. | Coloring Agent | Color Developer | Resin | Solvents |
|---|---|---|---|---|
| | chlorophenyl)amino-fluoran: 10 | acid: 30 | acetate copolymer (Trademark "VYHH" made by Union Carbide Japan K.K.): 45 | Methyl ethyl ketone: 200 |
| 3-25 | 3-dibutylamino-7-(o-chlorophenyl)amino-fluoran: 10 | 2-fluoroeicosanoic acid: 30 | Vinyl chloride - vinyl acetate copolymer (Trademark "VYHH" made by Union Carbide Japan K.K.): 45 | Toluene: 200 Methyl ethyl ketone: 200 |
| 3-26 | 3-dibutylamino-7-(o-chlorophenyl)amino-fluoran: 10 | 2-oxooctadecanoic acid: 30 | Vinyl chloride - vinyl acetate copolymer (Trademark "VYHH" made by Union Carbide Japan K.K.): 45 | Toluene: 200 Methyl ethyl ketone: 200 |
| 3-27 | 3-dibutylamino-7-(o-chlorophenyl)amino-fluoran: 10 | 3-oxooctadecanoic acid: 30 | Vinyl chloride - vinyl acetate copolymer (Trademark "VYHH" made by Union Carbide Japan K.K.): 45 | Toluene: 200 Methyl ethyl ketone: 200 |
| 3-28 | 3-dibutylamino-7-(o-chlorophenyl)amino-fluoran: 10 | 4-oxooctadecanoic acid: 30 | Vinyl chloride - vinyl acetate copolymer (Trademark "VYHH" made by Union Carbide Japan K.K.): 45 | Toluene: 200 Methyl ethyl ketone: 200 |
| 3-29 | 3-dibutylamino-7-(o-chlorophenyl)amino-fluoran: 10 | Eicosylthiomalic acid: 30 | Vinyl chloride - vinyl aceate copolymer (Trademark "VYHH" made by Union Carbide Japan K.K.): 45 | Toluene: 200 Methyl ethyl ketone: 200 |
| 3-30 | 3-diethylamino-6-methyl-7-phenylamino-fluoran: 10 | Eicosylthiomalic acid: 30 | Vinyl chloride - vinyl acetate copolymer (Trademark "VYHH" made by Union Carbide Japan K.K.): 45 | Toluene: 200 Methyl ethyl ketone: 200 |
| 3-31 | 3-dibutylamino-6-methyl-7-phenylamino-fluoran: 10 | Eicosylthiomalic acid: 30 | Vinyl chloride - vinyl acetate copolymer (Trademark "VYHH" made by Union Carbide Japan K.K.): 45 | Toluene: 200 Methyl ethyl ketone: 200 |
| 3-32 | 3-(N-methyl-N-cyclo-hexyl)amino-6-methyl-7-phenylamino-fluoran: 10 | Eicosylthiomalic acid: 30 | Vinyl chloride - vinyl acetate copolymer (Trademark "VYHH" made by Union Carbide Japan K.K.): 45 | Toluene: 200 Methyl ethyl ketone: 200 |
| 3-33 | 3-(N-methyl-N-propyl)-amino-6-methyl-7-phenylaminofluoran: 10 | Eicosylthiomalic acid: 30 | Vinyl chloride - vinyl acetate copolymer (Trademark "VYHH" made by Union Carbide Japan K.K.): 45 | Toluene: 200 Methyl ethyl ketone: 200 |
| 3-34 | 3-diethylamino-6-methyl-7-(2′,4′-dimethylphenyl)amino-fluoran: 10 | Eicosylthiomalic acid: 30 | Vinyl chloride - vinyl acetate copolymer (Trademark "VYHH" made by Union Carbide Japan K.K.): 45 | Toluene: 200 Methyl ethyl ketone: 200 |
| 3-35 | 3-diethylamino-6-methyl-7-phenylamino-fluoran: 10 | Octadecylthiomalic acid: 30 | Vinyl chloride - vinyl acetate copolymer (Trademark "VYHH" made by Union Carbide Japan K.K.): 45 | Toluene: 200 Methyl ethyl ketone: 200 |
| 3-36 | 3-(N-methyl-N-propyl)-amino-6-methyl-7-phenylaminofluoran: 10 | Octadecylthiomalic acid: 30 | Vinyl chloride - vinyl acetate copolymer (Trademark "VYHH" made by Union Carbide Japan K.K.): 45 | Toluene: 200 Methyl ethyl ketone: 200 |
| 3-37 | 3-(N-methyl-N-cyclo-hexyl)amino-6-methyl-7-phenylaminofluoran: 10 | Octadecylthiomalic acid: 30 | Ethylcellulose (made by Kanto Chemical Co., Inc.): 20 | Toluene: 200 Methyl ethyl ketone: 200 |
| 3-38 | 3-(N-methyl-N-propyl)-amino-6-methyl-7-phenylaminofluoran: 10 | Hexadecylthiomalic acid: 30 | Ethylcellulose (made by Kanto Chemical Co., Inc.): 20 | Toluene: 200 Methyl ethyl ketone: 200 |
| 3-39 | 3-dibutylamino-7-(o-chlorophenyl)amino-fluoran: 10 | Octadecyldithiomalic acid: 30 | Vinyl chloride - vinyl acetate copolymer (Trademark "VYHH" made by Union Carbide Japan K.K.): 45 | Toluene: 200 Methyl ethyl ketone: 200 |
| 3-40 | 3-diethylamino-6-methyl-7-phenylamino-fluoran: 10 | Octadecyldithiomalic acid: 30 | Vinyl chloride - vinyl acetate copolymer (Trademark "VYHH" made by Union Carbide Japan | Toluene: 200 Methyl ethyl ketone: 200 |

TABLE 3-continued

| Ex. No. | Coloring Agent | Color Developer | Resin | Solvents |
|---|---|---|---|---|
| | | | K.K.): 45 | |
| 3-41 | 3-dibutylamino-7-(o-chlorophenyl)amino-fluoran: 10 | Octadecylmalic acid: 30 | Vinyl chloride - vinyl acetate copolymer (Trademark "VYHH" made by Union Carbide Japan K.K.): 45 | Toluene: 200 Methyl ethyl ketone: 200 |
| 3-42 | 3-diethylamino-6-methyl-7-phenylamino-fluoran: 10 | Octadecylmalic acid: 30 | Vinyl chloride - vinyl acetate copolymer (Trademark "VYHH" made by Union Carbide Japan K.K.): 45 | Toluene: 200 Methyl ethyl ketone: 200 |
| 3-43 | 3-dibutylamino-7-(o-chlorophenyl)amino-fluoran: 10 | Octadecylsuccinic acid: 30 | Vinyl chloride - vinyl acetate copolymer (Trademark "VYHH" made by Union Carbide Japan K.K.): 45 | Toluene: 200 Methyl ethyl ketone: 200 |
| 3-44 | 3-diethylamino-6-methyl-7-phenylamino-fluoran: 10 | Octadecylsuccinic acid: 30 | Vinyl chloride - vinyl acetate copolymer (Trademark "VYHH" made by Union Carbide Japan K.K.): 45 | Toluene: 200 Methyl ethyl ketone: 200 |
| 3-45 | 3-dibutylamino-7-(o-chlorophenyl)amino-fluoran: 10 | Octadecylmalonic acid: 30 | Vinyl chloride - vinyl acetate copolymer (Trademark "VYHH" made by Union Carbide Japan K.K.): 45 | Toluene: 200 Methyl ethyl ketone: 200 |
| 3-46 | 3-[N-ethyl-N-(p-methyl-phenyl)amino]-6-methyl-7-phenylamino-fluoran: 10 | Octadecylmalonic acid: 30 | Vinyl chloride - vinyl acetate copolymer (Trademark "VYHH" made by Union Carbide Japan K.K.): 45 | Toluene: 200 Methyl ethyl ketone: 200 |
| 3-47 | 3-[N-ethyl-N-(p-methyl-phenyl)amino]-6-methyl-7-phenylamino-fluoran: 10 | Hexadecylmalonic acid: 30 | Vinyl chloride - vinyl acetate copolymer (Trademark "VYHH" made by Union Carbide Japan K.K.): 45 | Toluene: 200 Methyl ethyl ketone: 200 |
| 3-48 | 3-[N-ethyl-N-(p-methyl-phenyl)amino]-6-methyl-7-phenylamino-fluoran: 10 | Eicosylmalonic acid: 30 | Vinyl chloride - vinyl acetate copolymer (Trademark "VYHH" made by Union Carbide Japan K.K.): 45 | Toluene: 200 Methyl ethyl ketone: 200 |
| 3-49 | 3-dibutylamino-7-(o-chlorophenyl)amino-fluoran: 10 | Eicosylmalonic acid: 30 | Vinyl chloride - vinyl acetate copolymer (Trademark "VYHH" made by Union Carbide Japan K.K.): 45 | Toluene: 200 Methyl ethyl ketone: 200 |
| 3-50 | 3-diethylamino-7-(o-chlorophenyl)amino-fluoran: 10 | Tetracosylmalonic acid: 30 | Vinyl chloride - vinyl acetate copolymer (Trademark "VYHH" made by Union Carbide Japan K.K.): 45 | Toluene: 200 Methyl ethyl ketone: 200 |
| 3-51 | 3-dibutylamino-7-(o-chlorophenyl)amino-fluoran: 10 | Dihexadecylmalonic acid: 30 | Vinyl chloride - vinyl acetate copolymer (Trademark "VYHH" made by Union Carbide Japan K.K.): 45 | Toluene: 200 Methyl ethyl ketone: 200 |
| 3-52 | 3-dibutylamino-7-(o-chlorophenyl)amino-fluoran: 10 | 2-octadecylpentane diacid: 30 | Vinyl chloride - vinyl acetate copolymer (Trademark "VYHH" made by Union Carbide Japan K.K.): 45 | Toluene: 200 Methyl ethyl ketone: 200 |
| 3-53 | 3-dibutylamino-7-(o-chlorophenyl)amino-fluoran: 10 | 2-octadecylhexane diacid: 30 | Vinyl chloride - vinyl acetate copolymer (Trademark "VYHH" made by Union Carbide Japan K.K.): 45 | Toluene: 200 Methyl ethyl ketone: 200 |
| 3-54 | 3-dibutylamino-7-(o-chlorophenyl)amino-fluoran: 10 | 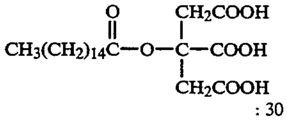 : 30 | Vinyl chloride - vinyl acetate copolymer (Trademark "VYHH" made by Union Carbide Japan K.K.): 45 | Toluene: 200 Methyl ethyl ketone: 200 |
| 3-55 | 3[N-ethyl-N-(p-methyl-phenyl)amino]-6-methyl-7-phenyl fluoran: 10 | 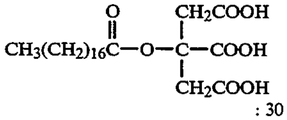 : 30 | Vinyl chloride - vinyl acetate copolymer (Trademark "VYHH" made by Union Carbide Japan K.K.): 45 | Toluene: 200 Methyl ethyl ketone: 200 |
| 3-56 | 3-diethylamino-6- | p-(hexadecylthio)- | Vinyl chloride - vinyl | Toluene: 200 |

TABLE 3-continued

| Ex. No. | Coloring Agent | Color Developer | Resin | Solvents |
|---|---|---|---|---|
| | methyl-7-phenylamino-fluoran: 10 | phenol: 30 | acetate copolymer (Trademark "VYHH" made by Union Carbide Japan K.K.): 45 | Methyl ethyl ketone: 200 |
| 3-57 | 3-(N-methyl-N-cyclo-hexyl)amino-6-methyl-7-phenylaminofluoran: 10 | p-(octadecylthio)-phenol: 30 | Vinyl chloride - vinyl acetate copolymer (Trademark "VYHH" made by Union Carbide Japan K.K.): 45 | Toluene: 200 Methyl ethyl ketone: 200 |
| 3-58 | 3-diethylamino-6-methyl-7-phenylamino-fluoran: 10 | p-(octadecylthio)-phenol: 30 | Vinyl chloride - vinyl acetate copolymer (Trademark "VYHH" made by Union Carbide Japan K.K.): 45 | Toluene: 200 Methyl ethyl ketone: 200 |
| 3-59 | 3-diethylamino-6-methyl-7-phenylamino-fluoran: 10 | p-(eicosylthio)-phenol: 30 | Vinyl chloride - vinyl acetate copolymer (Trademark "VYHH" made by Union Carbide Japan K.K.): 45 | Toluene: 200 Methyl ethyl ketone: 200 |
| 3-60 | 3-(N-methyl-N-cyclo-hexyl)amino-6-methyl-7-phenylaminofluoran: 10 | p-(eicosylthio)-phenol: 30 | Vinyl chloride - vinyl acetate copolymer (Trademark "VYHH" made by Union Carbide Japan K.K.): 45 | Toluene: 200 Methyl ethyl ketone: 200 |
| 3-61 | 3-(N-methyl-N-cyclo-hexyl)amino-6-methyl-7-phenylaminofluoran: 10 | p-(octadecyloxy)-phenol: 30 | Vinyl chloride - vinyl acetate copolymer (Trademark "VYHH' made by Union Carbide Japan K.K.): 45 | Toluene: 200 Methyl ethyl ketone: 200 |
| 3-62 | 3-diethylamino-6-methyl-7-phenylamino-fluoran: 10 | p-(eicosyloxy)phenol: 30 | Vinyl chloride - vinyl acetate copolymer (Trademark "VYHH" made by Union Carbide Japan K.K.): 45 | Toluene: 200 Methyl ethyl ketone: 200 |
| 3-63 | 3-diethylamino-6-methyl-7-phenylamino-fluoran: 10 | p-hexadecylcarbamoyl-phenol: 30 | Vinyl chloride - vinyl acetate copolymer (Trademark "VYHH" made by Union Carbide Japan K.K.): 45 | Toluene: 200 Methyl ethyl ketone: 200 |
| 3-64 | 3-diethylamino-6-methyl-7-phenylamino-fluoran: 10 | p-octadecylcarbamoyl-phenol: 30 | Vinyl chloride - vinyl acetate copolymer (Trademark "VYHH" made by Union Carbide Japan K.K.): 45 | Toluene: 200 Methyl ethyl ketone: 200 |
| 3-65 | 3-(N-methyl-N-cyclo-hexyl)amino-6-methyl-7-phenylaminofluoran: 10 | p-octadecylcarbamoyl-phenol: 30 | Vinyl chloride - vinyl acetate copolymer (Trademark "VYHH" made by Union Carbide Japan K.K.): 45 | Toluene: 200 Methyl ethyl ketone: 200 |
| 3-66 | 3-(N-methyl-N-cyclo-hexyl)amino-6-methyl-7-phenylaminofluoran: 10 | p-eicosylcarbamoyl-phenol: 30 | Vinyl chloride - vinyl acetate copolymer (Trademark "VYHH" made by Union Carbide Japan K.K.): 45 | Toluene: 200 Methyl ethyl ketone: 200 |
| 3-67 | 3-diethylamino-6-methyl-7-phenylamino-fluoran: 10 | p-eicosylcarbamoyl-phenol: 30 | Vinyl chloride - vinyl acetate copolymer (Trademark "VYHH" made by Union Carbide Japan K.K.): 45 | Toluene: 200 Methyl ethyl ketone: 200 |
| 3-68 | 3-dibutylamino-7-(o-chlorophenyl)amino-fluoran: 6 | Octadecyl gallate: 20 | Vinyl chloride - vinyl acetate copolymer (Trademark "VYHH" made by Union Carbide Japan K.K.): 45 | Toluene: 200 Methyl ethyl ketone: 200 |
| 3-69 | 3-dibutylamino-7-(o-chlorophenyl)amino-fluoran: 6 | Eicosyl gallate: 20 | Vinyl chloride - vinyl acetate copolymer (Trademark "VYHH" made by Union Carbide Japan K.K.): 45 | Toluene: 200 Methyl ethyl ketone: 200 |

Images were thermally printed on the thus obtained reversible thermosensitive coloring recording media by a thermal-head-built-in heat gradient tester (made by Toyo Seiki Seisaku-sho, Ltd.) under the following conditions:

| | |
|---|---|
| Temperature: | 130° C. |

-continued

| | |
|---|---|
| Contact Time: | 1 second |
| Applied Pressure: | 1 kg/cm$^2$ |

The density of each of the printed images was measured with Macbeth densitometer RD-918. The color image density of each reversible thermosensitive coloring recording medium is shown in Table-4.

Then each color-developed sample was placed in a thermostatic chamber with the temperature thereof elevated to each decolorization temperature as shown in Table-4 for about 20 seconds and decolorized. The decolorization density of each reversible thermosensitive coloring recording medium is shown in Table-4.

Furthermore, the above-mentioned process of the color image printing and the decolorization of the recording media was repeated ten times to evaluate the reversibility thereof. The result was that it was possible to repeat the color development and the decolorization without any problems with respect to all of the thermosensitive recording media obtained in Example 3.

TABLE 4

| Example No. | Color Image Density | Decolorization Temperature (°C.) | Decolorization Density |
|---|---|---|---|
| 3-1 | 1.63 | 60 | 0.28 |
| 3-2 | 1.68 | 67 | 0.26 |
| 3-3 | 1.72 | 73 | 0.24 |
| 3-4 | 1.73 | 82 | 0.23 |
| 3-5 | 1.70 | 84 | 0.23 |
| 3-6 | 1.84 | 73 | 0.30 |
| 3-7 | 1.88 | 82 | 0.31 |
| 3-8 | 1.61 | 73 | 0.24 |
| 3-9 | 1.65 | 82 | 0.25 |
| 3-10 | 1.53 | 73 | 0.30 |
| 3-11 | 1.55 | 73 | 0.23 |
| 3-12 | 1.78 | 82 | 0.25 |
| 3-13 | 1.82 | 82 | 0.22 |
| 3-14 | 1.86 | 82 | 0.32 |
| 3-15 | 1.47 | 70 | 0.32 |
| 3-16 | 1.44 | 70 | 0.30 |
| 3-17 | 1.50 | 70 | 0.33 |
| 3-18 | 1.44 | 70 | 0.35 |
| 3-19 | 1.48 | 70 | 0.34 |
| 3-20 | 1.41 | 70 | 0.30 |
| 3-21 | 1.48 | 65 | 0.33 |
| 3-22 | 1.42 | 50 | 0.35 |
| 3-23 | 1.35 | 50 | 0.32 |
| 3-24 | 1.31 | 55 | 0.40 |
| 3-25 | 1.38 | 55 | 0.38 |
| 3-26 | 1.40 | 50 | 0.30 |
| 3-27 | 1.32 | 60 | 0.35 |
| 3-28 | 1.30 | 60 | 0.28 |
| 3-29 | 1.58 | 70 | 0.21 |
| 3-30 | 1.70 | 75 | 0.36 |
| 3-31 | 1.68 | 70 | 0.29 |
| 3-32 | 1.75 | 75 | 0.35 |
| 3-33 | 1.75 | 75 | 0.34 |
| 3-34 | 1.70 | 75 | 0.34 |
| 3-35 | 1.63 | 65 | 0.37 |
| 3-36 | 1.69 | 65 | 0.33 |
| 3-37 | 1.62 | 65 | 0.32 |
| 3-38 | 1.55 | 60 | 0.34 |
| 3-39 | 1.52 | 70 | 0.31 |
| 3-40 | 1.68 | 70 | 0.39 |
| 3-41 | 1.40 | 70 | 0.32 |
| 3-42 | 1.56 | 70 | 0.41 |
| 3-43 | 1.32 | 70 | 0.29 |
| 3-44 | 1.46 | 70 | 0.36 |
| 3-45 | 1.57 | 70 | 0.25 |
| 3-46 | 1.62 | 70 | 0.29 |
| 3-47 | 1.61 | 70 | 0.32 |
| 3-48 | 1.61 | 70 | 0.30 |

TABLE 4-continued

| Example No. | Color Image Density | Decolorization Temperature (°C.) | Decolorization Density |
|---|---|---|---|
| 3-49 | 1.53 | 70 | 0.24 |
| 3-50 | 1.50 | 65 | 0.26 |
| 3-51 | 1.56 | 60 | 0.35 |
| 3-52 | 1.31 | 55 | 0.33 |
| 3-53 | 1.34 | 55 | 0.35 |
| 3-54 | 1.53 | 70 | 0.39 |
| 3-55 | 1.59 | 70 | 0.44 |
| 3-56 | 1.27 | 55 | 0.24 |
| 3-57 | 1.20 | 55 | 0.23 |
| 3-58 | 1.28 | 55 | 0.25 |
| 3-59 | 1.25 | 55 | 0.27 |
| 3-60 | 1.21 | 55 | 0.24 |
| 3-61 | 1.20 | 55 | 0.25 |
| 3-62 | 1.26 | 55 | 0.29 |
| 3-63 | 1.30 | 55 | 0.31 |
| 3-64 | 1.38 | 55 | 0.30 |
| 3-65 | 1.32 | 55 | 0.27 |
| 3-66 | 1.37 | 55 | 0.29 |
| 3-67 | 1.30 | 55 | 0.30 |
| 3-68 | 1.69 | 60 | 0.82 |
| 3-69 | 1.72 | 60 | 0.80 |

EXAMPLE 4

Example 4-1

A coating liquid for a recording layer was prepared by mixing and stirring the following components:

| | parts by weight |
|---|---|
| 3-dibutylamino-7-(o-chlorophenyl)-aminofluoran (coloring agent) | 2 |
| Eicosylthiomalic acid (color developer) | 6 |
| Vinyl chloride - vinyl acetate copolymer (Trademark "VYHH", made by Union Carbide Japan K.K.) (binder resin) | 20 |
| Tetrahydrofuran (solvent) | 80 |
| 1,4-dioxane (solvent) | 20 |

The thus prepared coating liquid was coated by a wire bar on a polyester film with a thickness of 100 μm, and then dried at 110° C., so that a recording layer with a thickness of about 8 μm was formed on the support. Thus a reversible thermosensitive coloring recording medium of the present invention was obtained.

Examples 4-2 to 4-5

The procedure for preparing the reversible thermosensitive coloring recording medium in Example 4-1 was repeated except that the formulation of the coating liquid for the recording layer in Example 4-1 was changed to the following formulations as shown in Table-5, so that the reversible thermosensitive coloring recording media of the present invention were obtained.

TABLE 5

| Ex. No. | Coloring Agent | Color Developer | Resin | Solvents |
|---|---|---|---|---|
| 4-1 | 3-dibutylamino-7-(o-chlorophenyl)amino-fluoran: 2 | Eicosylthiomalic acid: 6 | Vinyl chloride - vinyl acetate copolymer (Trademark "VYHH" made by Union Carbide Japan K.K.): 20 | Tetrahydrofuran: 80<br>1,4-dioxane: 20 |
| 4-2 | 3-diethylamino-6-chloro-7-phenylamino- | Eicosylthiomalic acid: 6 | Vinyl chloride - vinyl acetate copolymer | Tetrahydrofuran: 80<br>1,4-dioxane: 20 |

TABLE 5-continued

| Ex. No. | Coloring Agent | Color Developer | Resin | Solvents |
|---|---|---|---|---|
| | fluoran: 2 | | (Trademark "VYHH" made by Union Carbide Japan K.K.): 20 | |
| 4-3 | 3-diethylamino-6-methyl-7-chloro-fluoran: 2 | Eicosylthiomalic acid: 6 | Vinyl chloride - vinyl acetate copolymer (Trademark "VYHH" made by Union Carbide Japan K.K.): 20 | Tetrahydrofuran: 80 1,4-dioxane: 20 |
| 4-4 | 3-dibutylamino-7-(o-chlorophenyl)amino-fluoran: 2 | Octadecylmalonic acid: 6 | Vinyl chloride - vinyl acetate copolymer (Trademark "VYHH" made by Union Carbide Japan K.K.): 20 | Tetrahydrofuran: 80 1,4-dioxane: 20 |
| 4-5 | 3-[N-ethyl-N-(p-methyl-phenyl)amino]-6-methyl-7-phenylamino-fluoran: 2 | Octadecylmalonic acid: 6 | Vinyl chloride - vinyl acetate copolymer (Trademark "VYHH" made by Union Carbide Japan K.K.): 20 | Tetrahydrofuran: 80 1,4-dioxane: 20 |

The recording layer of each reversible thermosensitive coloring recording medium was in the color development state because the drying temperature was higher than the color development temperature. Each reversible thermosensitive coloring recording medium was placed in an oven at each decolorization temperature shown in Table-6 for 10 seconds, and decolorized in its entirety.

Each recording medium was loaded in a CUVAX-MC50 thermal printer made by Ricoh Co., Ltd. and images were printed with a thermal head thereof. Clear black images with a transparent background were obtained on all of the above reversible thermosensitive coloring recording media. Then each image-bearing sample was mounted in an overhead projector and clear projected images were seen. The color image density of each reversible thermosensitive coloring recording medium is shown in Table-6.

Then each image-bearing sample was placed in a thermostatic chamber at each decolorization temperature shown in Table-6 for about 20 seconds and decolorized. The decolorization density of each reversible thermosensitive coloring recording medium is also shown in Table-6. It was confirmed that it was possible to repeat the color development and decolorization without any problems with respect to all of the reversible thermosensitive coloring recording media obtained in Example 4.

TABLE 6

| Example No. | Color Image Density | Decolorization Temperature (°C.) | Decolorization Density |
|---|---|---|---|
| 4-1 | 1.46 | 70 | 0.20 |
| 4-2 | 1.60 | 75 | 0.28 |
| 4-3 | 1.43 | 75 | 0.26 |
| 4-4 | 1.49 | 70 | 0.24 |
| 4-5 | 1.57 | 70 | 0.2 |

EXAMPLE 5

Example 5-1

A coating liquid for a recording layer was prepared by pulverizing a mixture of the following components in a ball mill so as to have a particle size of 1 to 4 μm:

| | parts by weight |
|---|---|
| 3-dibutylamino-7-(o-chlorophenyl)-aminofluoran (coloring agent) | 10 |
| Octadecylphosphonic acid (color developer) | 30 |
| Vinyl chloride - vinyl acetate copolymer (Trademark "VYHH", made by Union Carbide Japan K.K.) (binder resin) | 45 |
| Toluene (solvent) | 200 |
| Methyl ethyl ketone (solvent) | 200 |

The thus obtained coating liquid was coated by a wire bar on a sheet of commercially available synthetic paper (Trademark "Yupo FPG #150", made by Oji-Yuka Synthetic Paper Co., Ltd.) serving as a support, and then dried, so that a recording layer with a thickness of about 7 μm was formed on the support. Thus a reversible thermosensitive coloring recording medium of the present invention was obtained.

Examples 5-2 to 5-4

The procedure for preparing the reversible thermosensitive coloring recording medium in Example 5-1 was repeated except that the formulation of the coating liquid for the recording layer and the support employed in Example 5-1 were replaced by the following formulations and the supports as shown in Table-7, so that the reversible thermosensitive coloring recording media of the present invention were obtained.

TABLE 7

| Ex. No. | Support | Coloring Agent | Color Developer | Resin | Solvents |
|---|---|---|---|---|---|
| 5-1 | Synthetic paper (Trademark "Yupo FPG #150" made by Oji-Yuka Synthetic Paper Co., Ltd.) | 3-dibutylamino-7-(o-chlorophenyl)-aminofluoran: 10 | Octadecyl-phosphonic acid: 30 | Vinyl chloride - vinyl acetate copolymer (Trademark "VYHH" made by Union Carbide Japan K.K.): 45 | Toluene: 200 Methyl ethyl ketone: 200 |
| 5-2 | White PET film | 3-dibutylamino-7- | Eicosylphosphonic | Vinyl chloride - vinyl | Toluene: 200 |

TABLE 7-continued

| Ex. No. | Support | Coloring Agent | Color Developer | Resin | Solvents |
|---|---|---|---|---|---|
| | with a thickness of 100 $\mu m$ (Trademark "Lumirror E20" made by Toray Industries, Inc.) | (o-chlorophenyl)-aminofluoran: 10 | acid: 30 | acetate copolymer (Trademark "VYHH" made by Union Carbide Japan K.K.): 45 | Metbyl ethyl ketone: 200 |
| 5-3 | Synthetic paper (Trademark "Yupo SGG #110" made by Oji-Yuka Synthetic Paper Co., Ltd.) | 3-(N-methyl-N-cyclohexyl)amino-6-methyl-7-phenyl-aminofluoran: 10 | Eicosylthiomalic acid: 30 | Vinyl chloride - vinyl acetate copolymer (Trademark "VYHH" made by Union Carbide Japan K.K.): 45 | Toluene: 200 Methyl ethyl ketone: 200 |
| 5-4 | White PET film with a thickness of 100 $\mu m$ (Trademark "U-5" made by TEIJIN LIMITED) | 3-[N-ethyl-N-(p-methylphenyl)-amino]-6-methyl-7-phenylamino-fluoran: 10 | $\alpha$-hydroxyocta-decanoic acid: 30 | Vinyl chloride - vinyl acetate copolymer (Trademark "VYHH" made by Union Carbide Japan K.K.): 45 | Toluene: 200 Methyl ethyl ketone: 200 |

Each of the thus obtained recording medium was loaded in a thermal printer and images were printed with a thermal head. Clear black images with a white background were obtained on all of the recording media. The color image density of each recording medium is shown in Table-8.

Furthermore, each image-bearing sample was decolorized by passing through a heated roller at each decolorization temperature as shown in Table-8. The decolorization density is also shown in Table-8. The color development and the decolorization could be repeated on the reversible thermosensitive coloring recording media obtained in Example 5.

TABLE 8

| Example No. | Color Image Density | Temperature of Decolorization (°C.) | Decolorization Density |
|---|---|---|---|
| 5-1 | 1.76 | 75 | 0.32 |
| 5-2 | 1.72 | 84 | 0.33 |
| 5-3 | 1.80 | 80 | 0.35 |
| 5-4 | 1.52 | 75 | 0.36 |

EXAMPLE 6

Example 6-1

A coating liquid for a recording layer was prepared by pulverizing a mixture of the following components in a ball mill so as to have a particle size of 1 to 4 $\mu m$:

| | parts by weight |
|---|---|
| 3-dibutylamino-7-(o-chlorophenyl)-aminofluoran (coloring agent) | 10 |
| Octadecylphosphonic acid (color developer) | 30 |
| Phenoxy resin (Trademark "PKHH", made by Union Carbide Japan K.K.) (binder resin) | 45 |
| Tetrahydrofuran (solvent) | 200 |
| 1,4-dioxane (solvent) | 200 |

The thus obtained coating liquid was coated by a wire bar on a polyester film with a thickness of 100 $\mu m$ serving as a support, and then dried, so that the recording layer with a thickness of about 7 $\mu m$ was formed on the support. Thus a reversible thermosensitive coloring recording medium of the present invention was obtained.

Examples 6-2 to 6-5

The procedure for preparing the reversible thermosensitive coloring recording medium in Example 6-1 was repeated except that the formulation of the coating liquid for the recording layer in Example 6-1 was changed to the following formulations as shown in Table-9, so that the reversible thermosensitive coloring recording media of the present invention were obtained.

TABLE 9

| Ex. No. | Coloring Agent | Color Developer | Resin | Solvents |
|---|---|---|---|---|
| 6-1 | 3-dibutylamino-7-(o-chlorophenyl)amino-fluoran: 10 | Octadecylphosphonic acid: 30 | Phenoxy resin (Trademark "PKHH" made by Union Carbide Japan K.K.): 45 | Tetrahydrofuran: 200 1,4-dioxane: 200 |
| 6-2 | 3-[N-ethyl-N-(p-methyl-phenyl)amino]-6-methyl-7-phenylamino-fluoran: 10 | Docosylphosphonic acid: 30 | Phenoxy resin (Trademark "PKHJ" made by Union Carbide Japan K.K.): 45 | Tetrahydrofuran: 200 1,4-dioxane: 200 |
| 6-3 | 3-diethylamino-6-methyl-7-(2',4'-dimethylphenyl)amino-fluoran: 10 | Eicosylthiomalic acid: 30 | Phenoxy resin (Trademark "PKHH" made by Union Carbide Japan K.K.): 45 | Tetrahydrofuran: 200 1,4-dioxane: 200 |
| 6-4 | 3-dibutylamino-7-(o-chlorophenyl)amino-fluoran: 10 | Eicosylmalonic acid: 30 | Phenoxy resin (Trademark "PKHC" made by Union Carbide Japan K.K.): 45 | Tetrahydrofuran: 200 1,4-dioxane: 200 |
| 6-5 | 3-dibutylamino-7-(o-chlorophenyl)amino-fluoran: 10 | $\alpha$-hydroxyoctadecanoic acid: 30 | Phenoxy resin (Trademark "YP50" made by Tohto Kasei Co., | Tetrahydrofuran: 200 1,4-dioxane: 200 |

TABLE 9-continued

| Ex. No. | Coloring Agent | Color Developer | Resin | Solvents |
|---|---|---|---|---|
| | | | Ltd.): 45 | |

Images were thermally printed on each of the above obtained recording media using a thermal head with a line density of 8 dots/mm, at a head power of 1.0 W/dot and a pulse width of 1.2 msec.

Then each image-bearing sample was decolorized by bringing it into contact with a hot plate at each decolorization temperature as shown in Table-10 for 20 sec.

The above process of the image printing an decolorization was repeated 10 times and the image density and the decolorization density were measured. The image density and the decolorization density of each recording medium measured after the first color development and decolorization cycle and after the 10th color development and decolorization cycle are shown in Table-10.

The reversible thermosensitive coloring recording media of the present invention maintained the high image density and the low decolorization density, and had an excellent image quality even after the image printing and the decolorization were repeatedly performed on those recording media.

Moreover, no sticking problem occured in the course of the image printing, so that the recording layer of each recording medium was not damaged. The reversible thermosensitive coloring recording media of the present invention had an excellent running performance.

TABLE 10

| Example No. | Decolorization Temperature (°C.) | Image Density (1st) | Decolorization Temperature (1st) | Image Density (10th) | Decolorization Temperature (10th) |
|---|---|---|---|---|---|
| 6-1 | 73 | 1.57 | 0.23 | 1.52 | 0.24 |
| 6-2 | 84 | 1.51 | 0.25 | 1.55 | 0.25 |
| 6-3 | 75 | 1.59 | 0.34 | 1.56 | 0.33 |
| 6-4 | 70 | 1.50 | 0.29 | 1.53 | 0.31 |
| 6-5 | 70 | 1.36 | 0.30 | 1.39 | 0.30 |

EXAMPLE 7

Example 7-1

A coating liquid for a recording layer was prepared by pulverizing a mixture of the following components by a ball mill so as to have a particle size of 1 to 4 μm:

| | parts by weight |
|---|---|
| 3-dibutylamino-7-(o-chlorophenyl)-aminofluoran (coloring agent) | 10 |
| Hexadecylphosphonic acid (color developer) | 30 |
| Aromatic polyester resin (Trademark "U-100", made by Unichika, Ltd.) (binder resin) | 45 |
| Tetrahydrofuran (solvent) | 200 |
| 1,4-dioxane (solvent) | 200 |

The thus obtained coating liquid was coated by a wire bar on a polyester film with a thickness of 100 μm serving as a support, and then dried, so that the recording layer with a thickness of about 7 μm was formed on the support. Thus a reversible thermosensitive coloring recording medium of the present invention was obtained.

Examples 7-2 to 7-5

The procedure for preparing the reversible thermosensitive coloring recording medium in Example 7-1 was repeated except that the formulation of the coating liquid for the recording layer in Example 7-1 was changed to the following formulations as shown in Table-11, so that the reversible thermosensitive coloring recording media of the present invention were obtained.

TABLE 11

| Ex. No. | Coloring Agent | Color Developer | Resin | Solvents |
|---|---|---|---|---|
| 7-1 | 3-dibutylamino-7-(o-chlorophenyl)amino-fluoran: 10 | Hexadecylphosphonic acid: 30 | Aromatic polyester resin (Trademark "U-100" made by Unichika Ltd.): 45 | Tetrahydrofuran: 200 1,4-dioxane: 200 |
| 7-2 | 3-[N-ethyl-N-(p-methyl phenyl)amino]-6-methyl-7-phenylamino-fluoran: 10 | Octadecylphosphonic acid: 30 | Aromatic polyester resin (Trademark "U-400" made by Unichika Ltd.): 45 | Tetrahydrofuran: 200 1,4-dioxane: 200 |
| 7-3 | 3-(N-methyl-N-propyl)-amino-6-methyl-7-phenylaminofluoran: 10 | Eicosylthiomalic acid: 30 | Aromatic polyester resin (Trademark "U-1060" made by Unichika Ltd.): 45 | Tetrahydrofuran: 200 1,4-dioxane: 200 |
| 7-4 | 3-dibutylamino-7-(o-chlorophenyl)amino-fluoran: 10 | Octadecylmalonic acid: 30 | Aromatic polyester resin (Trademark "U-100" made by Unichika Ltd.): 45 | Tetrahydrofuran: 200 1,4-dioxane: 200 |
| 7-5 | 3-dibutylamino-7-(o-chlorophenyl)amino-fluoran: 10 | α-hydroxyoctadecanoic acid: 30 | Aromatic polyester resin (Trademark "U-400" made by Unichika | Tetrahydrofuran: 200 1,4-dioxane: 200 |

TABLE 11-continued

| Ex. No. | Coloring Agent | Color Developer | Resin | Solvents |
|---|---|---|---|---|
| | | | Ltd.): 45 | |

Images were thermally printed on each of the above obtained recording media using a thermal head with a line density of 8 dots/mm, at a head power of 1.0 W/dot and a pulse width of 1.2 msec.

Then each image-bearing sample was decolorized by bringing it into contact with a hot plate at each decolorization temperature shown in Table-12 for 20 sec.

The above process of the image printing and the decolorization was repeated 10 times and the image density and the decolorization density were measured. The image density and the decolorization density of each recording medium measured after the first color development and decolorization cycle and after the 10th color development and decolorization cycle are shown in Table-12.

The reversible thermosensitive coloring recording media of the present invention maintained the high image density and the low decolorization density, and had an excellent image quality even after the image printing and the decolorization were repeatedly performed on those recording media.

Moreover, no sticking problem occured in the course of the image printing, so that the recording layer of each recording medium was not damaged. The reversible thermosensitive coloring recording media of the present invention had an excellent running performance.

TABLE 12

| Example No. | Decolorization Temperature (°C.) | Image Density (1st) | Decolorization Density (1st) | Image Density (10th) | Decolorization Density (10th) |
|---|---|---|---|---|---|
| 7-1 | 67 | 1.50 | 0.25 | 1.58 | 0.26 |
| 7-2 | 73 | 1.52 | 0.22 | 1.56 | 0.24 |
| 7-3 | 75 | 1.60 | 0.35 | 1.59 | 0.36 |
| 7-4 | 70 | 1.48 | 0.27 | 1.53 | 0.29 |
| 7-5 | 70 | 1.39 | 0.31 | 1.37 | 0.30 |

EXAMPLE 8

Example 8-1

A coating liquid for a recording layer was prepared by pulverizing a mixture of the following components by a ball mill so as to have a particle size of 1 to 4 $\mu m$:

| | parts by weight |
|---|---|
| 3-diethylamino-7-(o-chlorophenyl)-aminofluoran (coloring agent) | 3 |
| Octadecylphosphonic acid (color developer) | 10 |
| 50% xylene solution of alkyd resin (Trademark "Beckosol ES4020-55" made by Dainippon Ink & Chemicals, Incorporated) (binder resin) | 14 |
| 60% xylene solution of melamine resin (Trademark "Superbeckamine G821-60", made by Dainippon Ink & Chemicals, Incorporated) (binder resin) | 6 |
| Tetrahydrofuran (solvent) | 80 |

The thus obtained coating liquid was coated by a wire bar on a polyester film with a thickness of 100 $\mu m$ serving as a support, and then dried, so that the recording layer with a thickness of about 5 $\mu m$ was formed on the support. The thus obtained medium was cured at 120° C. for 1 hour and then at 70° C. for 48 hours, whereby a reversible thermosensitive coloring recording medium of the present invention was obtained.

Examples 8-2 to 8-4

The procedure for preparing the reversible thermosensitive coloring recording medium in Example 8-1 was repeated except that the formulation of the coating liquid for the recording layer and the curing conditions in Example 8-1 were changed to the following as shown in Table-13, so that the reversible thermosensitive coloring recording media of the present invention were obtained.

TABLE 13

| Ex. No. | Coloring Agent | Color Developer | Resin | Solvents | Curing Conditions |
|---|---|---|---|---|---|
| 8-1 | 3-diethylamino-7-(o-chloro-phenyl)amino-fluoran: 3 | Octadecyl-phosphonic acid | 50% xylene solution of alkyd resin (Trademark "Beckosol ES 4020-55" made by Dainippon Ink & Chemicals, Incorporated): 14<br>60% xylene solution of melamine resin (Trademark "Superbeckamine G821-60" made by Dainippon Ink & Chemicals, Incorporated): 6 | Tetrahydro-furan: 80 | 120° C. for one hour and then 70° C. for 48 hours |
| 8-2 | 3-dibutylamino-7-(o-chloro-phenyl)amino-fluoran: 3.5 | α-hydroxy-octadecanoic-acid: 10 | 15% toluene MEK solution of acrylic silicone resin (Trademark "RC-910" made by Kuboko Paint Co., Ltd.): 75 | Tetrahydro-furan: 20 | 120° C. for one hour and then 70° C. for 48 hours |
| 8-3 | 3-dibutylamino-6-ethyl-7-phenyl-aminofluoran: 3 | Eicosylthio-malic acid: 10 | 75% butyl acetate solution of urethane acrylate ultra-violet-curing resin | Tetrahydro-furan: 50 | After drying at 70° C. for 3 minutes, irri- |

TABLE 13-continued

| Ex. No. | Coloring Agent | Color Developer | Resin | Solvents | Curing Conditions |
|---|---|---|---|---|---|
| | | | (Trademark "Unidic C7-157" made by Dainippon Ink & Chemicals, Incorporated): 12.5 | | dation of an ultraviolet rays (80 w/cm) |
| 8-4 | 3-dibutylamino-7-(o-chloro-phenyl)amino-fluoran: 3.5 | Octadecyl-malonic acid: 10 | Acrylic oligomer ultraviolet-curing resin (Trademark "Aronix 2021" made by Toagosei Chemical Industry Co., Ltd.): 10 | Ethyl acetate: 90 | After drying at 70° C. for 3 minutes, irri-dation of an ultraviolet rays (80 w/cm) |

In Examples 8-1 and 8-2, the recording media were colored by the first heat application and then decolorized by the second heat application in the course of the curing treatment.

Images were thermally printed on the above obtained recording media using a thermal head with a line density of 8 dots/mm, at a head power of 1.0 W/dot and a pulse width of 1.2 msec.

Then each image-bearing sample was decolorized by bringing it into contact with a hot plate at each decolorization temperature as shown in Table-14 for 20 sec.

The above process of the image printing and the decolorization was repeated 10 times and the image density and the decolorization density were measured. The image density and the decolorization density of each recording medium measured after the first color development and decolorization cycle and after the 10th color development and decolorization cycle are shown in Table-14.

TABLE 14

| Example No. | Decolorization Temperature (°C.) | Image Density (1st) | Decolorization Density (1st) | Image Density (10th) | Decolorization Density (10th) |
|---|---|---|---|---|---|
| 8-1 | 73 | 1.55 | 0.32 | 1.58 | 0.32 |
| 8-2 | 70 | 1.61 | 0.31 | 1.55 | 0.33 |
| 8-3 | 70 | 1.57 | 0.29 | 1.61 | 0.32 |
| 8-4 | 70 | 1.55 | 0.28 | 1.56 | 0.30 |

The reversible thermosensitive coloring recording media of the present invention maintained the high image density and the low decolorization density, and had an excellent image quality even after the image printing and the decolorization were repeatedly performed on those recording media.

Moreover, no sticking problem occured in the course of the image printing, so that the recording layer of each recording medium was not damaged. The reversible thermosensitive coloring recording media of the present invention had an excellent running performance.

EXAMPLE 9

Example 9-1

A dispersion A, a dispersion B, and a dispersion C were separately prepared by pulverizing and grinding the respective mixtures of the following formulations in a ball mill so as to have a particle size of 1 to 4 $\mu m$:

| | parts by weight |
|---|---|
| [Dispersion A] | |
| 3-dibutylamino-7-(o-chlorophenyl)-aminofluoran (coloring agent) | 10 |
| 10% aqueous solution of polyvinyl alcohol | 10 |
| Water | 30 |
| [Dispersion B] | |
| Octadecylphosphonic acid (color developer) | 10 |
| 10% aqueous solution of polyvinyl alcohol | 10 |
| Water | 30 |
| [Dispersion C] | |
| Calcium carbonate | 10 |
| Methylcellulose | 10 |
| Water | 30 |

30 parts by weight of each of dispersions A, B and C were mixed and stirred to prepare a coating liquid for a recording layer. The thus prepared coating liquid was coated on a sheet of high quality paper with a basis weight of 48 $g/m^2$ serving as a support in a deposition amount of 5 $g/m^2$ on a dry basis, and then dried, so that the recording layer was formed on the support. Furthermore, the surface of the recording layer was subjected to calendering, whereby a reversible thermosensitive coloring recording medium of the present invention was obtained.

Examples 9-2 to 9-4

The procedure for preparing the reversible thermosensitive coloring recording medium in Example 9-1 was repeated except that the coloring agent and the color developer contained in the coating liquid for the recording layer and the support employed in Example 9-1 were replaced by the following as shown in Table-15.

TABLE 15

| Ex. No. | Coloring Agent | Color Developer | Support | Image Density | Decolorization Temperature (°C.) | Decolorization Density |
|---|---|---|---|---|---|---|
| 9-1 | 3-dibutylamino-7-(o-chloro-phenyl)amino-fluoran | Octadecyl-phosphonic acid | High quality paper with a basis weight of 48 $g/m^2$ | 1.56 | 73 | 0.34 |
| 9-2 | 3-dibutylamino-7-(o-chloro- | Eicosyl-thiomalic | High quality paper with a basis weight | 1.48 | 70 | 0.32 |

TABLE 15-continued

| Ex. No. | Coloring Agent | Color Developer | Support | Image Density | Decolorization Temperature (°C.) | Decolorization Density |
|---|---|---|---|---|---|---|
| | phenyl)amino-fluoran | acid | of 48 g/m$^2$ | | | |
| 9-3 | 3-[N-methyl-N-(p-methyl-phenyl)amino]-6-methyl-7-phenylfluoran | Docosyl-phosphonic acid | Coat paper with a thickness of 100 μm (Trademark "OK Coat Paper" made by Oji Paper Co., Ltd.) | 1.60 | 84 | 0.26 |
| 9-4 | 3-dibutylamino-7-(o-chloro-phenyl)amino-fluoran | Octadecyl-malonic acid | Synthetic Paper (Trademark "Yupo FPG #150" made by Oji-Yuka Synthetic Paper Co., Ltd.) | 1.50 | 70 | 0.27 |

Images were thermally printed on each of the thus obtained reversible thermosensitive coloring recording media by a thermal-head-built-in heat gradient tester (made by Toyo Seiki Seisaku-sho, Ltd.) under the following conditions:

| | |
|---|---|
| Temperature: | 130° C. |
| Contact Time: | 1 second |
| Applied Pressure: | 1 kg/cm$^2$ |

The density of each of the printed images was measured with Macbeth densitometer RD-918. The image density of each reversible thermosensitive coloring recording medium is shown in Table-15.

Then each image-bearing sample was placed in a thermostatic chamber at each decolorization temperature shown in Table-15 for about 20 seconds and decolorized. The decolorization density of each reversible thermosensitive coloring recording medium is also shown in Table-15.

Furthermore, the above-mentioned process of the image printing and the decolorization of the recording media was repeated ten times to evaluate the reversibility thereof. It was confirmed that it was possible to repeat the color development and the decolorization without any problems with respect to all of the thermosensitive recording media obtained in Example 9.

EXAMPLE 10

Example 10-1

A coating liquid for a recording layer was prepared by pulverizing a mixture of the following components in a ball mill so as to have a particle size of 1 to 4 μm.

| | parts by weight |
|---|---|
| 3-diethylamino-7-(o-chlorophenyl)-aminofluoran (coloring agent) | 10 |
| Octadecylphosphonic acid (color developer) | 30 |
| Emulsion of styrene - acrylic acid ester (solid content: 50%) (PH 8.5) (Trademark "Polysol MC-5", made by Showa Highpolymer Co., Ltd.) (binder resin) | 20 |
| Water | 200 |

The thus prepared coating liquid was coated on a sheet of high quality paper with a basis weight of 48 g/m$^2$ serving as a support in a deposition amount of 5 g/m$^2$ on a dry basis, and then dried, so that the recording layer was formed on the support. Furthermore, the surface of the recording layer was subjected to calendering, whereby a reversible thermosensitive coloring recording medium of the present invention was obtained.

Examples 10-2 and 10-3

The procedure for preparing the reversible thermosensitive coloring recording medium in Example 10-1 was repeated except that the formulation of the coating liquid for the recording layer in Example 10-1 was changed to the following formulations as shown in Table-16, so that the reversible thermosensitive coloring recording media of the present invention were obtained.

TABLE 16

| Ex. No. | Coloring Agent | Color Developer | Resin | Solvents | Support |
|---|---|---|---|---|---|
| 10-1 | 3-diethylamino-7-(o-chloro-phenyl)amino-fluoran: 10 | Octadecyl-phosphonic acid: 30 | Emulsion of styrene - acrylic acid ester (Trademark "Polysol MC-5" Made by Showa Highpolymer Co., Ltd.) (solid content: 50%, pH: 8.5): 20 | Water: 200 | High quality paper with a basis weight of 48 g/m$^2$ |
| 10-2 | 3-[N-ethyl-N-(p-methyl-phenyl)amino]-7-phenylamino-fluoran: 10 | α-hydroxyocta-decanoic acid: 30 | Emulsion of acrylic acid ester (Trademark "Polylac SX-121" made by MITSUI TOATSU CHEMICALS, INC.) (solid content: 45%, pH: 7.0): 12<br>5% aqueous solution of methyl-cellulose (Trademark "Marpolose M-25" made by Matsumoto Yushi-Seiyaku Company, Ltd.): 90 | Water: 118 | High quality paper with a basis weight of 48 g/m$^2$ |
| 10-3 | 3-diethylamino-7-chloro-fluoran: 10 | Docosylphosphonic acid: 30 | Emulsion of polyurethane (Trademark "Aizelax S-1070", made by Hodogaya Chemical Co., Ltd.) | Water: 176 | High quality paper with a basis weight |

TABLE 16-continued

| Ex. No. | Coloring Agent | Color Developer | Resin | Solvents | Support |
|---|---|---|---|---|---|
| | | | (solid content: 50%, pH: 6.0): 14<br>10% aqueous solution of polyvinyl alcohol (Trademark "PVA 205" made by KURARAY Co., LTD.): 30 | | of 48 $g/m^2$ |

Images were thermally printed on each of the thus obtained reversible thermosensitive coloring recording media by a thermal-head-built-in heat gradient tester (made by Toyo Seiki Seisaku-sho, Ltd.) under the following conditions:

| | |
|---|---|
| Temperature: | 130° C. |
| Contact Time: | 1 second |
| Applied Pressure: | 1 $kg/cm^2$ |

The density of the printed images was measured with Macbeth densitometer RD-918. The image density of each reversible thermosensitive coloring recording medium is shown in Table-17.

Then each image-bearing sample was placed in a thermostatic chamber at each decolorization temperature shown in Table-16 for about 20 seconds and decolorized. The decolorization density of each reversible thermosensitive coloring recording medium is also shown in Table-17.

Furthermore, the above-mentioned process of the image printing and the decolorization of the recording media was repeated ten times to evaluate the reversibility thereof. It was confirmed that it was possible to repeat the color development and the decolorization without any problems with respect to all of the thermosensitive recording media obtained in Example 10.

TABLE 17

| Example No. | Image Density | Decolorization Temperature (°C.) | Decolorization Density |
|---|---|---|---|
| 10-1 | 1.58 | 73 | 0.30 |
| 10-2 | 1.36 | 70 | 0.38 |
| 10-3 | 1.40 | 82 | 0.29 |

EXAMPLE 11

Example 11-1

Formation of Recording Layer

A coating liquid for a recording layer was prepared by pulverizing a mixture of the following components in a ball mill so as to have a particle size of 1 to 4 μm:

| | parts by weight |
|---|---|
| 3-dibutylamino-7-(o-chlorophenyl)-aminofluoran (coloring agent) | 10 |
| Octadecylphosphonic acid (color developer) | 30 |
| Vinyl chloride - vinyl acetate copolymer (Trademark "VYHH", made by Union Carbide Japan K.K.) (binder resin) | 45 |
| Toluene (solvent) | 200 |
| Methyl ethyl ketone (solvent) | 200 |

The thus obtained coating liquid for the recording layer was coated by a wire bar on a polyester film with a thickness of 100 μm serving as a support, and then dried, so that the recording layer with a thickness of about 6.0 μm was formed on the support.

Formation of Protective Layer

A coating liquid for a protective layer consisting of melamine-formalin prepolymer (Trademark "Mirbane SM-800", made by Showa Highpolymer Co., Ltd.) was coated by a wire bar on the above recording layer so as to have a thickness of 4 to 5 μm, and then dried, so that a protective layer was formed on the recording layer. Thus a reversible thermosensitive coloring recording medium of the present invention was obtained.

Examples 11-2 to 11-4

The procedure for preparing the reversible thermosensitive coloring recording medium in Example 11-1 was repeated except that the respective formulations of the coating liquid for the recording layer and the coating liquid for the protective layer in Example 11-1 were changed to the following formulations as shown in Table-18, so that the reversible thermosensitive coloring recording media of the present invention were obtained. The respective coating liquids for the protective layer employed in Examples 11-3 and 11-4 were prepared by pulverizing and grinding the respective mixtures of the components shown in Table-18 in a ball mill.

TABLE 18

| Example No. | Recording layer | Composition of Protective Layer Coating Liquid |
|---|---|---|
| 11-1 | Same as in Example 3-3 | Melamine-formalin prepolymer (Trademark "Mirbane SM-800" made by Showa Highpolymer Co., Ltd.) |
| 11-2 | Same as in Example 3-32 | Acryl emulsion (Trademark "Johncryl 390" made by S. C. Johnson & Sons, Inc.) |
| 11-3 | Same as in Example 3-12 | 10% aqueous solution of carboxy group-modified polyvinyl alcohol: 50<br>10% aqueous solution of epichlorohydrin/polyamide copolymer: 20<br>2-(2'-hydroxy-5'-methylphenyl)-benzotriazole: 16<br>Calcium carbonate: 0.4<br>Water: 29 |
| 11-4 | Same as in Example 3-32 | Acryl emulsion (Trademark "Johncryl 390" made by S. C. Johnson & Sons, Inc.): 60<br>10% aqueous solution of epichlorohydrin/polyamide copolymer: 20<br>2-(2'-hydroxy-3',5'-di-tert-butyl-phenyl)benzotriazole: 16<br>Colloidal silica: 1 |

Images were thermally printed on each of the above obtained recording media using a thermal head with a line density of 8 dots/mm, at a head power of 1.0 W/dot and a pulse width of 1.2 msec. The image density of each recording medium is shown in Table-22.

Then each image-bearing sample was decolorized by passing over a heated roller having the decolorization temperature shown in Table-22.

The above process of the image printing and the decolorization was repeated 50 times to evaluate the image quality, rub resistance, transport performance, sun-light resistance, fluorescent-light resistance, water resistance and chemical resistance. The method of each evaluation was as follows:

(1) Image Quality

The contrast, fogging, and blur of the images were visually inspected.

(2) Rub Resistance

The presence and degree of scratches formed in the image by a thermal head were visually inspected.

(3) Running Performance

The sticking problem caused in each recording medium by a thermal head in the course of the image printing was inspected.

(4) Sun-light Resistance

Each image-bearing sample was exposed to the sun light for 3 days and the changes in the color tone and the image density were visually inspected.

(5) Fluorescent-light Resistance

Each image-bearing sample was exposed to the fluorescent light of 5000 lux for 120 hours and the changes in the color tone and the image density were visually inspected.

(6) Water Resistance

Each image-bearing sample was immersed in water at room temperature for 12 hours and the stability of the images was visually inspected.

(7) Chemical Resistance

Ethyl alcohol was applied to each image-bearing sample and allowed to stand for 15 minutes, and then the stability of the images was visually inspected.

Furthermore, the above-mentioned properties and resistances were also evaluated in regard to the reversible thermosensitive coloring recording media comprising no protective layer.

The results are shown in Table-22. The protective layer of the reversible thermosensitive coloring recording media served to improve the above properties and resistances.

EXAMPLE 12

Example 12-1

Formation of Recording Layer

A coating liquid for a recording layer was prepared by pulverizing a mixture of the following components in a ball mill so as to have a particle size of 1 to 4 $\mu m$:

| | parts by weight |
|---|---|
| 3-dibutylamino-7-(o-chlorophenyl)-aminofluoran (coloring agent) | 10 |
| Octadecylphosphonic acid (color developer) | 30 |
| Vinyl chloride - vinyl acetate copolymer (Trademark "VYHH", made by Union Carbide Japan K.K.) (binder resin) | 45 |
| Toluene (solvent) | 200 |
| Methyl ethyl ketone (solvent) | 200 |

The thus obtained coating liquid was coated by a wire bar on a polyester film with a thickness of 100 $\mu m$ serving as a support, and then dried, so that the recording layer with a thickness of about 6.0 $\mu m$ was formed on the support.

Formation of Protective Layer

A coating liquid for a protective layer was prepared by pulverizing and grinding a mixture of the following components in a ball mill:

| | parts by weight |
|---|---|
| 75% butyl acetate solution of urethane acrylate ultraviolet-curing resin (Trademark "Unidic C7-157", made by Dainippon Ink & Chemicals, Incorporated) | 100 |
| Alumina sol (particle size: 100 to 200 $\mu m$) | 3 |
| Stearic acid amide | 3 |
| Butyl acetate | 50 |

The thus obtained coating liquid was coated by a wire bar on the above-mentioned recording layer, dried by application of heat thereto, and then cured by exposing the coated liquid to the ultraviolet rays of 80 W/cm, so that the protective layer with a thickness of 4 to 5 $\mu m$ was formed on the recording layer. Thus a reversible thermosensitive coloring recording medium of the present invention was obtained.

Examples 12-2 and 12-3

The procedure for preparing the reversible thermosensitive coloring recording medium in Example 12-1 was repeated except that the respective formulations of the coating liquid for the recording layer and the coating liquid for the protective layer in Example 12-1 were changed to the following formulations as shown in Table-19, so that the reversible thermosensitive coloring recording media of the present invention were obtained.

TABLE 19

| Example No. | Recording layer | Composition of Protective Layer Coating Liquid |
|---|---|---|
| 12-1 | Same as in Example 3-3 | 75% butyl acetate solution of urethane acrylate ultraviolet-curing resin (Trademark "Unidic C7-157" made by Dainippon Ink & Chemicals, Incorporated): 100<br>Alumina sol (particle size: 100 to 200 $\mu m$): 3<br>Stearic acid amide: 3<br>Butyl acetate: 50 |
| 12-2 | Same as in | 75% butyl acetate solution of |

TABLE 19-continued

| Example No. | Recording layer | Composition of Protective Layer Coating Liquid |
|---|---|---|
| | Example 3-32 | urethane acrylate ultraviolet-curing resin (Trademark "Unidic 17-824-9" made by Dainippon Ink & Chemicals, Incorporated): 100<br>Calsium carbonate (Trademark "Callight SA" made by Shiraishi calcium Kaisha, Ltd.): 2<br>Polyethylene wax: 1<br>Toluene: 100 |
| 12-3 | Same as in Example 3-12 | Acrylic oligomer ultraviolet-curing resin (Trademark "Aronic 2021" made by Toagosei Chemicals Industry Co., Ltd.): 50<br>Calsium carbonate: 1<br>Ethyl acetate: 200 |

Images were thermally printed on each of the above obtained recording media using a thermal head with a line density of 8 dots/mm, at a head power of 1.0 W/dot and a pulse width of 1.2 msec. The image density of each recording medium is shown in Table-22.

Then each image-bearing sample was decolorized by passing over a heated roller at each decolorization temperature shown in Table-22.

The above process of the image printing and the decolorization was repeated 50 times to evaluate the image quality, rub resistance, transport performance, sun-light resistance, fluorescent-light resistance, water resistance and chemical resistance. The method of each evaluation was the same as in Example 11. The results are shown in Table-22. The protective layer of the reversible thermosensitive coloring recording media served to improve the above properties and resistances.

EXAMPLE 13

Example 13-1

Formation of Recording Layer

A coating liquid for a recording layer was prepared by pulverizing a mixture of the following components in a ball mill so as to have a particle size of 1 to 4 $\mu m$:

| | parts by weight |
|---|---|
| 3-dibutylamino-7-(o-chlorophenyl)-aminofluoran (coloring agent) | 10 |
| Octadecylphosphonic acid (color developer) | 30 |
| Vinyl chloride - vinyl acetate copolymer (Trademark "VYHH", made by Union Carbide Japan K.K.) (binder resin) | 45 |
| Toluene (solvent) | 200 |
| Methyl ethyl ketone (solvent) | 200 |

The thus obtained coating liquid was coated by a wire bar on a polyester film with a thickness of 100 $\mu m$ serving as a support, and then dried, so that the recording layer with a thickness of about 6.0 $\mu m$ was formed on the support.

Formation of Protective Layer

A coating liquid for a protective layer was prepared by pulverizing and grinding a mixture of the following components in a ball mill:

| | parts by weight |
|---|---|
| Mixture of polyester polyacrylate prepolymer and polyurethane polyacrylate prepolymer (Trademark "78E204", made by Mobil Sekiyu Kabushiki Kaisha) | 100 |
| Finely-divided spherical monodisperse silicone particles (Trademark "Tospearl 120", made by Toshiba Silicone Co., Ltd.) | 1 |

The thus obtained coating liquid was coated by a wire bar on the above-mentioned recording layer, dried by application of heat thereto, and then cured by an electrocurtain-type electron-rays irradiation apparatus (CB: 150-type, made by E. S. I. Japan K.K.) with an exposure dose of 3 Mrad, so that a protective layer with a thickness of 2 to 4 $\mu m$ was formed on the recording layer. Thus a reversible thermosensitive coloring recording medium of the present invention was obtained.

Example 13-2

The procedure for preparing the reversible thermosensitive coloring recording medium in Example 13-1 was repeated except that the respective formulations of the coating liquid for the recording layer and the coating liquid for the protective layer in Example 13-1 were changed to the following formulations as shown in Table-20, so that the reversible thermosensitive coloring recording medium of the present invention was obtained.

TABLE 20

| Example No. | Recording layer | Composition of Protective Layer Coating Liquid |
|---|---|---|
| 13-1 | Same as Example 3-3 | Mixture of polyester polyacrylate prepolymer and polyurethane polyacrylate prepolymer (Trademark "78E204" made by Movil Sekiyu Kabushiki Kaisha): 100<br>Finely-divided spherical monodisperse silicone particles (Trademark "Tospearl 120" made by Toshiba Silicone Co., Ltd.): 1 |
| 13-2 | Same as Example 3-32 | Trimethylolpropane acrylate (Trademark "M-309" made by Toagosei Chemical Industry Co., Ltd.): 100<br>Amorphous monodisperse silicone powder (Trademark "Tospearl 240" made by Toshiba Silicone Co., Ltd.): 1 |

Images were thermally printed on each of the above obtained recording media using a thermal head with a line density of 8 dots/mm, at a head power of 1.0 W/dot and a pulse width of 1.2 msec. The image density of each recording medium is shown in Table-22.

Then each image-bearing sample was decolorized by passing over a heated roller at the decolorization temperature shown in Table-22.

The above process of the image printing and the decolorization was repeated 50 times to evaluate the image quality, rub resistance, transport performance, sun-light resistance, fluorescent-light resistance, water resistance and chemical resistance. The method of each evaluation was the same as in Example 11. The results are shown in Table-22. The protective layer of the reversible thermosensitive coloring recording media served to improve the above properties and resistances.

EXAMPLE 14

Example 14-1

Formation of Recording Layer

A coating liquid for a recording layer was prepared by pulverizing a mixture of the following components in a ball mill so as to have a particle size of 1 to 4 μm:

| | parts by weight |
|---|---|
| 3-dibutylamino-7-(o-chlorophenyl)-aminofluoran (coloring agent) | 10 |
| Octadecylphosphonic acid (color developer) | 30 |
| Vinyl chloride - vinyl acetate copolymer (Trademark "VYHH", made by Union Carbide Japan K.K.) (binder resin) | 45 |
| Toluene (solvent) | 200 |
| Methyl ethyl ketone (solvent) | 200 |

The thus obtained coating liquid was coated by a wire bar on a polyester film with a thickness of 100 μm serving as a support, and then dried, so that a recording layer with a thickness of about 6.0 μm was formed on the support.

Formation of Protective Layer

A coating liquid for a protective layer was prepared by pulverizing and grinding a mixture of the following components in a ball mill:

| | parts by weight |
|---|---|
| 50% xylene solution of alkyd resin (Trademark "Beckosol ES4020-55", made by Dainippon Ink & Chemicals, Incorporated) | 28 |
| 60% xylene solution of melamine resin (Trademark "Superbeckamine G821-60", made by Dainippon Ink & Chemicals, Incorporated) | 12 |
| Finely-divided spherical monodisperse silicone particles | 1 |
| Tetrahydrofuran | 160 |

The thus obtained coating liquid was coated by a wire bar on the above-mentioned recording layer, dried, and then cured by a heat-treatment in an oven at 120° C. for 1 hour and then at 70° C. for 48 hours, so that a protective layer with a thickness of 4 to 5 μm was formed on the recording layer. Thus a reversible thermosensitive coloring recording medium of the present invention was obtained.

Examples 14-2 and 14-3

The procedure for preparing the reversible thermosensitive coloring recording medium in Example 14-1 was repeated except that the respective formulations of the coating liquid for the recording layer and the coating liquid for the protective layer in Example 14-1 were changed to the following formulations as shown in Table-21, so that the reversible thermosensitive coloring recording media of the present invention were obtained.

TABLE 21

| Example No. | Recording layer | Composition of Protective Layer Coating Liquid |
|---|---|---|
| 14-1 | Same as in Example 3-3 | 50% xylene solution of alkyd resin (Trademark "Beckosol ES4020-55" made by Dainippon Ink & Chemicals, Incorporated): 28<br>60% xylene solution of melamine resin (Trademark "Superbeckamine G 821-60" made by Dainippon Ink & Chemicals, Incorporated): 12<br>Finely-divided spherical mono-disperse silicone particles: 1<br>Tetrahydrofuran: 160 |
| 14-2 | Same as in Example 3-12 | 15% toluene•MEK solution of acryl-silicone resin (Trademark "RC-910" made by Kuboko Paint Co., Ltd.): 75<br>Tetrahydrofuran: 20 |
| 14-3 | Same as in Example 3-32 | Polyvinylbutyral (Trademark "S-Lec BX-1" made by Sekisui Chemical Co, Ltd.): 5<br>75% ethyl acetate solution of diisocyanate (Trademark "CORONATE L" made by NIPPON POLYURETHANE INDUSTRY CO., LTD): 2<br>10% ethylenedichloride ethyl acetate solution of curing catalyst (Trademark "NY-3" made by NIPPON POLYURETHANE INDUSTRY CO., LTD.): 0.2<br>Calcium cabonate: 0.5<br>Toluene: 40<br>Methyl ethyl ketone: 45 |

Images were thermally printed on each of the above obtained recording media using a thermal head with a line density of 8 dots/mm, at a head power of 1.0 W/dot and a pulse width of 1.2 msec. The image density of each recording medium is shown in Table-22.

Then each image-bearing sample was decolorized by passing over a heated roller at each decolorization temperature shown in Table-22.

The above process of the image printing and the decolorization was repeated 50 times to evaluate the image quality, rub resistance, transport performance, sun-light resistance, fluorescent-light resistance, water resistance and chemical resistance. The method of each evaluation was the same as in Example 11. The results are shown in Table-22. The protective layer of the reversible thermosensitive coloring recording media served to improve the above properties and resistances.

TABLE 22

| Ex. No. | Image Density | Decolorization Temperature | Image Quality | Rub Resistance | Running Performance | Sun-light Resistance | Flourescent Light Resistance | Water Resistance | Chemical Resistance |
|---|---|---|---|---|---|---|---|---|---|
| 11-1 | 1.42 | 75 | ⊚ | ⊚ | ○ | ○ | ○ | ○ | ○ |
| 11-2 | 1.45 | 80 | ⊚ | ○ | ○ | ○ | ○ | ○ | ○ |
| 11-3 | 1.40 | 84 | ⊚ | ○ | ○ | ○ | ○ | ○ | ○ |
| 11-4 | 1.46 | 80 | ⊚ | ○ | ○ | ○ | ○ | ○ | ○ |
| 12-1 | 1.40 | 75 | ⊚ | ⊚ | ⊚ | ○ | ○ | ⊚ | ⊚ |

TABLE 22-continued

| Ex. No. | Image Density | Decolorization Temperature | Image Quality | Rub Resistance | Running Performance | Sunlight Resistance | Flourescent Light Resistance | Water Resistance | Chemical Resistance |
|---|---|---|---|---|---|---|---|---|---|
| 12-2 | 1.43 | 80 | ⊚ | ⊚ | ⊚ | ○ | ○ | ⊚ | ⊚ |
| 12-3 | 1.38 | 84 | ⊚ | ⊚ | ⊚ | ○ | ○ | ⊚ | ⊚ |
| 13-1 | 1.41 | 75 | ⊚ | ⊚ | ⊚ | ○ | ○ | ⊚ | ⊚ |
| 13-2 | 1.46 | 80 | ⊚ | ⊚ | ⊚ | ○ | ○ | ⊚ | ⊚ |
| 14-1 | 1.46 | 75 | ⊚ | ⊚ | ⊚ | ○ | ○ | ⊚ | ⊚ |
| 14-2 | 1.40 | 84 | ⊚ | ⊚ | ⊚ | ○ | ○ | ⊚ | ⊚ |
| 14-3 | 1.49 | 80 | ⊚ | ⊚ | ⊚ | ○ | ○ | ⊚ | ⊚ |
| 3-3 No Protective Layer | 1.60 | 75 | Δ | Δ | Δ | Δ | Δ | ○ | x |
| 3-12 No Protective Layer | 1.62 | 84 | Δ | Δ | Δ | Δ | Δ | ○ | x |
| 3-32 No Protective Layer | 1.65 | 80 | Δ | Δ | Δ | Δ | Δ | ○ | x |

⊚: Excellent
Δ: Slightly poor
○: No problem
x: Poor

EXAMPLE 15

Example 15-1

Formation of Undercoat Layer

A coating liquid for an undercoat layer consisting of 5% aqueous solution of polyvinyl alcohol was coated on a sheet of high quality paper with a basis weight of 52 g/m$^2$ serving as a support in a deposition amount of 4 g/m$^2$ on a dry basis, and then subjected to calendering, so that the undercoat layer was formed on the support.

Formation of Recording Layer

A coating liquid for a recording layer was prepared by pulverizing a mixture of the following components in a ball mill so as to have a particle size of 1 to 4 μm:

| | parts by weight |
|---|---|
| 3-dibutylamino-7-(o-chlorophenyl)-aminofluoran (coloring agent) | 10 |
| Octadecylphosphonic acid | 30 |
| (color developer) | 30 |
| Vinyl chloride - vinyl acetate | 45 |
| copolymer (Trademark "IVYHH", made by Union Carbide Japan K.K.) (binder resin) | |
| Toluene (solvent) | 200 |
| Methyl ethyl ketone (solvent) | 200 |

The thus obtained coating liquid was coated by a wire bar on the above-mentioned undercoat layer, so that the recording layer was formed on the undercoat layer. Thus a reversible thermosensitive coloring recording medium of the present invention was obtained.

Examples 15-2 to 15-8

The procedure for preparing the reversible thermosensitive coloring recording medium in Example 15-1 was repeated except that the respective formulations of the coating liquid for the undercoat layer and the coating liquid for the recording layer in Example 15-1 were changed to the following formulations as shown in Table-23, so that the reversible thermosensitive coloring recording media of the present invention were obtained.

Images were thermally printed on each of the thus obtained reversible thermosensitive coloring recording media by a thermal-head-built-in heat gradient tester (made by Toyo Seiki Seisaku-sho, Ltd.) under the following conditions:

| | |
|---|---|
| Temperature: | 130° C. |
| Contact Time: | 1 second |
| Applied Pressure: | 1 kg/cm$^2$ |

The density of the printed images was measured with Macbeth densitometer RD-918. The image density of each reversible thermosensitive coloring recording medium is shown in Table-23.

Then each image-bearing sample was placed in a thermostatic chamber at each decolorization temperature shown in Table-23 for about 20 seconds and decolorized. The decolorization density of each reversible thermosensitive coloring recording medium is shown in Table-23.

When compared with the image density and the decolorization density of the reversible thermosensitive coloring recording media comprising no undercoat layer obtained in Examples 9-1 and 9-2, as shown in Table-15, the undercoat layer obviously served to lower the decolorization density and to produce the excellent decolorization state in the reversible thermosensitive coloring recording medium, without leaving any images thereon.

TABLE 23

| Ex. No. | Formulation of Coating Liquid for Undercoat Layer | Recording Layer | Image Density | Decolorization Temperature (°C.) | Decolorization Density |
|---|---|---|---|---|---|
| 15-1 | 5% aqueous solution of polyvinyl alcohol | Same as in Example 3-3 | 1.60 | 73 | 0.25 |
| 15-2 | 5% aqueous solution of polyvinyl alcohol | Same as in Example 9-2 | 1.52 | 70 | 0.25 |
| 15-3 | 2% aqueous solution of hydroxyethyl-cellulose | Same as in Example 9-1 | 1.62 | 73 | 0.26 |
| 15-4 | 10% aqueous solution of polyvinyl alcohol: 60<br>10% aqueous solution of polyamide-epi-chlorohydrin resin (Trademark "Kymene 557H" made by DIC-Hercules Chemicals, Inc.): 20<br>Water: 20 | Same as in Example 9-2 | 1.50 | 70 | 0.24 |
| 15-5 | Emulsion of polyvinyl acetate (Solid content: 48%): 60<br>Water: 40 | Same as in Example 9-1 | 1.60 | 73 | 0.25 |
| 15-6 | Styrene - butadiene copolymer latex emulsion (solid content: 48%): 60<br>Water: 40 | Same as in Example 9-2 | 1.52 | 73 | 0.25 |
| 15-7 | Acryl emulsion (Trademark "Johncryl 390" made by S. C. Johnson & Sons, Inc.) | Same as in Example 9-1 | 1.64 | 73 | 0.24 |
| 15-8 | 10% aqueous solution of carboxy-group-modified polyvinyl alcohol: 60<br>10% aqueous soiution of polyamide-epi-chlorohydrin resin: 20<br>Water: 20 | Same as in Example 9-2 | 1.50 | 70 | 0.24 |

EXAMPLE 16

Example 16-1

Formation of Heat-insulating Undercoat Layer

A coating liquid for a heat-insulating undercoat layer was prepared by mixing and stirring the following components:

| | parts by weight |
|---|---|
| Thermally-expandable minute void particles (Trademark "Micro Pearl F-30", made by Matsumoto-Yushi Seiyaku Company, Ltd.) | 15 |
| Polyvinyl butyral | 5 |
| Ethyl alcohol | 70 |
| Toluene | 30 |

The thus obtained coating liquid was coated on a polyester film with a thickness of 100 μm serving as a support, and then dried, so that a heat-insulating undercoat layer with a thickness of 18 μm was formed on the support.

Formation of Recording Layer

A coating liquid for a recording layer was prepared by pulverizing a mixture of the following components in a ball mill so as to have a particle size of 1 to 4 μm:

| | parts by weight |
|---|---|
| 3-dibutylamino-7-(o-chlorophenyl)-aminofluoran (coloring agent) | 10 |
| Octadecylphosphonic acid (color developer) | 30 |
| Vinyl chloride - vinyl acetate copolymer (Trademark "VYHH" made by Union Carbide Japan K.K.) (binder resin) | 45 |
| Toluene (solvent) | 200 |
| Methyl ethyl ketone (solvent) | 200 |

The thus obtained coating liquid was coated by a wire bar on the above-mentioned heat-insulating undercoat layer, and then dried, so that a recording layer was formed on the heat-insulating undercoat layer. Thus a reversible thermosensitive coloring recording medium of the present invention was obtained.

Examples 16-2 and 16-3

The procedure for preparing the reversible thermosensitive coloring recording medium in Example 16-1 was repeated except that the respective formulations of the coating liquid for the heat-insulating undercoat layer and the coating liquid for the recording layer, and the support employed in Example 16-1 were replaced as shown in Table-24, so that the reversible thermosensitive coloring recording media of the present invention were obtained.

Example 16-4

The procedure for preparing the reversible thermosensitive coloring recording medium in Example 16-1 was repeated except that the support employed in Example 16-1 was replaced by a foamed white PET film with a thickness of 100 μm as shown in Table-24 and no undercoat layer was formed on the support, so that a reversible thermosensitive coloring recording medium of the present invention was obtained.

Images were thermally printed on each of the thus obtained reversible thermosensitive coloring recording media by a thermal-head-built-in heat gradient tester (made by Toyo Seiki Seisaku-sho, Ltd.) under the following conditions:

| | |
|---|---|
| Temperature: | 130° C. |
| Contact Time: | 1 second |
| Applied Pressure: | 1 $kg/cm^2$ |

The density of the printed images was measured with Macbeth densitometer RD-918. The image density of each reversible thermosensitive coloring recording medium is shown in Table-24.

Then each image-bearing sample was placed in a thermostatic chamber at each decolorization temperature shown in Table-24 for about 20 seconds and decolorized. The decolorization density of each reversible thermosensitive coloring recording medium is shown in Table-24.

TABLE 24

| Ex. No. | Support | Formulation of Heat Insulating Undercoat Layer Coating Liquid | Recording Layer | Image Density | Decolorization Temperature (°C.) | Decolorization Density |
|---|---|---|---|---|---|---|
| 16-1 | Polyester film with a thickness of 100 μm | Thermally expandable minute void particles (Trademark "Micro Pearl F-30' made by Matsumoto-Yushi Seiyaku company, Ltd.): 15<br>Polyvinyl butyral: 5<br>Ethyl alcohol: 70<br>Toluene: 30 | Same as in Example 3-3 | 1.45 | 73 | 0.22 |
| 16-2 | Polyester film with a thickness of 100 μm | Alumininosilicate minute void particles (Trademark "Fillite" made by Nippon Sellaite co., Ltd.): 15<br>Ethylcellulose: 5<br>Methyl ethyl ketone: 50<br>Toluene: 50 | Same as in Example 3-31 | 1.42 | 70 | 0.25 |
| 16-3 | High quality paper with a basis weight of 48 $g/m^2$ | Thermally expandable minute void particles (Trademark "Micro Pearl F-30" made by Matsumoto-Yushi Seiyaku Company, Ltd.): 10<br>10% aqueous solution of polyvinyl alcohol: 30<br>Water: 70 | Same as in Example 9-1 | 1.48 | 73 | 0.25 |
| 16-4 | Foamed white PET film with a thickness of 100 μm (Trademark "W-900" made by DIA FOIL Co., Ltd.) | Nothing | Same as in Example 3-3 | 1.60 | 73 | 0.30 |

It is obvious from Table-24 that the undercoat layer served to lower the decolorization density and to produce the excellent decolorized state in the reversible thermosensitive coloring recording medium. The reversible thermosensitive coloring recording medium comprising the heat-resisting support made of the expandable white PET film obtained in Example 16-4 also exhibited excellent decolorizing properties.

EXAMPLE 17

The transparency of each of the reversible thermosensitive coloring recording media comprising the protective layer formed on the recording layer prepared in Examples 11 to 14 was measured. The reversible thermosensitive coloring recording media without a protective layer prepared in Examples 3-3, 3-12, and 3-32 were also subjected to the transparency evaluation test for comparison with the above recording media comprising the protective layer. Each of the above-mentioned reversible thermosensitive coloring recording media was mounted in a commercially available reflection-type overhead projector (Trademark "OHP 312R" made by Ricoh Company, Ltd.) and the illuminance of the light projected through each recording medium onto a screen was measured. The results are shown in Table-25.

Table 25

| Example No. | Transparency (lux) |
|---|---|
| 11-1 | 425 |
| 11-2 | 436 |
| 11-3 | 401 |
| 11-4 | 415 |
| 12-1 | 412 |
| 12-2 | 398 |
| 12-3 | 421 |
| 13-1 | 419 |
| 13-2 | 400 |
| 14-1 | 420 |
| 14-2 | 403 |
| 14-3 | 414 |
| 3-3 (no protective layer) | 90 |
| 3-12 (no protective layer) | 88 |
| 3-32 (no protective layer) | 101 |
| Only the support | 489 |

The reversible thermosensitive coloring recording media comprising a resin layer (or a protective layer) provided on the recording layer are more transparent than the reversible thermosensitive coloring recording media without such a resin layer or protective layer, and the background of the former recording media comprising the protective layer projected onto the screen was brighter than that of the latter recording media without the resin layer or the protective layer. Therefore, when the reversible thermosensitive coloring recording media comprising the protective layer are used for the overhead projector, a higher contrast between the image area and the background can be obtained.

EXAMPLE 18

A coating liquid for a recording layer was prepared by pulverizing and grinding a mixture of the following components so as to have a particle size of 1 to 4 μm:

| | parts by weight |
|---|---|
| 3-dibutylamino-7-(o-chlorophenyl)-aminofluoran | 14 |
| Octadecylphosphonic acid | 42 |
| Vinyl chloride - vinyl acetate copolymer (Trademark "VYHH", made by Union Carbide Japan K.K.) | 42 |
| Methyl ethyl ketone | 210 |
| Toluene | 210 |

The thus obtained coating liquid was coated on a transparent polyester film with a thickness of 100 μm serving as a support. The thus obtained recording layer coated polyester film was divided into four samples. The four samples were respectively dried at 60° C., 80° C., 120° C. and 140° C. for 2 minutes, so that a recording layer with a thickness of 5.0 μm was formed on each support. Thus four different reversible thermosensitive coloring recording media Nos. 18-1, 18-2, 18-3 and 18-4 of the present invention were obtained.

As the recording media Nos. 18-3 and 18-4 respectively dried at 120° C. and 140° C. were in the color development state during the drying process, these media were decolorized by application of heat thereto at 70° C. for 10 minutes.

The transmittance of each of the above obtained recording media No. 18-3 and No. 18-4 was measured by use of a light beam with a wavelength of 500 nm. Then the recording media Nos. 18-1 and 18-2 were colored by application of heat thereto at 120° C. for 1 minute and decolorized by application of heat thereto at 70° C. for 10 minutes. The transmittance of each of those recording media No. 18-1 and No. 18-2 was measured one more time. The results are shown in Table-26.

TABLE 26

| Recording Material No. | Drying Temperature (°C.) | Transmittance (First Time) (%)(*) | Transmittance (Second Time) (%)(*) |
|---|---|---|---|
| 18-1 | 60 | 23 | 65 |
| 18-2 | 80 | 26 | 63 |
| 18-3 | 120 | 64 | — |
| 18-4 | 140 | 66 | — |

(*)The transmittance of the whole body of the recording layer and the support of polyester film with a thickness of 100 μm was measured. The transmittance of the polyester film was 85.6%.

All the recording media obtained in Example 18 had a satisfactory transparency.

EXAMPLE 19

A coating liquid for a recording layer was prepared by melting a mixture of the following components by application of heat thereto to 50° C.:

| | parts by weight |
|---|---|
| 3-dibutylamino-7-(o-chlorophenyl)-aminofluoran | 3 |

-continued

| | parts by weight |
|---|---|
| Octadecylphosphonic acid | 10 |
| Vinyl chloride - vinyl acetate copolymer (Trademark "VYHH", made by Union Carbide Japan K.K.) | 20 |
| Tetrahydrofuran | 160 |
| Toluene | 1.5 |

As the temperature of the thus obtained coating liquid for the recording layer was maintained at 50° C., the coating liquid was coated on a transparent polyester film with a thickness of 100 μm serving as a support, with the temperature thereof maintained at 60° C. The thus obtained recording layer coated polyester film was divided into four samples. These four samples were respectively dried at 60° C., 80° C., 120° C. and 140° C., so that a recording layer with a thickness of 5.0 μm was formed on each support. Thus four different reversible thermosensitive coloring recording media Nos. 19-1, 19-2, 19-3 and 19-4 of the present invention were obtained.

As the recording media Nos. 19-3 and 19-4 respectively dried at 120° C. and 140° C. were in the color development state during the drying process, these recording media were decolorized by applying heat thereto at 70° C. for 10 minutes The transmittance of each of the above obtained recording media No. 19-3 and No. 19-4 was measured by use of a light beam with a wavelength of 500 nm.

The surface of each of the recording media Nos. 19-1 and 19-2 was rough because the crystals of hexadecylphosphonic acid separated out on the surface of each recording medium. Although these recording media were colored by application of heat thereto at 120° C. for 2 minutes and decolorized by application of heat thereto at 70° C. for 10 minutes, a sufficient surface smoothness was not obtained. The transmittance of each of the above recording media No. 19-1 and No. 19-2 was measured one more time. The results are shown in Table-27.

TABLE 27

| Recording Material No. | Drying Temperature (°C.) | Transmittance (First Time) (%) | Transmittance (Second Time) (%) |
|---|---|---|---|
| 19-1 | 60 | 32(*) | 49(**) |
| 19-2 | 80 | 44(*) | 53(**) |
| 19-3 | 120 | 75 | — |
| 19-4 | 140 | 72 | — |

(*)The crystals separated out.
(**)The surface of the recording media was not smooth.

The recording media Nos. 19-3 and 19-4 exhibited an excellent transparency. However the recording media Nos. 19-1 and 19-2 remained insufficiently transparent even after the heat treatment.

EXAMPLE 20

The procedure for preparing the reversible thermosensitive coloring recording medium in Example 18 was repeated except that the formulation of the coating liquid for the recording layer in Example 18 was changed to the following formulation, whereby the reversible thermosensitive coloring recording media of the present invention Nos. 20-1, 20-2, 20-3 and 20-4 were obtained:

| | parts by weight |
|---|---|
| 3-diethylamino-7-chloro-fluoran | 10 |
| α-hydroxy octadecanoic acid | 30 |
| Vinyl chloride - vinyl acetate copolymer (Trademark "VYHH", made by Union Carbide Japan K.K.) | 30 |
| Tetrahydrofuran | 170 |
| Toluene | 100 |

As the recording media Nos. 20-3 and 20-4 respectively dried at 120° C. and 140° C. were in the color development state during the drying process, these recording media were decolorized by applying heat thereto at 70° C. for 10 minutes.

The transmittance of each of the above obtained recording media No. 20-3 and No. 20-4 was measured by use of a light beam with a wavelength of 500 nm. Then the recording media Nos. 20-1 and 20-2 were colored by application of heat thereto at 120° C. for 1 minute and decolorized by application of heat thereto at 70° C. for 10 minutes. The transmittance of each of these recording media was measured one more time. The results are shown in Table-28.

TABLE 28

| Recording Material No. | Drying Temperature (°C.) | Transmittance (First Time) (%) | Transmittance (Second Time) (%) |
|---|---|---|---|
| 20-1 | 60 | 21 | 59 |
| 20-2 | 80 | 27 | 64 |
| 20-3 | 120 | 68 | — |
| 20-4 | 140 | 67 | — |

EXAMPLE 21

The procedure for preparing the reversible thermosensitive coloring recording medium in Example 19 was repeated except that the formulation of the coating liquid for the recording layer in Example 19 was changed to the following formulation, so that the reversible thermosensitive coloring recording media of the present invention Nos. 21-1, 21-2, 21-3 and 21-4 were obtained.

| | parts by weight |
|---|---|
| 3-dibutylamino-7-(o-chlorophenyl)-aminofluoran | 3 |
| Eicosylphosphonic acid | 9 |
| Ethylcellulose (made by Kanto Chemical Co., Inc.) | 18 |
| Tetrahydrofuran | 130 |
| Toluene | 32 |

As the recording media Nos. 21-3 and 21-4 respectively dried at 120° C. and 140° C. were in the color development state during the drying process, these recording media were decolorized by applying heat thereto at 70° C. for 10 minutes.

The transmittance of each of the above obtained recording media was measured by use of a light beam with a wavelength of 500 nm.

The surface of each of the recording media Nos. 21-1 and 21-2 was rough because the crystals of eicosylphosphonic acid separated out on the surface of each recording medium. Although these recording media were colored by application of heat thereto at 120° C. for 2 minutes and decolorized by application of heat thereto at 70° C. for 10 minutes, a sufficient surface smoothness was not obtained. The transmittance of each of the above recording media No. 21-1 and No. 21-2 was measured one more time. The results are shown in Table-29.

TABLE 29

| Recording Material No. | Drying Temperature (°C.) | Transmittance (First Time) (%) | Transmittance (Second Time) (%) |
|---|---|---|---|
| 21-1(*) | 60 | 24 | 50 |
| 21-2(**) | 80 | 40 | 50 |
| 21-3(***) | 120 | 70 | — |
| 21-4(***) | 140 | 69 | — |

(*)The surface of the recording medium was rough because of the separation of the crystals. Even after the heat treatment, the surface was still uneven.
(**)The surface of the recording medium was not as rough as that of the recording medium No. 21-1, but still rough and uneven.
(***)The surface of the recording medium was smooth and the crystals did not separate out.

The recording media Nos. 21-3 and 21-4 exhibited an excellent transparency. However the recording media Nos. 21-1 and 21-2 remained unsufficiently transparent even after the heat treatment.

EXAMPLE 22

A coating liquid for a recording layer was prepared by mixing the following components:

| | parts by weight |
|---|---|
| 3-dibutylamino-7-(o-chlorophenyl)-aminofluoran | 10 |
| Octadecylphosphonic acid | 30 |
| Vinyl chloride - vinyl acetate copolymer (Trademark "VYHH", made by Union Carbide Japan K.K.) | 30 |
| Polymeric cationic electroconductive agent (Trademark "Elecond 508", made by Soken Chemical & Engineering Co., Ltd.) (solid content: 50%) | 5 |
| Tetrahydrofuran | 250 |
| Isopropyl alcohol | 20 |

The thus obtained coating liquid was coated by a wire bar on a polyester film with a thickness of 75 μm serving as a support, and then dried by application of heat thereto, so that the recording layer with a thickness of about 6 μm was formed on the support. Thus a reversible thermosensitive coloring recording medium of the present invention was obtained.

Images were thermally printed on the thus obtained reversible thermosensitive coloring recording medium by a thermal-head-built-in heat gradient tester (made by Toyo Seiki Seisaku-sho, Ltd.) under the conditions of a contact time of 1 sec. and an applied pressure of 2 $kg/cm^2$. The color development temperature range and the image density were measured with a Macbeth densitometer RD-918. As a result, black images with a density of 1.50 were obtained at 100° C. or more.

The each image-bearing sample was placed in a thermostatic chamber at 75° C. for 5 seconds, so that the sample was completely decolorized and returned to the original white state.

Furthermore, the above-mentioned process of the image printing and the decolorization of the recording media was repeated ten times to evaluate the reversibility thereof. It was confirmed that the color development and the decolorization could be repeated on the thermosensitive recording medium obtained in Example 22. The quality of the reversible thermosensitive coloring recording medium did not deteriorate after used repeatedly.

EXAMPLE 23

The procedure for preparing the reversible thermosensitive coloring recording medium in Example 22 was repeated except that the formulation of the coating liquid for the recording layer in Example 22 was changed to the following formulation, so that a reversible thermosensitive coloring recording medium of the present invention was obtained:

| | parts by weight |
|---|---|
| 3-[N-ethyl-N-(p-methylphenyl)amino]-6-methyl-7-phenylaminofluoran | 10 |
| α-hydroxy octadecanoic acid | 30 |
| Vinyl chloride - vinyl acetate copolymer (Trademark "VYHH", made by Union Carbide Japan K.K.) | 30 |
| Polymeric cationic electroconductive agent (Trademark "MAC", made by Nihon Junyaku Co., Ltd.) | 5 |
| Tetrahydrofuran | 250 |
| Isopropyl alcohol | 20 |

The image printing and the decolorization were performed on the thus prepared reversible thermosensitive coloring recording medium in the same manner as in Example 22, so that black images with a density of 1.51 were obtained at 100° C. or more. Moreover, the obtained images were completely decolorized at 75° C. and returned to the original white state.

Images were thermally printed on the above decolorized recording medium using a commercially available word processor with a thermal head (Trademark "My Report N-1", made by Ricoh Co., Ltd.), so that clear black images with a density of 1.53 were obtained. The above obtained images were stable under normal conditions.

The above image-bearing sample was decolorized by passing over a heated roller at 75° C., and returned to the white state without leaving any images thereon. The quality of the reversible thermosensitive coloring recording medium obtained in Example 23 did not deteriorate by repeated use thereof.

EXAMPLE 24

The procedure for preparing the reversible thermosensitive coloring recording medium in Example 22 was repeated except that the formulation of the coating liquid for the recording layer in Example 22 was changed to the following formulation, so that a reversible thermosensitive coloring recording medium of the present invention was obtained:

| | parts by weight |
|---|---|
| 3-diethylamino-7-chloro-fluoran | 10 |
| Octadecylthiomalic acid | 30 |
| Vinylidene chloride - acrylonitrile copolymer (Trademark "Saran F310", made by Dow Chemical Japan, Ltd.) | 30 |
| Polymeric cationic electroconductive agent (Trademark "Chemistat 6300", made by Sanyo Chemical Industries, Ltd.) (solid content: 3%) | 7 |
| Tetrahydrofuran | 250 |
| Toluene | 20 |

The thus obtained coating liquid was coated by a wire bar on a polyester film with a thickness of 75 μm serving as a support, and then dried, so that a recording layer with a thickness of about 6 μm was formed on the support, whereby a reversible thermosensitive coloring recording medium of the present invention was obtained.

The thus obtained reversible thermosensitive coloring recording medium was loaded in a commercially available thermal printer (Trademark "CUVAX-MC50", made by Ricoh Co., Ltd.) and images were printed using a thermal head thereof, so that clear pink images were obtained.

The above obtained images were decolorized by passing over a heated roller at 75° C. and returned to the original white state.

Even when the above color development and decolorization were repeated, the same performance was maintained.

EXAMPLE 25

Formation of Recording Layer

A coating liquid for a recording layer was prepared by mixing and stirring the following components:

| | parts by weight |
|---|---|
| 3-dibutylamino-7-(o-chlorophenyl)-aminofluoran | 10 |
| Octadecylphosphonic acid | 30 |
| Vinyl chloride - vinyl acetate copolymer (Trademark "VYHH", made by Union Carbide Japan K.K.) | 30 |
| Tetrahydrofuran | 250 |
| Isopropyl alcohol | 20 |

The thus obtained coating liquid was coated by a wire bar on a polyester film with a thickness of 75 μm serving as a support, and then dried by application of heat thereto, so that a recording layer with a thickness of about 6 μm was formed on the support.

Formation of Overcoat Layer

A coating liquid for an overcoat layer was prepared by mixing and stirring the following components:

| | parts by weight |
|---|---|
| Fluorine-contained resin (Trademark "Daiflon ME413", made by Daikin Industries, Ltd.) (solid content: 3%) | 33 |
| Polymeric cationic electroconductive agent (Trademark "Elecond 508", made by Soken Chemical & Engineering Co., Ltd.) | 1 |
| Isopropyl alcohol | 40 |
| Water | 26 |

The thus obtained coating liquid was coated on the above-mentioned recording layer in such a manner that the amount of solid components in the overcoat layer was 0.1 $g/m^2$ on a dry basis, and then dried, whereby an overcoat layer was formed on the recording layer. Thus a reversible thermosensitive coloring recording medium of the present invention was obtained.

EXAMPLE 26

The procedure for forming the recording layer in Example 25 was repeated, so that the same recording layer as in Example 25 was formed on the same polyester film support as employed in Example 25. An overcoat layer was then formed on the recording layer in the following manner:

Formation of Overcoat Layer

A coating liquid for an overcoat layer was prepared by mixing and stirring the following components:

| | parts by weight |
|---|---|
| Silicone graftpolymer (Trademark "Aron XS705", made by Toagosei Chemical Industry Co., Ltd.) | 1 |
| Polymeric cationic electroconductive agent (Trademark "Chemistat 6300", made by Sanyo Chemical Industries, Ltd.) | 1 |
| Isopropyl alcohol | 68 |
| Water | 30 |

The thus obtained coating liquid was coated on the recording layer in such a manner that the amount of the solid components in the overcoat layer was 0.05 $g/m^2$ on a dry basis, and then dried, whereby an overcoat layer was formed on the recording layer. Thus a reversible thermosensitive coloring recording medium of the present invention was obtained.

EXAMPLE 27

The procedure for forming the recording layer in Example 25 was repeated, so that the same recording layer as in Example 25 was formed on the same support as in Example 25. An overcoat layer was formed on the support in the following manner:

Formation of Overcoat Layer

A coating liquid for an overcoat layer was prepared by mixing and stirring the following components:

| | parts by weight |
|---|---|
| Silicone acryl resin (Trademark "SR2400", made by Dow Corning Toray Silicone Co., Ltd.) (solid content: 50%) | 2 |
| Curing catalyst (Trademark "SPX242AC", made by Dow Corning Toray Silicone Co., Ltd.) | 0.1 |
| Polymeric cationic electroconductive agent (Trademark "MAC", made by Nihon Junyaku Co., Ltd.) | 0.5 |
| Isopropyl alcohol | 95 |
| Water | 2 |

The thus obtained coating liquid was coated on the recording layer in such a manner that the amount of the solid components in the overcoat layer was 0.05 $g/m^2$ on a dry basis, and then dried, whereby an overcoat layer was formed on the recording layer. Thus a reversible thermosensitive coloring recording medium of the present invention was obtained.

EXAMPLE 28

Example 28-1

Formation of Magnetic Recording Layer

A coating liquid for a magnetic recording layer was prepared by mixing and stirring the following components:

| | parts by weight |
|---|---|
| $\gamma$-$Fe_2O_3$ | 10 |
| Vinyl chloride - Vinyl acetate - vinyl alcohol copolymer (Trademark "VAGH", made by Union Carbide Japan K.K.) | 2 |
| Coronate L (10% toluene solution) | 2 |
| Methyl ethyl ketone | 43 |
| Toluene | 43 |

The thus obtained coating liquid was coated by a wire bar on a polyester film with a thickness of 100 μm serving as a support, and then dried, so that a magnetic recording layer with a thickness of about 10 μm was formed on the support. Furthermore, the surface of the magnetic recording layer was subjected to calendering.

Formation of Image Coloring Layer

A coating liquid for an image recording layer was prepared by mixing and stirring the following components:

| | parts by weight |
|---|---|
| 3-dibutylamino-7-(o-chlorophenyl)-aminofluoran | 14 |
| Hexadecylphosphonic acid | 42 |
| Vinyl chloride - vinyl acetate copolymer (Trademark "VYHH", made by Union Carbide Japan K.K.) | 42 |
| Methyl ethyl ketone | 210 |
| Toluene | 210 |

The thus obtained coating liquid was coated in three different deposition amounts on the above-mentioned magnetic recording layer, and then dried at 70° C. for 10 minutes, so that three reversible thermosensitive coloring recording media of the present invention were prepared. The first recording medium has a reversible thermosensitive coloring recording layer with a thickness of 5 μm. The second recording medium has a reversible thermosensitive coloring recording layer with a thickness of 8 μm. The third recording medium has a reversible thermosensitive coloring recording layer with a thickness of 10 μm.

Example 28-2

The procedure for preparing the three reversible thermosensitive coloring recording media in Example 28-1 was repeated except that the formulation of the coating liquid for the image recording layer in Example 28-1 was changed to the following formulation, so that three reversible thermosensitive coloring recording media of the present invention comprising respectively a reversible thermosensitive coloring recording layer with a thickness of 5 μm, a reversible thermosensitive coloring recording layer with a thickness of 8 μm and a reversible thermosensitive coloring recording layer with a thickness of 10 μm were obtained:

| | parts by weight |
|---|---|
| 3-dibutylamino-7-(o-chlorophenyl)-aminofluoran | 3 |
| Eicosylphosphonic acid | 9 |
| Polystyrene | 18 |
| Tetrahydrofuran | 130 |

-continued

| | parts by weight |
|---|---|
| Toluene | 32 |

Example 28-3

The procedure for preparing the three reversible thermosensitive coloring recording media in Example 28-1 was repeated except that the formulation of the coating liquid for the image recording layer in Example 28-1 was changed to the following formulation, so that three reversible thermosensitive coloring recording media of the present invention comprising respectively a reversible thermosensitive coloring recording layer with a thickness of 5 μm, a reversible thermosensitive coloring recording layer with a thickness of 8 μm and a reversible thermosensitive coloring recording layer with a thickness of 10 μm were obtained:

| | parts by weight |
|---|---|
| 3-diethylamino-7-chloro-fluoran | 10 |
| α-hydroxy octadecanoic acid | 30 |
| Vinyl chloride - vinyl acetate copolymer (Trademark "VYHH", made by Union Carbide Japan K.K.) | 30 |
| Methyl ethyl ketone | 170 |
| Toluene | 100 |

Examples 28-4 to 28-6

The procedure for preparing the reversible thermosensitive coloring recording medium in each of Examples 28-1 28-2 and 28-3 was repeated except that a coating liquid for a protective layer consisting of an epoxy acrylate ultraviolet-curing resin (Trademark "Unidic C7-127", made by Dainippon Ink & Chemicals, Incorporated) was coated on the image recording layer of each recording medium, cured, and a protective layer with a thickness of 1 μm was formed on the image recording layer, so that the reversible thermosensitive coloring recording media of the present invention were obtained.

Images were thermally printed on the above reversible thermosensitive coloring recording media obtained in Examples 28 using a thermal head with application of a thermal energy of 50 $mJ/mm^2$ and each image density thereof was measured.

Furthermore, images were printed on the reversible thermosensitive coloring recording media obtained in Examples 28 using a magnetic head and compared with the images printed on the recording medium without the reversible thermosensitive coloring recording layer in terms of the read output level thereof. The results are shown in Table-30.

TABLE 30

| Example | Image Density Thickness of Coloring Recording Layer | | | Read Output Level Thickness of Coloring Recording Layer | | |
|---|---|---|---|---|---|---|
| No. | 5 μm | 8 μm | 10 μm | 5 μm | 8 μm | 10 μm |
| Ex. 28-1 | 1.0 | 1.5 | 1.8 | 95 | 80 | 61 |
| Ex. 28-2 | 1.1 | 1.5 | 1.9 | 96 | 84 | 68 |
| Ex. 28-3 | 0.8 | 1.2 | 1.5 | 98 | 81 | 65 |
| Ex. 28-4 | 0.9 | 1.3 | 1.5 | 93 | 76 | 59 |
| Ex. 28-5 | 0.8 | 1.1 | 1.4 | 93 | 72 | 58 |
| Ex. 28-6 | 0.8 | 1.0 | 1.4 | 92 | 79 | 58 |

COMPARATIVE EXAMPLE 3

A coating liquid for a recording layer was prepared by pulverizing a mixture of the following components in a ball mill so as to have a particle size of 1 to 4 μm:

| | parts by weight |
|---|---|
| 3-dibutylamino-7-(o-chlorophenyl)-aminofluoran (coloring agent) | 10 |
| Ascorbic acid-6-O-octadecyl (color developer) | 30 |
| Vinyl chloride - vinyl acetate copolymer (Trademark "VYHH", made by Union Carbide Japan K.K.) (binder resin) | 45 |
| Toluene (solvent) | 200 |
| Methyl ethyl ketone (solvent) | 200 |

The thus obtained coating liquid was coated by a wire bar on a polyester film with a thickness of 100 μm serving as a support, and then dried, so that a recording layer with a thickness of about 6.0 μm was formed on the support. Thus a comparative reversible thermosensitive coloring recording medium was obtained.

Images were thermally printed on the thus obtained reversible thermosensitive coloring recording medium by a thermal-head-built-in heat gradient tester (made by Toyo Seiki Seisaku-sho, Ltd.) under the following conditions:

| | |
|---|---|
| Temperature: | 130° C. |
| Contact Time: | 1 second |
| Applied Pressure: | 1 $kg/cm^2$ |

The density of the printed images was measured with Macbeth densitometer RD-918. The image density of the above recording medium was 1.70.

Then the above image-bearing sample was placed in a thermostatic chamber at 70° C. for about 20 seconds and decolorized. The decolorization density of the above recording medium was 0.46.

Furthermore, the above-mentioned process of the image printing and decolorization for the recording medium was repeated ten times to evaluate the reversibility thereof. It was possible to repeat the color development and the decolorization in this comparative thermosensitive recording medium.

Then the water resistance of the above comparative recording medium was compared with that of the reversible thermosensitive coloring recording media obtained in Examples 3-3 and 3-29. Images were thermally printed on each of the three recording media under the same conditions as in the above method, and the initial image density of each recording medium was measured.

Subsequently, those recording media were immersed in water of 20° C. for 5 minutes and taken out. The image density of each recording medium was measured again. The results are shown in Table-31.

TABLE 31

| Example No. (*) | Color Developer | Initial Image Density | Image Density after Exposure to Water |
|---|---|---|---|
| Comparative Example 3 | Ascorbic acid-6-O-octadecyl | 1.70 | 0.98 |

TABLE 31-continued

| Example No. (*) | Color Developer | Initial Image Density | Image Density after Exposure to Water |
|---|---|---|---|
| Example 3-3 | Octadecyl-phosphonic acid | 1.72 | 1.71 |
| Example 3-29 | Eicosyl-thiomalic acid | 1.58 | 1.55 |

(*)3-dibutylamino-7-(o-chlorophenyl)aminofluoran was employed as a coloring agent for use in the recording layer of all the above recording media.

The recording medium comprising the ascorbic derivative in the recording layer has a poor water resistance, because the image density is decreased when coming into contact with water. On the contrary, the reversible thermosensitive coloring recording media of the present invention have an excellent water resistance and the image density thereof did not decrease.

The reversible thermosensitive coloring composition comprising the color developer and the coloring agent according to the present invention in the previously mentioned combination can easily produce the color development state or the decolorization state with the application of heat thereto. Furthermore, the two states can be maintained in a stable manner at room temperature. Moreover, the color development state and the decolorization state can be alternately formed in repetition. The color to be developed can be changed by changing the coloring agent for use in the coloring composition in accordance with the purpose of the use.

The reversible thermosensitive coloring recording medium and the display medium comprising the above reversible thermosensitive coloring composition can produce high quality images with high contrast because of the excellent image decolorization properties without maintaining the images to be erased.

The reversible thermosensitive recording medium and the display medium include a protective layer on the recording layer and therefore have excellent chemical resistance, water resistance, abrasion resistance, and light-resistance. The recording medium and the display medium are not easily abraded when repeatedly brought into contact with a heating device such as a thermal head, so that the quality of the images formed on the recording or display medium is not caused to deteriorate. Moreover, images can be smoothly produced in the recording or display medium because of the excellent running or transport performance.

The reversible thermosensitive coloring recording medium and the display medium comprising an undercoat layer between the support and the recording layer produces high quality images because the undercoat layer prevents the coloring composition in the color development state from penetrating into the support and makes the decolorization complete. The provision of the undercoat layer is particularly effective for attaining complete color development and decolorization when a porous support such as a paper is employed as the support.

When the reversible thermosensitive coloring recording material and the display medium are provided with a heat insulating layer, or when the above-mentioned undercoat layer serves as a heat insulating layer, the cooling rate of the media can be appropriately controlled by the insulating layer, so that the decolorizing properties of such media are significantly improved and high quality images can be obtained.

The recording method and the display method of using the above recording medium and display medium utilize the difference in the temperatures at which the color development and the decolorization occur, so that image formation and image erasure can be performed only by controlling the temperature.

Since the display apparatus employing the above-mentioned display medium includes a heating device for the color development and another heating device for the decolorization, the image formation and the erasure can continuously and effectively performed.

What is claimed is:

1. A reversible thermosensitive coloring composition comprising (i) an electron-donor coloring compound and (ii) an electron-acceptor compound selected from the group consisting of an organic phosphoric acid compound, an α-hydroxycarboxylic acid compound, a halogen-substituted aliphatic carboxylic compound, an aliphatic carboxylic acid, and a phenolic compound, each having a straight chain or branched chain alkyl group or alkenyl group having 12 or more carbon atoms, said electron-donor coloring compound and said electron-acceptor compound being capable of reacting to induce color formation in said reversible thermosensitive coloring composition at the eutectic temperature thereof, and said electron-donor coloring compound and said electron-acceptor compound, when fused and colored in a mixed state, with application of heat thereto, followed by rapidly cooling said fused mixture, exhibiting an exothermic peak in a temperature elevation process in a differential scanning calorific analysis or in a differential thermal analysis.

2. The reversible thermosensitive coloring composition as claimed in claim 1, wherein said electron-acceptor compound is selected from the group consisting of:

(a) an organic phosphoric acid compound with formula (I):

$$R_1—PO(OH)_2 \qquad (I)$$

wherein $R_1$ represents a straight chain or branched chain alkyl group or alkenyl group having 12 or more carbon atoms;

(b) an α-hydroxycarboxylic acid compound with formula (II):

$$R_2—CH(OH)—COOH \qquad (II)$$

wherein $R_1$ represents a straight chain or branched chain alkyl group or alkenyl group having 12 or more carbon atoms;

(c) a halogen-substituted aliphatic carboxylic acid compound having a straight chain or branched chain alkyl group or alkenyl group having 12 or more carbon atoms, said halogen being bonded to at least one carbon atom at α-position or β-position of said aliphatic carboxylic acid compound;

(d) an aliphatic carboxylic acid compound having a straight chain or branched chain alkyl group or alkenyl group having 12 or more carbon atoms, including an oxo group with at least one carbon at α-position, β-position, or γ-position of said aliphatic carboxylic acid compound constituting said oxo group;

(e) an aliphatic carboxylic acid compound of formula (III):

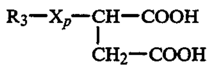

(III)

wherein $R_3$ represents a straight chain or branched chain alkyl group or alkenyl group having 12 or more carbon atoms, X represents an oxygen atom or a sulfur atom, and p is an integer of 1 or 2;

(f) an aliphatic carboxylic acid compound of formula (IV):

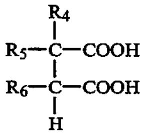

(IV)

wherein $R_4$, $R_5$ and $R_6$ each represent hydrogen, an alkyl group, or an alkenyl group, at least one of $R_4$, $R_5$ or $R_6$ being a straight chain or branched chain alkyl group or alkenyl group having 12 or more carbon atoms;

(g) an aliphatic carboxylic acid compound of formula (V):

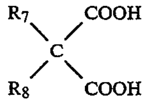

(V)

wherein $R_7$ and $R_8$ each represent hydrogen, an alkyl group, or an alkenyl group, at least one of $R_7$ or $R_8$ being a straight chain or branched chain alkyl group or alkenyl group having 12 or more carbon atoms;

(h) an aliphatic carboxylic acid compound of formula (VI):

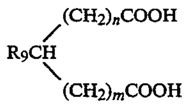

(VI)

wherein $R_9$ represents a straight chain or branched chain alkyl group or alkenyl group having 12 or more carbon atoms, n is an integer of 0 or 1, m is an integer of 1, 2 or 3, and when n is zero, m is 2 or 3, while when n is 1, m is 1 or 2; and (i) a phenolic compound with formula (VII):

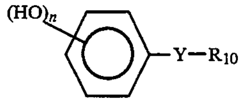

(VII)

wherein Y represents —S—, —O—, —CONH—, —COO—, and $R_{10}$ represents a straight chain or branched chain alkyl group or alkenyl group having 12 or more carbon atoms.

* * * * *

UNITED STATES PATENT AND TRADEMARK OFFICE
CERTIFICATE OF CORRECTION

PATENT NO. : 5,395,433
DATED : March 7, 1995
INVENTOR(S) : Shoji Maruyama, et. al.

It is certified that error appears in the above-indentified patent and that said Letters Patent is hereby corrected as shown below:

Column 4, line 37, "transplarent" should read --transparent--;

line 63, "doner" should read --donor--.

Column 5, line 8, "electron-doner" should read --electron-donor--;

line 55, "sierving" should read --serving--.

Column 6, line 29, "digrams" should read --diagrams--.

Column 7, lines 19-20, "temperature. Comparative coloring composition." should read --temperature.--.

Column 13, line 64, "exmaples" should read --examples--.

Column 17, line 34, "for can obtaining" should read --for obtaining--.

Column 19, line 31, "stat" should read --state--.

Column 20, line 62, "shows" should read --show--.

UNITED STATES PATENT AND TRADEMARK OFFICE
CERTIFICATE OF CORRECTION

PATENT NO. : 5,395,433
DATED : March 7, 1995
INVENTOR(S) : shoji Maruyama, et. al.

It is certified that error appears in the above-indentified patent and that said Letters Patent is hereby corrected as shown below:

Column 22, line 15, "add" should read --added--;

lines 36-37, "as the the reversible" should read --as the rev sible--.

Column 25, line 37, "a should read --an--.

Column 30, line 55, "polyvinly" should read --polyvinyl--.

Column 31, lines 38-39, "undecolo-rized" should read --undercolorized--.

Column 32, line 61, "and made the" should read --and the--;

line 63, "medium can be can be obtained" should read --medium can be obtained--.

Column 33, line 4, "The the recording" should read --The recording--.

Column 35, line 11, "elctroconductive" should read --electroconductive--

UNITED STATES PATENT AND TRADEMARK OFFICE

CERTIFICATE OF CORRECTION

PATENT NO. : 5,395,433

DATED : March 7, 1995

INVENTOR(S) : Shoji Maruyama, et. al.

It is certified that error appears in the above-indentified patent and that said Letters Patent is hereby corrected as shown below:

Column 36, line 37, "recoding" should read --recording--.

Column 38, line 58, "word" should read --words--.

Column 59, line 56, "0.2" should read --0.29--.

Column 63, line 13, "printing an decolor-" should read --printing decolor- --.

Column 79, line 57, "IVYHH" should read --VYHH--.

Column 96, line 10, "effectively performed" should read --effectively be performed--.

Signed and Sealed this

Twenty-second Day of October, 1996

Attest:

BRUCE LEHMAN

*Attesting Officer* *Commissioner of Patents and Trademarks*